US009039788B2

(12) United States Patent
Xu et al.

(10) Patent No.: US 9,039,788 B2
(45) Date of Patent: May 26, 2015

(54) METHODS FOR MAKING ANODES FOR LITHIUM ION BATTERIES

(75) Inventors: Wu Xu, Richland, WA (US); Nathan L. Canfield, Richland, WA (US); Ji-Guang Zhang, Richland, WA (US); Wei Liu, Richland, WA (US); Jie Xiao, Richland, WA (US); Deyu Wang, Richland, WA (US); Z. Gary Yang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 331 days.

(21) Appl. No.: 12/621,410

(22) Filed: Nov. 18, 2009

(65) Prior Publication Data

US 2011/0114254 A1 May 19, 2011

(51) Int. Cl.

| | |
|---|---|
| ***H01M 4/88*** | (2006.01) |
| ***H01M 4/139*** | (2010.01) |
| ***H01M 4/04*** | (2006.01) |
| ***H01M 4/62*** | (2006.01) |
| ***H01M 4/80*** | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/02* | (2006.01) |

(52) U.S. Cl.

CPC ............ *H01M 4/139* (2013.01); *H01M 4/0471* (2013.01); *H01M 4/386* (2013.01); *H01M 4/387* (2013.01); *H01M 4/485* (2013.01); *H01M 4/505* (2013.01); *H01M 4/525* (2013.01); *H01M 4/621* (2013.01); *H01M 4/801* (2013.01); *H01M 2004/021* (2013.01); *Y02E 60/122* (2013.01)

(58) Field of Classification Search

None

See application file for complete search history.

(56) References Cited

U.S. PATENT DOCUMENTS

| | | | |
|---|---|---|---|
| 2,437,422 | A | 3/1948 | Dunham |
| 3,607,417 | A | 9/1971 | McRae et al. |

(Continued)

FOREIGN PATENT DOCUMENTS

| | | |
|---|---|---|
| EP | 0032291 | 7/1981 |
| JP | 63-105469 | 5/1988 |

(Continued)

OTHER PUBLICATIONS

International Search Report and Written Opinion for PCT/US2010/057047 (Mailed Jul. 27, 2011).

(Continued)

*Primary Examiner* — Barbara Gilliam
*Assistant Examiner* — Adam A Arciero
(74) *Attorney, Agent, or Firm* — Klarquist Sparkman, LLP

(57) ABSTRACT

Methods for making composite anodes, such as macroporous composite anodes, are disclosed. Embodiments of the methods may include forming a tape from a slurry including a substrate metal precursor, an anode active material, a pore-forming agent, a binder, and a solvent. A laminated structure may be prepared from the tape and sintered to produce a porous structure, such as a macroporous structure. The macroporous structure may be heated to reduce a substrate metal precursor and/or anode active material. Macroporous composite anodes formed by some embodiments of the disclosed methods comprise a porous metal and an anode active material, wherein the anode active material is both externally and internally incorporated throughout and on the surface of the macroporous structure.

27 Claims, 28 Drawing Sheets

10
20
30
40

(56) References Cited

U.S. PATENT DOCUMENTS

| | | | | |
|---|---|---|---|---|
| 4,132,837 | A | 1/1979 | Soffer | |
| 4,433,035 | A | 2/1984 | Wiacek | |
| 4,659,379 | A * | 4/1987 | Singh et al. | 75/234 |
| 4,799,936 | A * | 1/1989 | Riley | 29/623.1 |
| 4,895,774 | A * | 1/1990 | Ohzu et al. | 429/478 |
| 5,004,715 | A * | 4/1991 | Hakotani et al. | 501/136 |
| 5,019,263 | A | 5/1991 | Haag et al. | |
| 5,110,694 | A | 5/1992 | Nagasubramanian et al. | |
| 5,130,211 | A | 7/1992 | Wilkinson et al. | |
| 5,194,158 | A | 3/1993 | Matson | |
| 5,206,095 | A * | 4/1993 | Donado et al. | 429/478 |
| 5,296,318 | A | 3/1994 | Gozdz et al. | |
| 5,342,704 | A * | 8/1994 | Vasilow et al. | 429/535 |
| 5,510,209 | A | 4/1996 | Abraham et al. | |
| 5,567,401 | A | 10/1996 | Doddapaneni et al. | |
| 5,698,339 | A | 12/1997 | Kawakami et al. | |
| 5,985,475 | A | 11/1999 | Reynolds et al. | |
| 6,083,297 | A | 7/2000 | Valus et al. | |
| 6,326,326 | B1 | 12/2001 | Feng et al. | |
| 6,410,160 | B1 * | 6/2002 | Landin et al. | 428/613 |
| 6,464,742 | B1 | 10/2002 | Leung et al. | |
| 6,689,513 | B1 | 2/2004 | Morigaki et al. | |
| 6,929,705 | B2 | 8/2005 | Myers et al. | |
| 6,946,015 | B2 | 9/2005 | Jorgensen et al. | |
| 7,014,948 | B2 * | 3/2006 | Lee et al. | 429/144 |
| 7,399,322 | B2 | 7/2008 | Yu | |
| 7,740,965 | B2 | 6/2010 | Richards et al. | |
| 8,012,633 | B2 | 9/2011 | Gordon et al. | |
| 8,119,295 | B2 | 2/2012 | Drews et al. | |
| 8,481,187 | B2 | 7/2013 | Zhang et al. | |
| 2002/0050054 | A1 | 5/2002 | Noh | |
| 2004/0131934 | A1 | 7/2004 | Sugnaux et al. | |
| 2004/0247970 | A1 * | 12/2004 | Irvine et al. | 429/30 |
| 2004/0247979 | A1 | 12/2004 | Sato et al. | |
| 2004/0247996 | A1 | 12/2004 | Smith et al. | |
| 2005/0153178 | A1 * | 7/2005 | Ahmed et al. | 429/20 |
| 2005/0208353 | A1 | 9/2005 | Johnson | |
| 2007/0122716 | A1 | 5/2007 | Seo et al. | |
| 2007/0160898 | A1 | 7/2007 | Takamura et al. | |
| 2007/0296103 | A1 * | 12/2007 | Hayes et al. | 264/41 |
| 2009/0053594 | A1 | 2/2009 | Johnson et al. | |
| 2009/0053607 | A1 | 2/2009 | Jeong et al. | |
| 2009/0136812 | A1 * | 5/2009 | Yonesato et al. | 429/30 |
| 2009/0155678 | A1 | 6/2009 | Less et al. | |
| 2010/0190043 | A1 | 7/2010 | Nakanishi | |
| 2010/0297531 | A1 | 11/2010 | Liu et al. | |
| 2010/0304953 | A1 | 12/2010 | Liu et al. | |
| 2011/0052466 | A1 | 3/2011 | Liu | |
| 2011/0059355 | A1 | 3/2011 | Zhang et al. | |
| 2011/0059364 | A1 | 3/2011 | Zhang et al. | |
| 2011/0155662 | A1 | 6/2011 | Liu et al. | |
| 2012/0180945 | A1 | 7/2012 | Zhang et al. | |

FOREIGN PATENT DOCUMENTS

| | | |
|---|---|---|
| KR | 10-2007-0069306 | 7/2007 |
| WO | WO00/53297 | 9/2000 |
| WO | WO2006/050531 | 5/2006 |
| WO | WO2009/005745 | 1/2009 |
| WO | WO2009/013629 | 1/2009 |

OTHER PUBLICATIONS

International Search Report and Written Opinion for PCT/US2011/031342 (Mailed Jul. 27, 2011).

PCT Application No. PCT/US2011/031342, filed Apr. 6, 2011, 42 pages.

International Search Report and Written Opinion for PCT/US2010/035543 (Mailed Dec. 6, 2010).

International Search Report and Written Opinion for PCT/US2010/041213 (Mailed Feb. 8, 2011).

International Search Report and Written Opinion for PCT/US2010/041214 (Mailed Feb. 8, 2011).

International Search Report and Written Opinion for PCT/US2010/052170 (Mailed Jan. 28, 2011).

Fan et al., "Microspherical $Cu_6Sn_5$ Alloy Anode for Lithium-Ion Battery," *Electrochemical and Solid-State Letters*, 11:A195-A197 (2008).

Fan et al., "Sn—Co alloy anode using porous Cu as current collector for lithium ion battery," *Journal of Alloys and Compounds*, 476:70-73 (2009).

Huang et al., "Electrodeposition and lithium storage performance of three-dimensional porous reticular Sn—Ni alloy electrodes," *Electrochimica Acta*, 54:2693-2698 (2009).

Ke et al., "Fabrication and properties of three dimensional macroporous Sn—Ni alloy electrodes of high preferential (1 1 0) orientation for lithium ion batteries," *Electrochemistry Communications*, 9:228-232 (2007).

Ke et al., "Electroplating synthesis and electrochemical properties of macroporous Sn—Cu alloy electrode for lithium-ion batteries," *Electrochemimica Acta*, 52:6741-6747 (2007).

Ke et al., "Fabrication and properties of macroporous tin-cobalt alloy film electrodes for lithium-ion batteries," *Journal of Power Sources*, 170:450-455 (2007).

Shin et al., "Three-Dimensional Porous Copper-Tin Alloy Electrodes for Rechargeable Lithium Batteries," *Adv. Funct. Mater*. 15, No. 4, pp. 582-586, Apr. 2005.

Tamura et al., "Study on Sn—Co Alloy Anodes for Lithium Secondary Batteries," *Journal of the Electrochemical Society*, 153 (8) pp. A1626-A1632 (2006).

Tamura et al., "Study on Sn—Co Alloy Electrodes for Lithium Secondary Batteries," *Journal of the Electrochemical Society*, 153 (12) pp. A2227-A2231 (2006).

Zhao et al., "A new process of preparing composite microstructure anode for lithium ion batteries," *Journal of Power Sources*, 184:532-537 (2008).

Barras, "Breathing batteries could store 10 times the energy," *NewScientist*, 2 pages (May 19, 2009).

Chen, H. et al., "Immobilized glycerol-based liquid membranes in hollow fibers for selective $CO_2$ separation from $CO_2$—$N_2$ mixtures," *Journal of Membrane Science*, vol. 183, No. 1, pp. 75-88 (Feb. 28, 2001).

Deng, L. et al., "Facilitated transport of $CO_2$ in novel PVAm/PVA blend membrane," *J. Mem. Sci*., vol. 340, pp. 154-163 (May 23, 2009).

Dobley et al., "Non-aqueous Lithium-Air Batteries with an Advanced Cathode Structure," 4 pages (publication believed to be Dec. 7, 2004).

Dobley et al., "Lithium-Air Cells and Systems," *Proceedings of the 43rd Power Sources Conference*, pp. 23-25, Philadelphia, PA, (Jul. 7-10, 2008).

Foster et al., "Chelating Agents as Electrolyte Additives for Lithium-Ion Batteries," Army Research Laboratory, 18 pages, Mar. 1999.

Kowalczk et al., "Li-air batteries: A classic example of limitations owing to solubilities," *Pure Appl. Chem*., vol. 79, No. 5, pp. 851-860 (2007).

Read, "Characterization of the Lithium/Oxygen Organic Electrolyte," *Journal of the Electrochemical Society*, vol. 149, No. 9, pp. A1190-A1195 (2002).

Read, "Ether-Based Electrolytes for the Lithium/Oxygen Organic Electrolyte Battery," *Journal of the Electrochemical Society*, vol. 153, No. 1, pp. A96-A100 (2006).

Read, "Oxygen Transport Properties of Organic Electrolytes and Performance of Lithium/Oxygen Battery," *Journal of the Electrochemical Society*, vol. 150, No. 10, pp. A1351-A1356 (2003).

Takemura, D. et al., "A powder particle size effect on ceramic powder based separator for lithium rechargeable battery," *J. Power Sources*, vol. 146, Issues 1-2, pp. 779-783 (Aug. 2005).

Tarascon et al., "Performance of Bellcore's plastic rechargeable Li-ion batteries," *Solid State Ionics*, vol. 86-88: pp. 49-54 (1996).

Visco, et al., "Lithium Fuel Cells," *The Electrochemical Society, Inc*., Abs. 396, IMLB 12 Meeting, 1 page (2004).

Xu et al., "Optimization of Nonaqueous Electrolytes for Primary Lithium/Air Batteries Operated in Ambient Environment," *Journal of the Electrochemical Society*, vol. 156, No. 10, pp. A773-A779, (Jul. 27, 2009).

(56) References Cited

OTHER PUBLICATIONS

Office action from U.S. Patent and Trademark Office for U.S. Appl. No. 13/414,641, mailed Jul. 16, 2012.
Restriction Requirement from U.S. Patent and Trademark Office for U.S. Appl. No. 12/557,452, mailed Aug. 10, 2012.
Wei et al., "Influence of electrode structure on the performance of a direct methanol fuel cell," *Journal of Power Sources*, vol. 106, Issues 1-2, pp. 364-369 (Apr. 2002).
Final Office action from U.S. Patent and Trademark Office for U.S. Appl. No. 12/557,455, mailed Nov. 8, 2012.
Office action from U.S. Patent and Trademark Office for U.S. Appl. No. 12/557,452, mailed Dec. 6, 2012.
Final Office action from U.S. Patent and Trademark Office for U.S. Appl. No. 12/470,294, mailed Jun. 10, 2013.
The Free Dictionary Definition of the word "embed." http://www.thefreedictionary.com/embedded (printed May 14, 2013).
Notice of Allowance from U.S. Patent and Trademark Office for U.S. Appl. No. 12/470,294, mailed Oct. 1, 2013.
Notice of Allowance from U.S. Patent and Trademark Office for U.S. Appl. No. 12/557,452, mailed May 7, 2013.
Office action from U.S. Patent and Trademark Office for U.S. Appl. No. 12/557,455, mailed Mar. 28, 2013.
Office action from U.S. Patent and Trademark Office for U.S. Appl. No. 12/901,119, mailed Jul. 30, 2013.
Office action from U.S. Patent and Trademark Office for U.S. Appl. No. 13/910,065, mailed Aug. 8, 2013.
Office action from U.S. Patent and Trademark Office for U.S. Appl. No. 13/414,641, mailed Aug. 15, 2013.

* cited by examiner

METHODS FOR MAKING ANODES FOR LITHIUM ION BATTERIES

ACKNOWLEDGMENT OF GOVERNMENT SUPPORT

This invention was made with government support under DE-AC05-76RL01830 awarded by the U.S. Department of Energy. The government has certain rights in the invention.

FIELD

Disclosed herein are embodiments of methods for making and using composite anodes.

BACKGROUND

With the increasing demand and higher price of fossil fuels, in addition to global warming concerns from carbon dioxide emissions, energy storage systems such as batteries and capacitors with substantially higher energy and power densities are urgently needed in transportation and other applications. Lithium ion batteries have been identified as a critical enabling technology for development of advanced, fuel-efficient vehicles, especially for plug-in hybrid electrical vehicles (PHEVs). However, there is a need to have lithium ion batteries with a higher energy density, longer cycle life and calendar life, higher safety, and lower cost than the currently known lithium ion batteries.

One way to significantly increase the energy density of a lithium ion battery is to use electrode materials with high capacity stored reversibly per unit weight, particularly for the anode material. Commercially available lithium ion batteries mainly use carbonaceous materials, especially graphite, as the anode material. Graphite has a theoretical specific capacity of 372 mAh/g and good cell performance. There is an urgent need to replace graphite with an anode having superior capacity and an electrochemical potential that is within a few hundred millivolts above that of metallic lithium to minimize lithium plating on the anode.

SUMMARY

Disclosed herein are embodiments of methods for making composite anodes, including macroporous composite anodes. The composite anodes are suitable for use in, e.g., lithium ion batteries.

In some embodiments, a slurry including a substrate precursor (e.g., a pure metal, metal oxide, metal alloy, or a combination thereof), an anode active material, a pore-forming agent, a binder, and a solvent is prepared. In certain embodiments, the metal is copper, nickel, or a combination thereof. In particular embodiments, the anode active material is tin, a tin alloy, tin oxide, cobalt oxide, iron oxide, manganese oxide, chromium oxide, vanadium oxide, silicon, silicon oxide, titanium oxide, aluminum or a combination thereof. In certain embodiments, the anode active material is a powder with an average particle diameter of 5 nm to 500 nm. The slurry may further include a dispersant and/or a plasticizer. Tape casting is used to spread the slurry and form a tape, which is dried before use. A laminate structure can be prepared from the dried tape. In some embodiments, at least two layers of the dried tape are placed between two layers of a biaxially-oriented polyethylene terephthalate film and then laminated. The tape or laminate structure is sintered at high temperature for a sufficient period of time to remove the pore-forming agent and binder, thus producing a macroporous structure. In some embodiments, the macroporous structure is devoid of carbon and binder. The macroporous structure then is heated in a reducing atmosphere at a temperature and for a period of time such that substrate precursor is reduced to its corresponding metal. In certain embodiments, the temperature and period of time are selected such that both the substrate precursor and the anode active material are reduced to their respective metals. In some embodiments, the reduced macroporous structure is sintered again to increase strength and/or conductivity of the macroporous structure. In other embodiments, the temperature and period of time are selected such that the macroporous structure is concurrently reduced and sintered again.

In certain embodiments, the prepared macroporous composite anodes have a porosity of 20% to 85%, such as 30% to 60%. In some embodiments, the prepared macroporous anodes include 2 wt % to 30 wt % anode active material. Some embodiments of the anodes have an initial discharge specific capacity greater than 600 mAh/g.

The foregoing and other objects, features, and advantages of the invention will become more apparent from the following detailed description, which proceeds with reference to the accompanying figures.

DETAILED DESCRIPTION

I. Terms and Definitions

Figure 1:
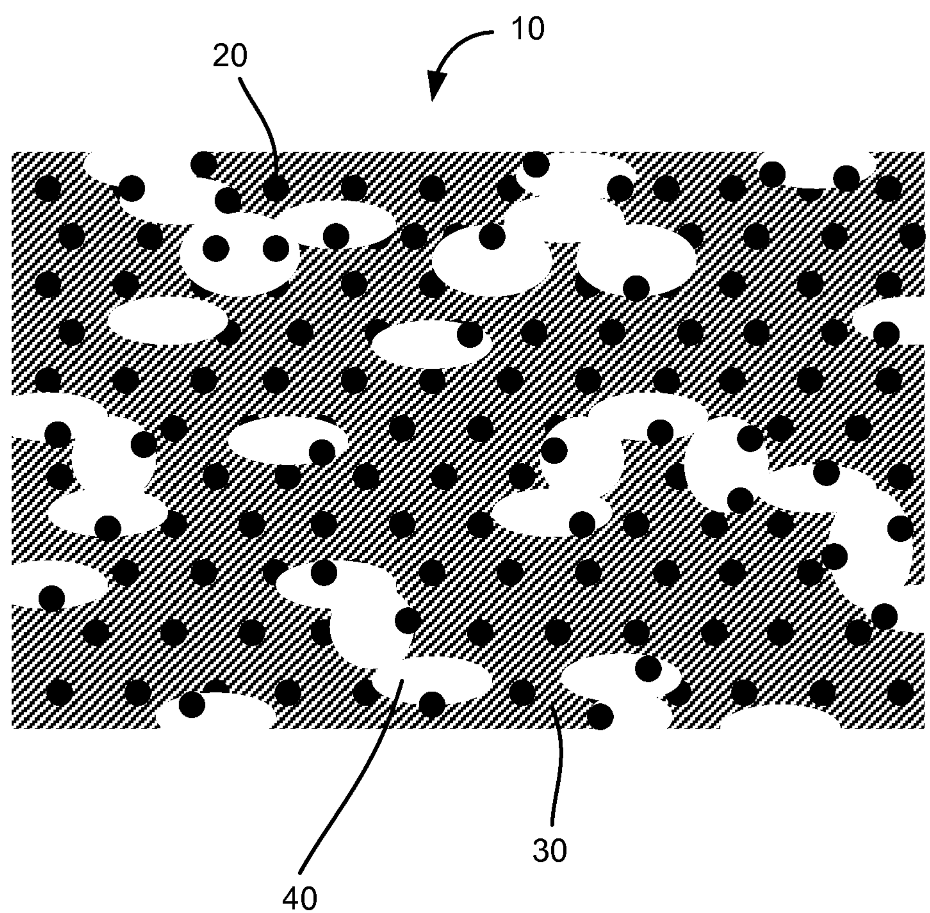
FIG. 1 is a cross-sectional representation of a macroporous composite anode made by one embodiment of the disclosed methods.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

In order to facilitate review of the various embodiments of the disclosure, the following explanations of specific terms are provided:

Alkyl refers to a hydrocarbon group having a saturated carbon chain. The chain may be linear or branched. The term lower alkyl means the chain includes 1-10 carbon atoms.

Anode: An electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed lithium/ion batteries or a galvanic cell, the anode is the negative terminal where electrons flow out. If the anode is composed of a metal, electrons that it gives up to the external circuit are accompanied by metal cations moving away from the electrode and into the electrolyte.

Anode active material: A material that is included in an anode and produces the electrons that flow out of the anode in a discharging battery.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery, such as the disclosed lithium ion batteries or a galvanic cell, the cathode is the positive terminal, toward the direction of conventional current. This outward charge is carried internally by positive ions moving from the electrolyte to the positive cathode.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

A current collector is a battery component that conducts the flow of electrons between an electrode and a battery terminal. The current collector also may provide mechanical support for the electrode's active material, such as an anode's active material. For example, a metal mesh current collector may provide mechanical support for an electrodeposited anode active material.

An electrolyte is a substance containing free ions that behaves as an electrically conductive medium. Electrolytes generally comprise ions in a solution, but molten electrolytes and solid electrolytes also are known.

Half-cell: As used herein, a half-cell is an electrochemical cell including a lithium metal negative electrode, another working electrode as the positive electrode, a separator, and an electrolyte.

Intercalation: A term referring to the insertion of a material (e.g., an ion, molecule, or group) between the atoms, molecules, or groups of another material. For example, lithium ions can insert, or intercalate, into graphite (C) to form lithiated graphite ($LiC_6$).

MYLAR® is a biaxially-oriented polyethylene terephthalate film.

Pore: One of many openings or void spaces in a solid substance of any kind. Pores are characterized by their diameters. According to IUPAC notation, micropores are small pores with diameters less than 2 nm. Mesopores are mid-sized pores with diameters from 2 nm to 50 nm. Macropores are large pores with diameters greater than 50 nm. When referring to a particular porous material, the pore size typically refers to the average pore size within the material.

Porosity: A measure of the void spaces or openings in a material. Porosity is measured as a fraction, between 0-1, or as a percentage between 0-100%.

Porous: A term used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua. Many materials such as cements, foams, metals and ceramics can be prepared as porous media. A macroporous material contains pores with an average diameter greater than 50 nm.

Sintering is the agglomeration of metal or earthy powders at temperatures below the melting point. Sintering commonly is used in powder metallurgy and ceramic firing. The powdered material is heated until its particles adhere to each other. Sintering increases strength, conductivity, and/or density.

Specific capacity: A term that refers to capacity per unit of mass of the active material in an electrode. Specific capacity may be expressed in units of mAh/g, and often is expressed as mAh/g of anode active material when referring to a macroporous composite anode.

II. Lithium Ion Batteries

Lithium ion batteries typically comprise two components that participate in electrochemical reactions to produce energy: an anode and a cathode. The lithium ion batteries produce energy through electrochemical reactions occurring between the anode and cathode. Typically both the anode and cathode are made of materials into which, and from which, lithium ions can intercalate and de-intercalate. During battery discharge, lithium ions de-intercalate from the anode material and migrate to the cathode into which they insert. During a charging cycle, the opposite reaction occurs, i.e., lithium ions are extracted from the cathode material and migrate back to the anode where they reinsert.

A conventional lithium ion battery typically has a graphite anode. Other conventional anode materials include lithium alloys, metal oxides, silicon, tin, and others. The cathode typically is a lithium transition metal oxide, e.g., lithium cobalt oxide ($LiCoO_2$). Other common cathode materials include $LiMn_2O_4$, $LiFePO_4$, $LiNiO_2$, and others. Common electrolytes include lithium salts (e.g., $LiPF_6$, $LiBF_4$, $LiClO_4$) dissolved in organic solvents (e.g., ethylene carbonate, propylene carbonate, dimethyl carbonate, ethyl methyl carbonate, and combinations thereof).

In a conventional lithium battery with a graphite anode, charging occurs when lithium ions migrate from the cathode (e.g., $LiCoO_2$) to the graphite anode, as shown in the representative forward reactions below:

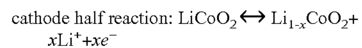

cathode half reaction: $LiCoO_2 \leftrightarrow Li_{1-x}CoO_2 + xLi^+ + xe^-$

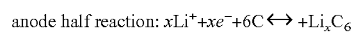

anode half reaction: $xLi^+ + xe^- + 6C \leftrightarrow +Li_xC_6$

Discharge occurs when the reactions run in reverse.

Lithium metal alloy-based anodes for lithium ion batteries often exhibit poor cycle life and fast capacity fade that results from electrode cracking and pulverization due to the high volume change associated with lithium intercalating into the anode and de-intercalating from the anode during the charge and discharge cycles, respectively. Disclosed herein are embodiments of macroporous substrates suitable for use as anode materials and macroporous composite anodes that are capable of accommodating the volume change without cracking or other such damage, resulting in a combination of better cycle life and capacity than currently available lithium metal alloy-based anodes.

III. Macroporous Substrates and Anodes

Macroporous substrates and macroporous composite anodes prepared by embodiments of the disclosed methods demonstrate satisfactory cycling, discharge capacity, and/or calendar life when placed into lithium ion batteries due to improved structural and/or mechanical stability during charge and discharge. Suitable uses of the disclosed macroporous composite anodes include commercial electronics, military and electrical vehicle applications.

The prepared macroporous substrates may be in the form of a macroporous metallic sheet that is appropriately sized for use as a current collector in a battery, e.g., a lithium ion battery. In particular embodiments, the macroporous substrate is a macroporous sheet of copper, nickel, or a combination thereof. In some embodiments, a second metal or a metallic alloy is electrodeposited onto the macroporous substrate, resulting in a macroporous anode.

The prepared macroporous composite anodes comprise a substrate metal (e.g., copper, nickel, or a combination thereof) and an anode active material that participates in the reaction occurring at the anode. The anode active material may be a metal (e.g., a pure metal, metal oxide, metal alloy, or a combination thereof). Examples of anode active materials include, without limitation, tin, tin alloy, tin oxide, cobalt oxide, iron oxide, manganese oxide, chromium oxide, vanadium oxide, silicon, silicon oxide, titanium dioxide, aluminum and combinations thereof. Embodiments of the macroporous composite anodes have anode active material dispersed throughout the macroporous structure. In other words, the active anode material is both externally and internally incorporated throughout and on the surface the macroporous structure, rather than being electrodeposited solely onto the surface of a macroporous metal substrate. FIG. 1 illustrates a cross-section of a macroporous composite anode 10 prepared by an embodiment of the disclosed methods. The anode 10 comprises an anode active material 20 dispersed throughout and on the surface of the substrate metal 30. The anode further comprises a plurality of pores 40.

As lithium ions intercalate into and de-intercalate from the anode of a lithium ion battery, an associated volume change occurs within the anode. Conventional anodes for lithium ion batteries often have poor cycle life and fast capacity fade that result from electrode cracking and pulverization due to the high volume changes that occur within the anode material during the charge and discharge cycles. For example, silicon undergoes about a three-fold volume change during the lithium intercalating and de-intercalating processes. This volume change causes severe cracking and pulverization of the electrode and leads to significant and fast capacity fade. Metallic alloys as negative electrodes for lithium ion batteries also undergo large volume change and self-pulverization of the alloy particles during charge/discharge cycling, which causes electronic disconnection of the active particles and poor electrical contact of the active material with the current collector, resulting in poor cyclability.

In contrast, the pores within the macroporous composite anodes prepared by embodiments of the disclosed methods provide space to accommodate the volume expansion and contraction of the anode active material during lithium intercalation/de-intercalation, thus providing improved structural and/or mechanical stability compared to currently available anodes. The anodes also have good cyclability and/or high capacity. For example, the anodes may have an initial charge and/or discharge specific capacity greater than 600 mAh/g, greater than 900 mAh/g, or greater than 1800 mAh/g of active material. The anodes also may have a cyclability (i.e., capability of going through multiple discharge/charge cycles) of more than 30 discharge/charge cycles, with a capacity fade of 2% per cycle.

The shape and size of an anode prepared with the disclosed macroporous materials depends on the intended use. For example, in batteries of a coin-cell type, the anode typically is a disc shape and may have a diameter of, for example, 1.4-1.5 cm. For use in batteries of a pouch-type cell, the anode usually is a square or rectangular shape, and may have, e.g., dimensions of 4 cm×4 cm or 4 cm×6 cm.

The thickness of the macroporous substrates and composite anodes prepared by embodiments of the disclosed methods can be varied depending upon desired size and capacity for lithium ion intercalation; however, in particular embodiments the thickness is less than 1,000 μm, such as less than or equal to 500 μm, or less than or equal to 100 μm. Alternatively, the thickness may be between 10 μm and 1,000 μm, 10 μm and 500 μm, or 20 μm and 100 μm.

The average pore size of the disclosed macroporous substrates or composite anodes prepared by embodiments of the disclosed methods is sufficient to accommodate the anode active material's volume change due to lithium ion intercalation. Suitable pore sizes range from 0.001 μm to 200 μm, such as 0.001 μm to 100 μm, 0.002 μm to 50 μm, or 0.005 μm to 20 μm. The pore size is determined, in part, by the particle size and nature of the pore-forming agent, loading of the pore former, binder content, and calcination and reduction conditions. For example, pores formed using carbon black typically are substantially uniform in all dimensions due to the spherical nature of the carbon black particles. In contrast graphite is a plate-like structure, leading to pores that typically have different measurements in all three dimensions. Pores formed from graphite typically have an X dimension that is elongated compared to the Y dimension, and a fairly small Z dimension. Therefore, more needle-like pores are formed in samples made with graphite, and more spherical pores are formed when carbon black is used. For a given type of pore-forming material, such as carbon black, the pore size generally increases with the particle size of the pore former. For a given set of samples with the same pore former and slurry batch composition, the pore size generally decreases as the sintering temperature increases.

The porosity of the substrate affects its mechanical strength and its ability to accommodate the volume expansions/contractions during lithium ion intercalation/de-intercalation. To tolerate a larger volume expansion of the active material, a high porosity anode is desirable because it allows more space to host the volume expansion during lithium ion intercalation into the anode active material, and the pores tend to be more likely connected to each other. Networked pore structures facilitate ionic conduction and mass transport inside the anode. Generally, the pore networking correlates with the porosity. However, the mechanical strength and integrity of the substrate decreases with increasing porosity, and the structure may not maintain mechanical integrity if the porosity is too high. Therefore, a preferred porosity is 10% to 85%, such as 20% to 70% or 30% to 60%. Porosity can be measured using Archimedes' Density, as described in the Examples.

IV. Preparation of Macroporous Substrates and Anodes

Compared to conventional methods of electrochemical deposition, embodiments of the disclosed methods generate very limited quantities of waste, generate waste that is less hazardous, utilize inexpensive starting materials, and/or have greater versatility and suitability for producing large quantities of porous composite anode sheets. Additionally, embodiments of the disclosed macroporous composite anodes are manufactured in a single process rather than by first preparing the porous substrate and then depositing the anode active material. These advantages make embodiments of the disclosed methods suitable for economically producing porous composite anode sheets on a commercial scale with much less waste than conventional electrochemical deposition methods. In general, embodiments of the disclosed methods produce little or no hazardous waste. During the sintering and reduction processes, the pore-forming agents, binders, solvents, plasticizers and dispersants are decomposed into primarily carbon monoxide, carbon dioxide, volatile hydrocarbons, and/or water. Some metallic foams are made commercially. However, the commercial samples typically are fragile and have large pore sizes. Advantages of the disclosed methods include the ability to produce porous metallic foams with more uniform pore structure and improved mechanical strength, allow addition of multiple components in one bath, and/or provide flexibility in tailoring the pore size, porosity and thickness.

As described in detail below, embodiments of the macroporous substrates may be formed as free-standing films by tape casting a slurry of substrate precursor (e.g., pure metal powder, metal oxide powder, metal salt, organometallic oxide, metal nitride, or a combination thereof), a pore-forming agent, and a binder dispersed in an organic solvent. Optional additives may include dispersants and/or plasticizers. The structure is made porous by removing the pore-forming agent and binder, such as by sintering the tape-cast film, producing a macroporous sheet. Any dispersants and/or plasticizers added to the slurry also are removed during the sintering process. Following sintering, a significant portion of the substrate precursor may be reduced to its elemental metal, such as by heating the macroporous sheet in a reducing atmosphere (e.g., an atmosphere comprising hydrogen, carbon monoxide, methane, or mixtures thereof). For example, at least 90%, at least 95%, or at least 99% of the substrate precursor is reduced. In particular embodiments, the substrate precursor is completely reduced. By controlling the temperature and residual oxygen content present during the reducing process, a particular oxidized metal may be fully or partially reduced, or may remain in its oxidized form. For example, if a macroporous sheet includes two metal oxides, reducing conditions may be selected such that one metal oxide is completely reduced and the other metal oxide remains oxidized. When placed into lithium ion batteries, the macroporous substrate can function as a current collector. In some embodiments, an anode active material is coated onto the porous substrate, forming a combined anode and current collector.

Alternatively, macroporous composite anodes are formed in which an anode active material is incorporated within, and dispersed throughout and on the surface of, the macroporous substrate during the manufacturing process. A slurry including a substrate metal precursor (such as a pure metal powder, metal oxide powder, metal salt, organometallic oxide, metal nitride, or a combination thereof), an anode active material, a pore-forming agent, and a binder dispersed in an organic solvent is prepared and tape cast. A porous structure is formed by removing the pore-forming agent and binder, such as by sintering the tape-cast film, to produce a macroporous sheet. The macroporous sheet is then reduced. The time period and temperature of the reduction process can be adjusted to selectively reduce just the substrate precursor or to reduce both the substrate precursor and the anode active material. For example, a slurry containing CuO as the substrate precursor and $SnO_2$ powder as an anode active material can be sintered and then selectively reduced (e.g., at 400° C. for 4 hours in a pure hydrogen atmosphere) to form a Cu/$SnO_2$ macroporous composite anode, or it can be fully reduced (e.g., at 700° C. for 10 hours in a hydrogen atmosphere) to form a Cu/Sn macroporous composite anode by varying the time period and temperature of the reduction process. Following reduction, the macroporous composite anode may be sintered again. Alternatively, the time period and temperature may be selected to concurrently reduce and sinter the macroporous sheet. A second sintering process performed after or during reduction can increase the mechanical strength of the macroporous sheet. If the second sintering step is performed after reduction, it typically is done in an inert atmosphere to prevent re-oxidation of the reduced material without further reducing any component(s) that remained oxidized during the reduction process. Typically the second sintering temperature is higher than the reduction temperature.

A. Slurry

A substrate metal precursor (e.g., a metal powder, metal oxide powder, metal salt, organometallic oxide, metal nitride or a combination thereof), a pore-forming agent, and a binder are mixed in desired ratios and dispersed in an organic solvent or mixture of solvents to form a slurry. Suitable substrate metal oxides include copper (I) oxide ($Cu_2O$), copper (II) oxide (CuO), nickel (II) oxide (NiO) and nickel (IV) oxide ($NiO_2$).

The pore-forming agent is a particulate substance or material that can be incorporated into the slurry and later removed (e.g., by sintering the dried slurry), leaving open pores. In some embodiments, carbon black, graphite, or a mixture thereof is used as a pore-forming agent. Suitable pore-forming agents include CANCARB® UltraPure N990 Carbon Black (Cancarb Ltd.), Asbury Graphite #4006 (Asbury Carbons), starches (e.g., potato starch), and polymeric particles (e.g., polystyrene beads). The choice of pore-forming agent depends, at least in part, on the pore geometry desired since the pore-former defines the shape of the void after sintering.

The binder is a material that is incorporated into the slurry and later removed (e.g., by sintering the dried slurry). The binder material may be organic, inorganic, or a mixture of organic and inorganic components. The binder facilitates processing the slurry mixture, i.e., it allows the slurry to be tape-casted into a sheet of desired thickness. The binder coats the powders in the slurry and holds the particles together in a flexible sheet after the solvents are evaporated and before the sheet is sintered and reduced. Suitable binders include BUTVAR® B-79 poly(vinylbutyral) (PVB, available from Solutia), ETHOCEL™ (ethylcellulose, Dow Chemical Company), and other polymeric materials.

The solvent enables the slurry components to be uniformly mixed and dispersed. Suitable solvents include any solvent that can dissolve the selected binder and that can be removed by evaporation, such as lower alkyl ketones (e.g., methyl ethyl ketone (MEK)), lower alkyl alcohols (e.g., ethanol, 2-propanol), and mixtures thereof. Suitable solvents will not contaminate or react with other slurry components besides the binder. Additionally, suitable solvents do not contain significant amounts of water or trace elements. In some embodiments, the solvent is a mixture of MEK and ethanol; in particular embodiments, the ratio of MEK:ethanol is 4:1 by volume.

Additional slurry components may include dispersants and/or plasticizers. For example, EMPHOS® PS-236 phosphate ester (Witco Chemical) can be used as a dispersant. The dispersant facilitates even distribution of the metal or metal oxide powder(s) throughout the slurry to produce a uniform tape. Benzyl butyl phthalate (BBP), poly(ethylene glycol) (e.g., PEG400), or dibutyl phthalate (DBP), can be used as a plasticizer in the slurry. The plasticizer breaks down at least some of the cross-linking in the selected binder, allowing less binder to be used, and again facilitating a uniform distribution of slurry components. In certain embodiments, BBP is added as a plasticizer and EMPHOS® PS-236 is added as a dispersant.

When preparing a macroporous composite anode, one or more anode active materials are added to the slurry. Suitable anode active materials include, but are not limited to, powders of tin, tin alloys, tin oxide, cobalt oxide, iron oxide, manganese oxide, chromium oxide, vanadium oxide, silicon, silicon oxide, titanium oxide, and aluminum. In some embodiments, the powders have an average particle size of less than 30 μm, less than 20 μm, or less than 10 μm.

In other embodiments, the anode active materials have particles with an average diameter of less than 1,000 nm, less than 500 nm, less than 200 nm, less than 100 nm less than 75 nm, or less than 50 nm. For example, the anode active materials may have an average particle diameter of 5-1,000 nm, 5-500 nm, 10-200 nm, 10-100 nm, or 20-50 nm. In some embodiments, using an anode active material with nanometer-sized particles results in a macroporous composite anode with improved performance. For example, the anode may have increased initial discharge capacity and/or improved capacity retention compared to an anode made with an anode active material having micron-sized particles. Without being bound by any particular theory of operation, the smaller particles may allow for increased lithium ion intercalation per unit volume of anode active material particles due to the increased surface area:volume ratio of the smaller particles.

The weight ratio of substrate metal to anode active material in the macroporous composite anode can affect both strength and performance of the anode. In general, the anode's mechanical strength is related to the relative percentage of substrate metal in the anode. The substrate metal provides the “framework” that supports the anode active material. Thus, as the weight percentage of substrate metal increases, the mechanical strength of the anode increases. An additional factor is the volume expansion that occurs as lithium ions intercalate into the anode active material. If the weight percentage of anode active material is too high, the large volume expansion that accompanies lithium ion intercalation can crack and/or pulverize the anode. However, if the weight percentage of the anode active material is too low, then the initial discharge capacity of the battery will be low because there is less anode active material into which the lithium ions can intercalate. Accordingly, the weight percentages of anode active material and substrate metal are selected to provide sufficient capacity while maintaining sufficient mechanical strength and integrity. In some embodiments, the anode active material is present in the macroporous composite anode at a concentration of less than 50 wt %, or less than 30 wt %. In certain embodiments, the anode active material is present in the macroporous composite anode at a concentration of 1 wt % to 50 wt %, 2 wt % to 30 wt %, or 5 wt % to 30 wt %, or 5 wt % to 25 wt %.

B. Tape Casting and Lamination

A free-standing film may be made by tape casting the prepared slurry of substrate metal precursor, a pore-forming agent, binder, and, optionally, anode active material, plasticizer, and/or dispersant. The slurry is tape cast by a process in which a doctor blade is used to ensure a uniform thickness of the slurry as it is spread onto a carrier film, such as silicone-coated MYLAR® (biaxially-oriented polyethylene terephthalate film). Other carriers, such as paper or glass, also can be used to cast the free-standing film. A suitable carrier is a material that allows the resulting tape-cast film to be easily peeled off. The resulting tape is allowed to dry before being removed from the caster while still attached to the carrier film. The tape is air dried overnight before further use. By spreading a thicker or thinner layer of the slurry onto the carrier film, the thickness of the resulting tape can be varied. In some disclosed embodiments, the tape is 25-30 μm thick after drying.

Figure 2:
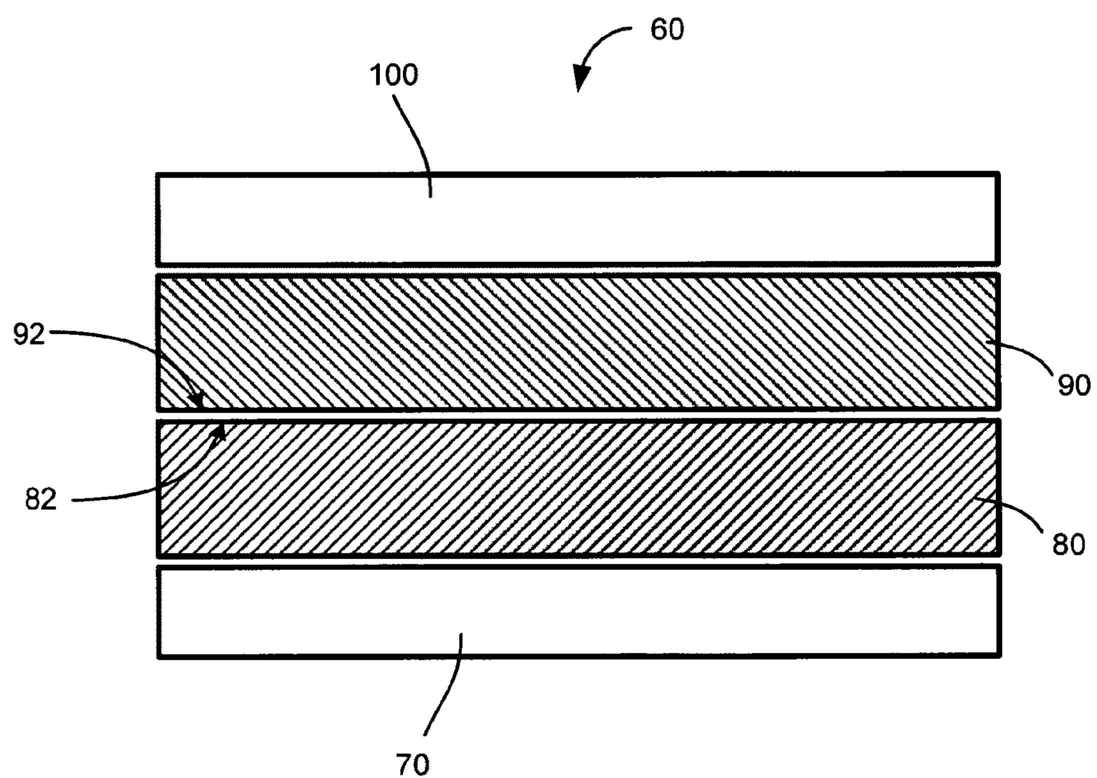
FIG. 2 illustrates a laminate structure made by one embodiment of the disclosed methods.

In some embodiments, a single layer of dried tape is removed from the carrier film and then sintered and reduced to form a macroporous composite substrate or anode. In other embodiments, a laminate structure including two or more layers is prepared to provide a more uniform macroporous substrate. In such embodiments, the dry tape is cut into pieces of the desired size and then laminated to form a laminate structure 60, as shown in FIG. 2. The cut pieces of tape are removed from the casting carrier film and placed onto a support film 70. The support film is a thin, flexible material that will not stick or bond to the tape during the lamination process. In some embodiments, support film 70 is a piece of silicone-coated polyethylene terephthalate film, such as MYLAR®. A first layer 80 of tape may be placed with the “cast side” 82 facing away from the support film 70. The “cast side” of the tape is defined as the tape surface facing or on the carrier film during casting and drying, while the “air side” of the tape is the opposing surface facing away from the carrier film. The “cast side” results in a much smoother surface than the “air side.” A second layer 90 is placed with its “cast side” 92 facing toward the first layer 80 (“cast sides together”). To prepare thicker samples with more than two layers of tape, all layers are stacked with the “cast side” facing the “air side” of the layer below (not shown). In this case, the “air side” of the first layer faces away from the silicone-coated polyethylene terephthalate film.

After all of the layers are stacked, the top layer is covered with another piece of support film 100. The entire construct is placed onto a sheet of a polysiloxane polymer, (e.g., silicone rubber) and inserted into a vacuum bagger. A vacuum is applied to remove any air trapped between layers, and stabilize the construct by inhibiting the ability of layers to shift around during lamination. Each construct is passed through a laminator three times while in the vacuum bag, and then removed from the vacuum bag. The laminate structure 60 is removed from the polysiloxane polymer sheet after lamination. Support films 70, 100 are removed just before sintering and reducing the laminated structure.

C. Sintering and Reduction

The pore-forming agent and binder are removed from the resulting tapes or laminates. The pore-forming agent and binder may be removed by sintering the tape or laminate in an oxidizing environment, such as air or an $O_2/N_2$ atmosphere. However, if the slurry is prepared from metal powder instead of a metal compound, sintering typically is performed an atmosphere without oxygen, e.g., an argon, nitrogen or nitrogen/hydrogen atmosphere, to prevent metal oxidation. The sintering process decomposes and removes the pore-forming agent, binder, any residual solvent that remains after the tape is dried and laminated, and any dispersant and/or plasticizer from the tape or laminate, leaving metal/metal compounds, as discussed below. The decomposition products include carbon monoxide, carbon dioxide, water, and/or hydrocarbons. Sintering is performed at a temperature that is at or above the activation temperature of the substrate precursor. The activation temperature is the temperature at which atoms or molecules of the substrate precursor have sufficient kinetic energy for the sintering process to occur. Sintering is performed for a period of time sufficient to decompose and remove the pore-forming agent, binder, and any dispersant and/or plasticizer. Thus, sintering is performed a temperature at or above the activation temperature of the substrate precursor and for a period of time sufficient to obtain a desired macroporous structure. In general, if the sintering temperature is increased, the sintering time may be decreased. Conversely, if the sintering temperature is decreased, the time is increased. Within these constraints, the sintering time and temperature can be varied to tailor the sintered substrate properties. For example, sintering at a higher temperature and/or longer time produces a substrate having increased mechanical strength but decreased porosity. Sintering at a lower temperature and/or shorter time produces a substrate with less mechanical strength but increased porosity. In some disclosed embodiments, the sintering process is performed at 1,000° C. for 1-3 hours in an ambient air atmosphere. Particular conditions are provided in the working examples. Sintering removes the pore-forming agent, binder, any residual solvent, and any optionally added dispersant and/or plasticizer, thus forming macropores within the tape or laminate structure, and producing a monolithic, macroporous structure. In some embodiments, at least 90%, at least 95%, or at least 99% of the pore-forming agent, binder, residual solvent, and any dispersant and/or plasticizer are removed. In certain embodiments, the macroporous structure is devoid of pore-forming agent, binder, solvent, and any optionally added dispersant and/or plasticizer.

After sintering, the macroporous structure or macroporous laminate structure may be reduced and, in some embodiments, sintered further to form a macroporous metallic substrate or macroporous composite anode. Reduction is performed in a reducing gas environment that is capable of reducing a metal oxide precursor to its metallic state. Suitable reducing gas environments include methane, carbon monoxide, hydrogen, and mixtures thereof. In some embodiments, the reducing gas environment also includes one more inert gases, e.g., argon. In other embodiments, a high-vacuum environment may be used to reduce a metal oxide to its metallic state. In certain embodiments, reduction is performed in a hydrogen-containing atmosphere, such as pure hydrogen or non-flammable hydrogen/argon (e.g., 2.75% $H_2/Ar$), and reduces metal compounds to their respective metals. The reduction temperature and time period can be chosen to selectively reduce the substrate precursor while leaving the anode active material in its oxidized state. In other embodiments, the reduction temperature and time are selected to reduce both the substrate precursor and the anode active material. Reduction additionally may contribute to the porosity of the macroporous metallic substrate or macroporous composite anode. For example, reduction of a metal oxide in a hydrogen-containing atmosphere produces $H_2O$ vapor. Formation and removal of the $H_2O$ vapor creates additional porosity in the reduced substrate or anode.

In some embodiments, a second sintering process is performed concurrently with or after reduction of the substrate precursor and/or anode active material. Without being bound by any particular theory of operation, the reduction process may introduce internal stresses and defects into the macroporous substrate or anode structure. Such stresses and defects can disrupt connections, e.g., electrical connections, between atoms or molecules of the anode active material. The second sintering process facilitates release of internal stresses and removal of defects introduced during reduction. Additionally, the second sintering process may produce a more connected network of anode active material as the atoms or molecules gain sufficient kinetic energy to move and form electrical connections with one another. Thus, in some embodiments, the second sintering process produces a macroporous composite anode with increased specific capacity.

In some embodiments, reduction and sintering are performed in a hydrogen-containing atmosphere. In certain embodiments, reduction may be performed first at a lower temperature (e.g., <400° C.) and sintering is then performed at a higher temperature (e.g., >400° C.). In other embodiments, reduction and sintering may occur in a single thermal process. For example, reduction may occur as the temperature is being increased to a temperature suitable for sintering.

In some embodiments, reduction and sintering are performed sequentially. In these embodiments, the substrate is reduced in a hydrogen-containing atmosphere at a first temperature, and then is sintered in an inert atmosphere at a second, higher temperature. Sintering can be performed, for example, in a pure nitrogen atmosphere or a mixed nitrogen/hydrogen atmosphere. The hydrogen content of the reducing and/or sintering atmosphere can be varied to selectively reduce one or more metal compounds (e.g., metal oxides) to their respective metal(s).

Reduction and/or sintering typically are performed at 400-1400° C. for several hours, e.g., 4-10 hours. In particular examples, reduction and/or sintering is performed at 400° C. for 4 hours, 500° C. for 4 hours, 600° C. for 10 hours, 700° C. for 8 hours, 700° C. for 10 hours, 800° C. for 6 hours, 800° C. for 10 hours, 900° C. for 5 hours, 1000° C. for 10 hours, and/or 1400° C. for 10 hours. As will be understood by a person of ordinary skill in the art, the temperature and time can be selected to provide a temperature at or above the temperature determined by the thermodynamic equilibrium of the desired reduction reaction and to provide sufficient time for stoichiometric reduction to occur.

In one embodiment, a copper macroporous substrate is prepared by sintering a copper oxide laminate at 1,000° C. for an hour in an air atmosphere, followed by reduction in a hydrogen/argon atmosphere at 500° C. for two hours. In another embodiment, copper-tin oxide macroporous composite anodes are prepared by sintering $CuO/SnO_2$ laminates at 1,000° C. for an hour in an air atmosphere, followed by reduction in hydrogen at 400° C. for 4 hours and sintering in a nitrogen atmosphere at 700° C. for 10 hours. The limited time and temperature of the reduction process selectively reduces CuO to copper, while leaving $SnO_2$ in its oxidized state. In yet another embodiment, copper-tin macroporous composite anodes are prepared by sintering $CuO/SnO_2$ laminates at 1,000° C. for an hour in an air atmosphere, followed by reduction in hydrogen at 700° C. for 10 hours. The increased time and temperature of the reduction process reduces both CuO and $SnO_2$ to their respective metals.

V. Examples

The working examples utilized the following general procedures:

Tape casting—A slurry of substrate metal or metal oxide, pore-forming agent, binder, optional anode active material, dispersant, and plasticizer was tape cast onto a silicone-coated MYLAR® carrier film using a 20-cm wide doctor blade onto a 2.5-m long tape caster. The gap between the doctor blade and the carrier film was 5 mil (127 μm), resulting in a tape that was approximately 28 μm thick after drying. The tape caster was operated at a rate of approximately 10 cm/s. The resulting tape was allowed to dry before being removed from the caster, still attached to the carrier film. The tape was air dried overnight at ambient temperature before use.

Lamination—The dried tape was cut into pieces of the desired size. A first layer of tape was removed from the carrier film and placed with cast-side up onto a piece of silicone-coated MYLAR®. One or more additional layers of tape were removed from the carrier film and placed cast-side down onto the first layer. The stacked layers were covered with another piece of silicone-coated MYLAR®. The entire stack was placed onto a sheet of silicone rubber (⅛-inch (3 mm) thick), and inserted into a vacuum bagger (e.g., Minipack-Torre MVS-45, Minipack America, Orange, Calif.). A vacuum was applied to remove any air trapped between layers, and stabilize the construct by inhibiting the ability of layers to shift around during lamination. A ChemInstruments HL-100 hot roll laminator (ChemInstruments, Inc., Fairfield, Ohio) was used for lamination, with top and bottom roll temperatures of 275° F. (135° C.) each, speed set to ~0.75 on the scale, and a NIP pressure of 40 psi. Each stack was passed through the laminator three times while in the vacuum bag, and then removed from the vacuum bag. The laminated stack was removed from the silicone rubber sheet, and the Mylar was removed prior to sintering and reduction.

Determination of density and open porosity of macroporous composite anodes—Density and open porosity may be measured using Archimedes' Density. This technique provides the bulk density of a material, and can also give an estimation of the open porosity (continuous pathway to the surface such that the air trapped inside the pore can be evacuated under vacuum). The process used for determining Archimedes' Density is as follows:

1. Measure dry mass of sample.
2. Place sample in container and cover completely with ethanol.

3. Place sample with ethanol in vacuum desiccator and pull vacuum to remove air from open porosity—leave sample under vacuum for minimum of 10 minutes.
4. Remove sample from desiccator and measure mass of sample submersed (suspended mass) in ethanol (measures buoyancy due to any closed porosity—pores that are closed off from the surface of the sample and could not have air removed and back-filled with ethanol under vacuum).
5. Note temperature of ethanol bath for density correction.
6. Using a Kimwipe® XL lightly wetted with ethanol, blot the surfaces of the sample to remove excess ethanol without removing ethanol from pores of sample.
7. Immediately measure the saturated mass (mass of sample with all open porosity filled with ethanol after air was removed using vacuum).

Density was then calculated for each sample using the following formula:

$$\rho = \frac{\text{Dry Mass} - \text{Ethanol Density(corrected for Temperature)}}{\text{Saturated Mass} - \text{Suspended Mass}}$$

where ρ is bulk density of the sample and ethanol density is corrected for temperature using the formula:

$$\rho_{Ec} = \rho_{E21} - [(T_E - 21)*0.00845]$$

where:

$\rho_{Ec}$=temperature corrected density of ethanol;

$\rho_{E21}$=density of ethanol at 21° C.; and $T_E$=measured temperature (° C.) of ethanol bath.

Open porosity is calculated using the formula:

$$\text{Open Porosity (\%)} = \frac{\text{Saturated Mass} - \text{Dry Mass}}{\text{Saturated Mass} - \text{Suspended Mass}} * 100$$

Average values were obtained by running several samples (3-5) of each composition. A standard deviation (SSD) for density was also calculated and was not allowed to exceed 0.270 to ensure that the technique used remained consistent for all samples within a given composition.

Preparation of electrolytes—Battery-grade solvents ethylene carbonate (EC), dimethyl carbonate (DMC), ethyl methyl carbonate (EMC), and lithium hexafluorophosphate ($LiPF_6$, battery grade) were purchased from Ferro Corporation and used as received. Battery-grade lithium foil with a thickness of 0.5 mm was purchased from Honjo Metal, Japan. All solvent mixtures and electrolytes were prepared in an MBraun dry box filled with purified argon where the moisture and oxygen content was less than 1 ppm.

Assembly of coin-type half cells—The macroporous composite electrode sheet was die-cut into circular discs having a diameter of 1.43 cm and an area of 1.98 $cm^2$, dried at about 80° C. under vacuum overnight, and then stored inside a dry box filled with purified argon. Type 2325 coin cell kits were purchased from Canada National Research Council (CNRC). Cells were constructed by 1) placing a piece of macroporous composite electrode disc onto the cell pan; 2) adding two pieces of CELGARD® 2500 separator (diameter 1.90 cm); 3) adding 100 μL electrolyte onto the separator; 4) adding a lithium foil disc (diameter 1.59 cm and thickness 0.5 mm), a stainless steel spacer with a thickness of 0.25 mm and a stainless steel Belleville washer-style spring from CNRC; and 5) adding a coin cell cover with a polypropylene gasket. The whole assembly was crimped inside the dry box using a pneumatic coin cell crimper purchased from CNRC at a gas pressure of 200 psi.

Cell testing—The assembled coin cells were tested on an Arbin BT-2000 Battery Tester. The cells were first discharged to 0.02 V vs. $Li/Li^+$ from the open-circuit-voltage and then charged to 2.0 V, at a discharge and charge current of C/10 rate. The cycling performance of the cells was evaluated between 0.02 and 2.0 V.

Example 1

Copper Macroporous Substrate

A copper macroporous substrate was prepared from the following reactants: CuO (<5 μm, Sigma Aldrich), CANCARB® UltraPure N990 carbon black (Cancarb Ltd.), EMPHOS® PS-236 (a dispersant available from Witco Chemical), BUTVAR® B-79 poly(vinylbutyral) ("PVB," a binder available from Solutia Inc.), benzyl butyl phthalate ("BBP," a plasticizer available from Alfa Aesar), ethanol, and methyl ethyl ketone ("MEK").

With reference to Table 1, the following components were combined to form a slurry: 60.67 g CuO, 4.30 g carbon black, 0.62 g PS-236, 5.17 g PVB, 3.51 g BBP, 4.71 g ethanol, and 19.33 g MEK. The slurry was tape cast and dried overnight.

The slurry was tape cast to produce a film having a thickness of 28 μm. The resulting tape was allowed to dry while attached to the carrier film, and was dried overnight before use. Two layers of film were stacked together and laminated.

The free-standing, laminated film was sintered, and reduced under the following conditions: Sintering in air was performed by increasing the temperature at a rate of 0.5° C./min to 190° C. The temperature was held for 2 hours and then increased at a rate of 0.5° C./min to 450° C. The temperature was held at 450° C. for 1 hour and then increased at a rate of 3° C./min to 1000° C. The temperature was held at 1000° C. for 1 hour and then decreased at a rate of 5° C./min to room temperature (RT). Reduction was performed in a tube furnace—The tube was initially purged for 15 min. in $N_2$ (500 sccm) at RT. The gas flow was then switched to 2.75% $H_2$/Ar ("non-flammable hydrogen") flowing through the tube. The tube was heated at a rate of 2° C./min to 500° C. The temperature was held at 500° C. for 2 hours and was then decreased at a rate of 2° C./min to RT. $H_2$ was stopped, and the tube was purged for 15 min. in pure $N_2$ before opening. The reduction run used a mineral oil-filled bubbler on the tube outlet to minimize oxygen back-streaming into the furnace.

Figure 3:
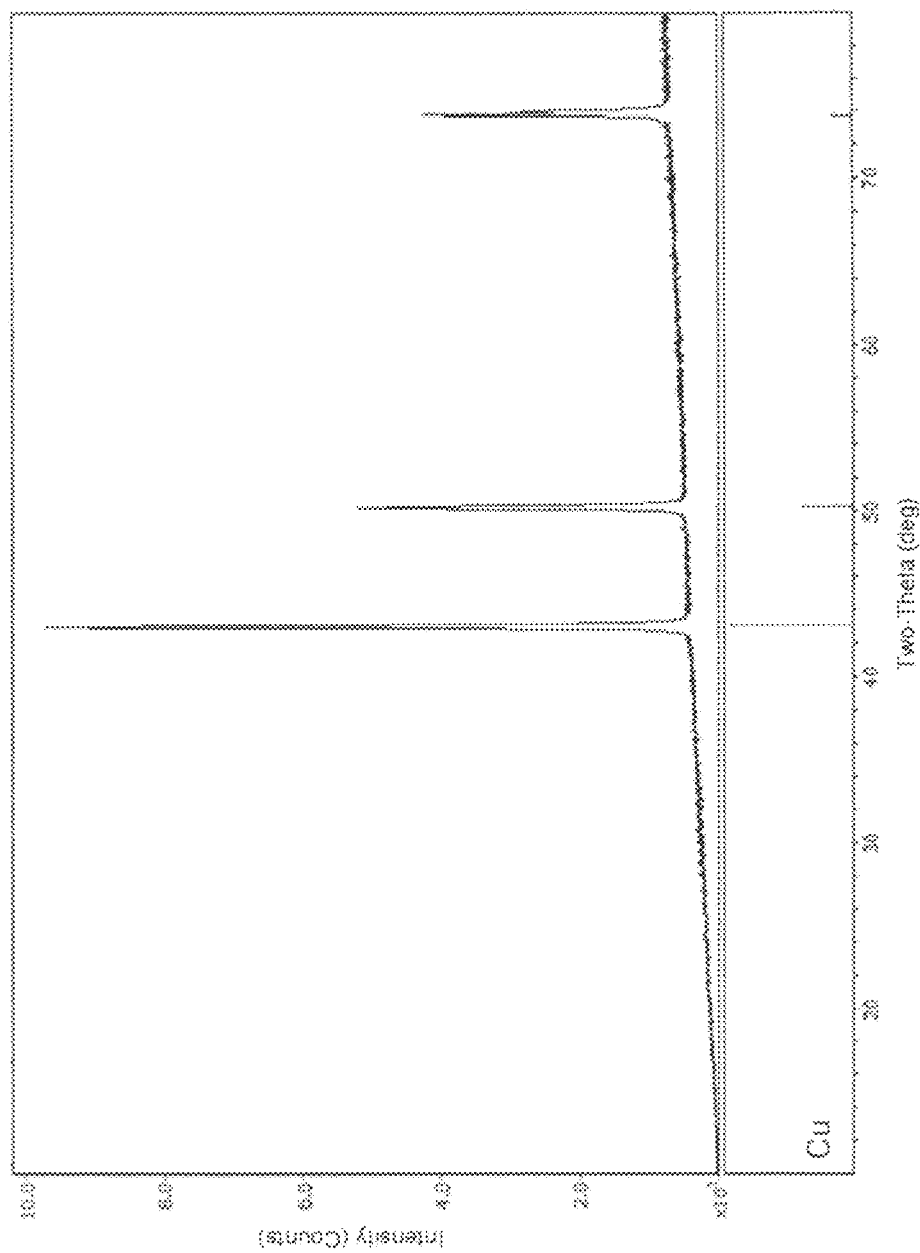
FIG. 3 is an XRD pattern of a macroporous copper substrate made by one embodiment of the disclosed methods.

FIG. 3 shows the X-ray diffraction (XRD) pattern of the resulting macroporous copper substrate. The XRD pattern indicates that the porous sheet is pure copper; only copper peaks are seen with no evidence of carbon or copper oxide peaks. Table 2 compares the density and porosity of the copper sheet before and after reduction from copper oxide to copper.

TABLE 2

Density and porosity of copper sheet before and after reduction

| Sample | Sintering Conditions | Bulk Density (g/cc) | Open Porosity (%) |
|---|---|---|---|
| Oxide state | 1000° C./1 h in air | 4.24 | 35.0% |
| Reduced state (after sintering in air) | 100° C./1 h then 500° C./2 h in 2.75% $H_2$/Ar | 3.67 | 56.5% |

Figure 4A:
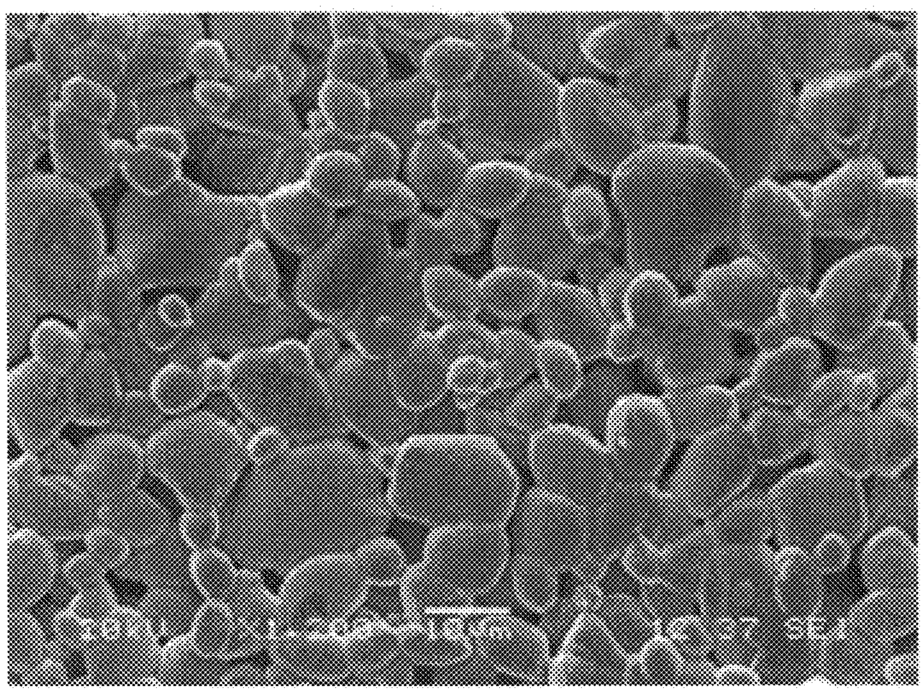
FIGS. 4A-4D are SEM photographs of the surface of a macroporous copper sheet made by one embodiment of the disclosed methods. The photographs were taken before (4A, 4B) and after (4C, 4D) reduction.
Figure 4B:
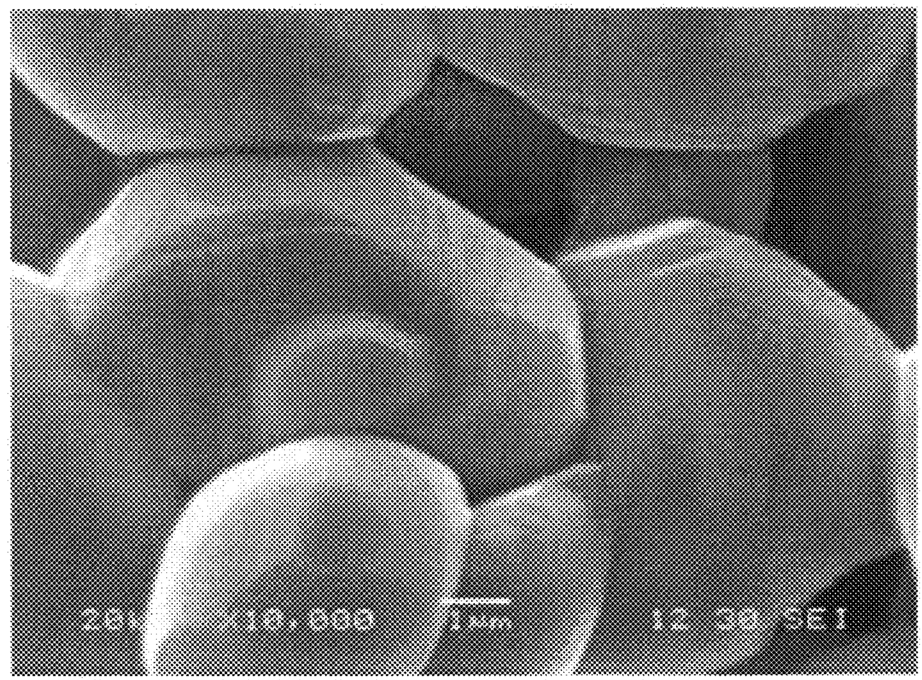
Figure 4C:
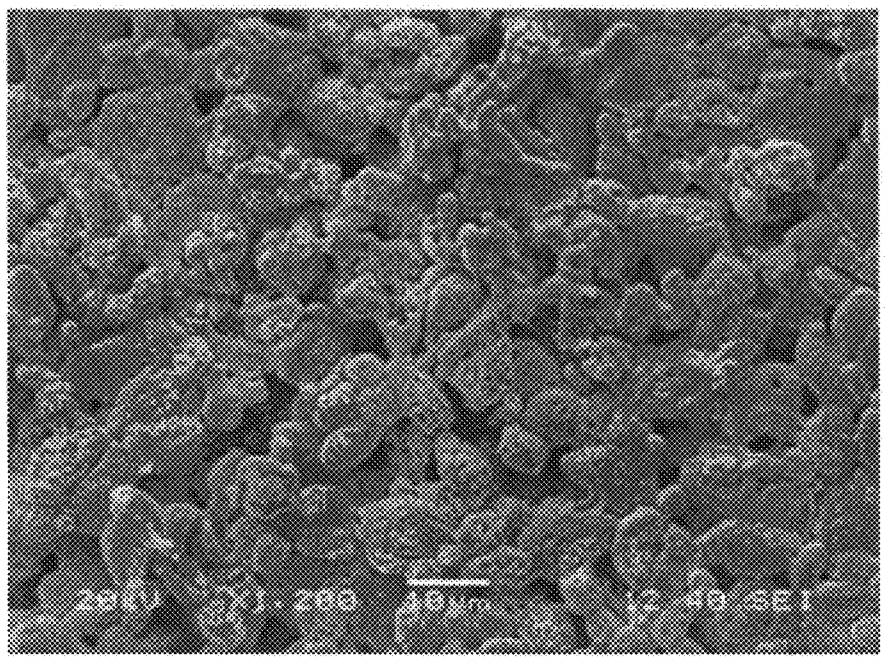
Figure 4D:
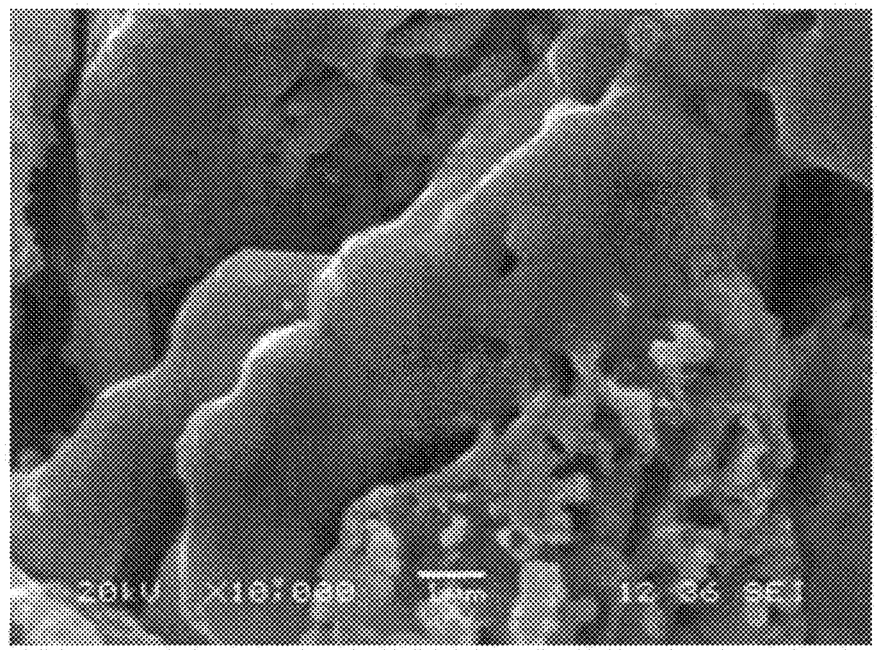
Figure 5A:
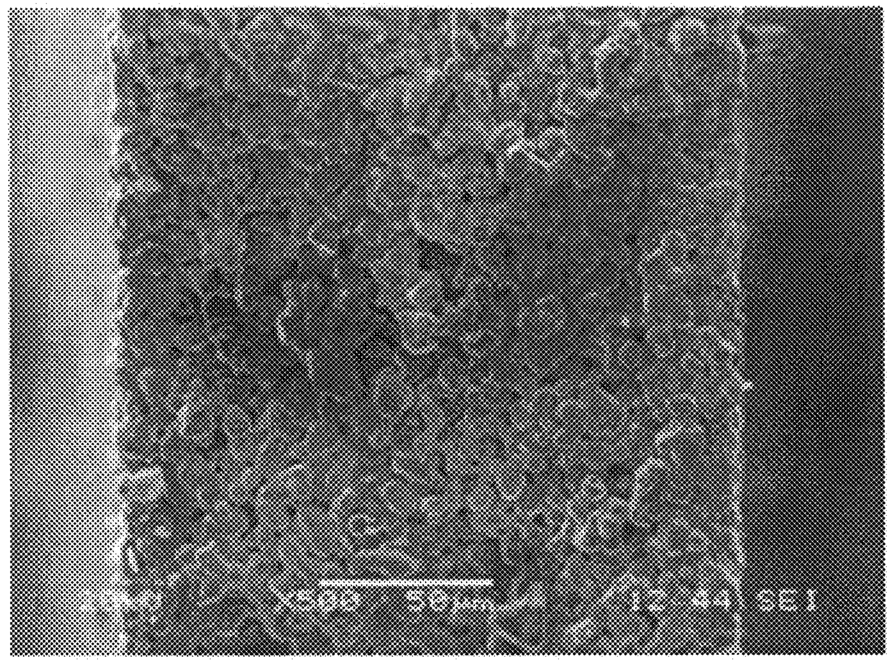
FIGS. 5A-5D are SEM photographs of a fractured surface of a macroporous copper sheet made by one embodiment of the disclosed methods. The photographs were taken before (5A, 5B) and after (5C, 5D) reduction.
Figure 5B:
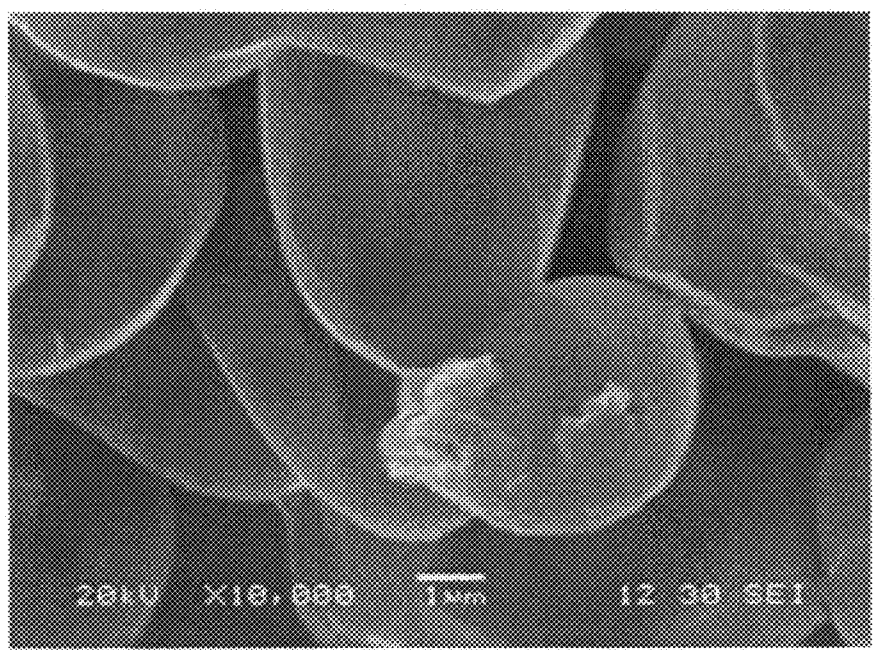
Figure 5C:
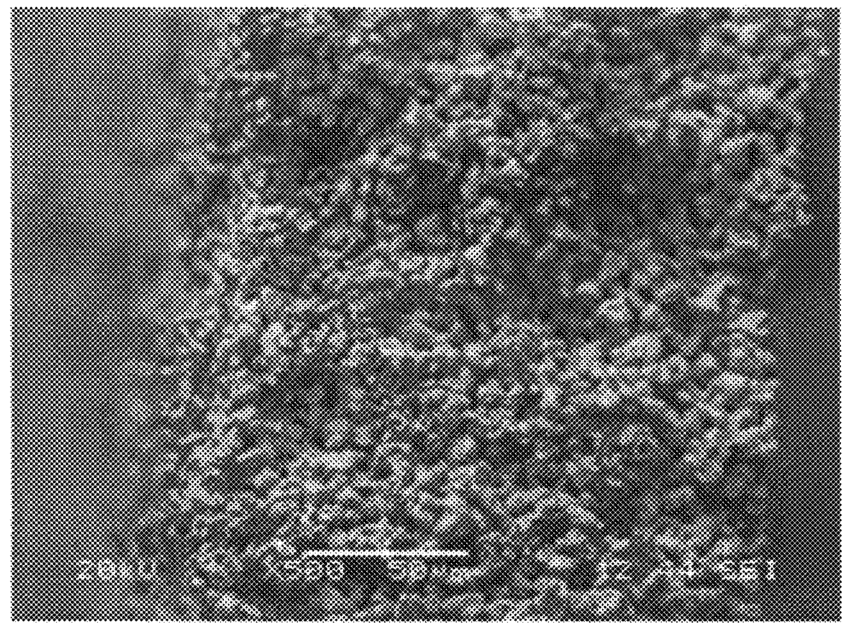
Figure 5D:
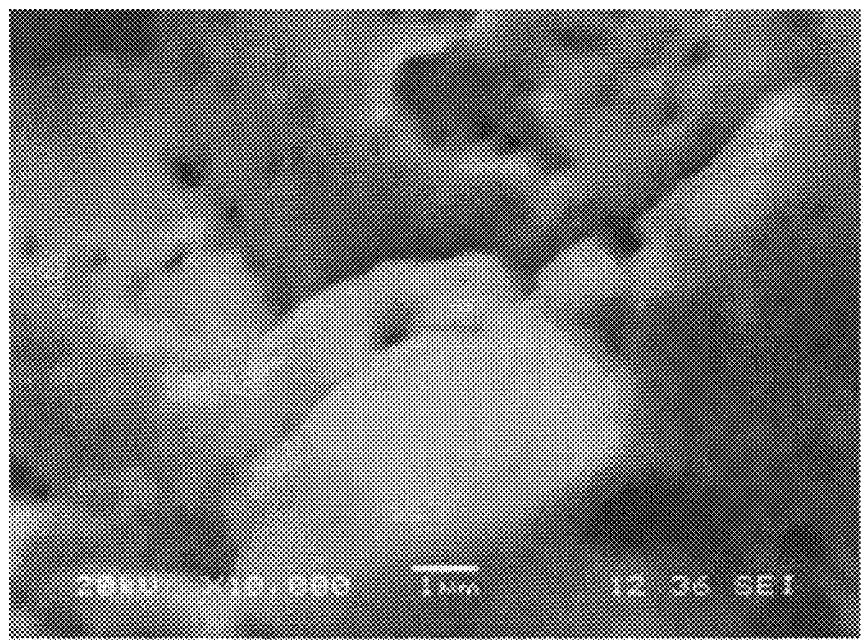

FIGS. 4A-4D are scanning electron microscope (SEM) photographs of the copper sheet's surface after sintering but before reduction (FIGS. 4A, 4B) and after reduction (FIG. 4C. 4D). The magnification of FIGS. 4A and 4C is 1,200 times; the magnification of FIGS. 4B and 4D is 10,000 times. FIGS. 5A-5D are SEM photographs of a fractured surface of the macroporous copper sheet after sintering but before reduction (FIGS. 5A, 5B) and after reduction (FIGS. 5C, 5D). The magnification of FIGS. 5A and 5C is 500 times; the magnification of FIGS. 5B and 5D is 10,000 times.

In this example, silicon was then coated onto the macroporous copper substrate by sputter coating. The 1-micron-thick Si coatings were deposited on 9/16-in (1.4 cm) diameter Cu foil or macroporous Cu discs using RF (radio frequency) magnetron sputtering in a 28-inch box coater. The sputtering source used was a water-cooled 3-inch diameter Mighty Mak™ cathode (US, Inc.) mounted in the bottom of the chamber. The target material was 3-inch diameter by 0.375-inch-thick silicon. An ion source (Commonwealth Mark II) operating at 1.1 A and 164V was used to ion clean substrates for 5 minutes prior to film deposition. The coating chamber was configured for single planetary rotation of the substrates above the Si target. The substrates were mounted flush on the surface of an 8-in diameter Al substrate holder using clips. The distance between the Si target surface and substrates was 3.5 inches (8.9 cm). The ultimate chamber pressure was $6\times10^{-7}$ Torr after an overnight pump-down. A shutter was installed between the target surface and the substrates. The Si target was cleaned in 100% argon for 5 minutes prior to start of deposition. After cleaning the target, the shutter was rotated out of the way to allow deposition on the substrates. The sputtered coatings were deposited in ambient temperature at chamber pressure of 1.5 mTorr using 20 sccm of 100% Ar. An ENI Power Systems RF power supply (Model OEM-6) operating at 150 W/174V was used. These deposition conditions and chamber configuration resulted in a Si deposition rate of ~0.87 microns/hr.

Figure 6:
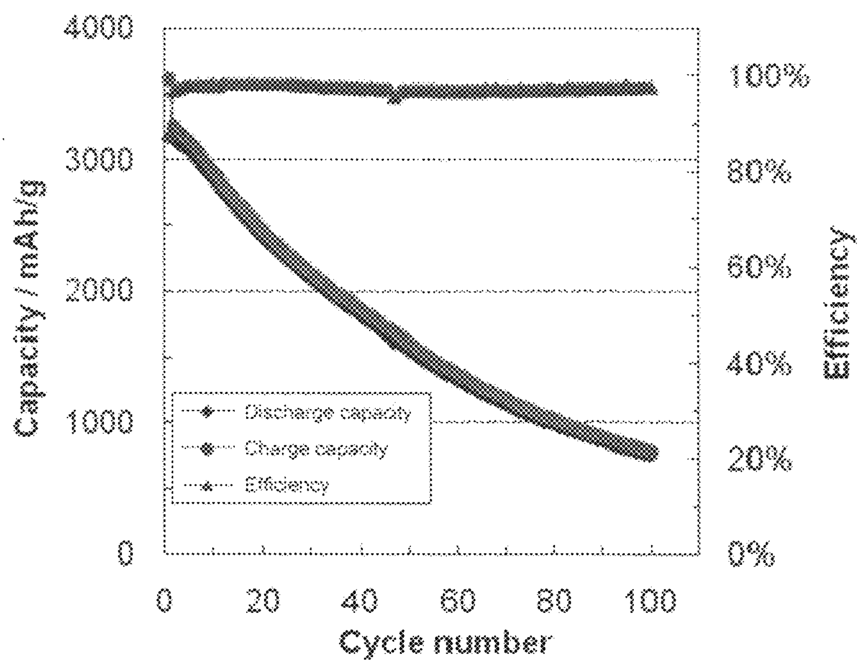
FIG. 6 is a graph of charge/discharge capacity and efficiency for a battery containing a silicon-coated macroporous copper anode made by one embodiment of the disclosed methods.

A coin-type half cell with the silicon-coated copper substrate as an anode was prepared and tested using the general procedures described above. The voltage cutoffs were 1.2 V after charge and 0.02 V vs. $Li/Li^+$ after discharge at a charge and discharge rate of C/10 (i.e., 10 hours charging and 10 hours discharging rate). FIG. 6 shows the performance of the silicon-coated macroporous copper substrate in a coin-type half cell. The battery had initial charge and discharge specific capacities of ~3,500 mAh/g Si, which dropped to ~750 mAh/g after 100 charge/discharge cycles, as measured by an Arbin BT-2000 Battery Tester. The Coulombic efficiency (defined as the percentage of discharge capacity compared to charge capacity) was steadily maintained at 95% over the 100 cycles.

Figure 7:
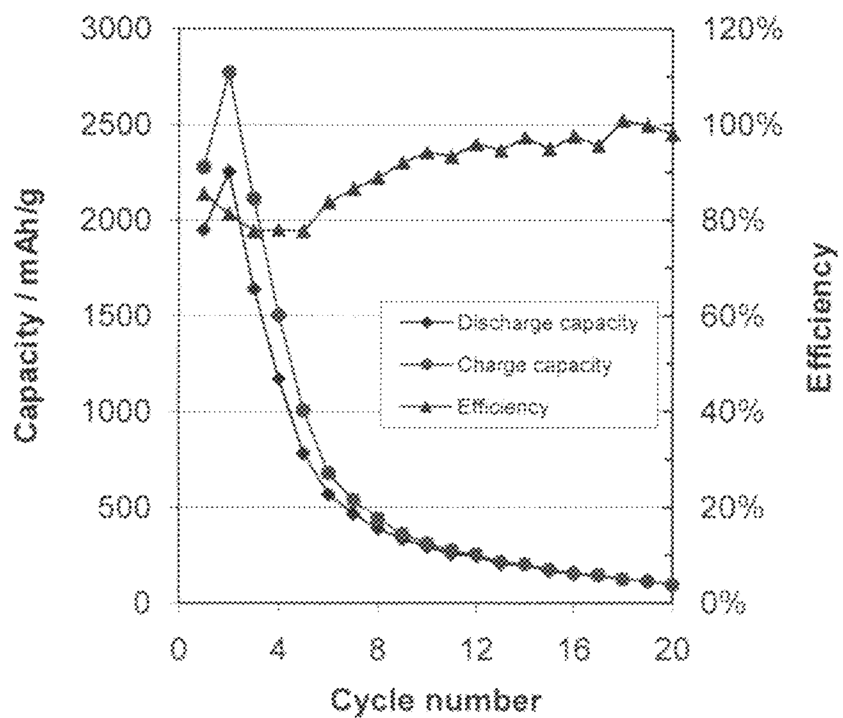
FIG. 7 is a graph of charge/discharge capacity and efficiency for a battery containing a silicon-coated copper foil anode.

As a comparison, the battery performance of silicon coated onto a copper foil substrate is shown in FIG. 7. The copper foil substrate had a thickness of 1 mil, or 25 μm. The silicon/copper foil battery initially had a charge capacity of ~2,800 mAh/g and a discharge capacity of ~2,250 mAh/g. However, the charge and discharge capacities dropped to nearly zero after just 20 cycles. This comparison demonstrated that the silicon coated on macroporous copper substrate had a greatly improved discharge capacity and cycle life compared to the silicon coated on smooth copper foil.

Example 2

Copper/Tin Oxide and Copper/Tin Macroporous Composite Anodes

Copper/tin oxide macroporous composite anodes were prepared with $CuO/SnO_2$ weight ratios of 7:3, 9:1, 8:2, and 6:5, as outlined below. Each of the anodes were prepared from the following reactants: CuO (<5 μm, Sigma Aldrich), $SnO_2$ (<10 μm, Alfa Aesar), CANCARB® UltraPure N990 carbon black (Cancarb Ltd.), EMPHOS® PS-236 (Witco Chemical), BUTVAR® B-79 poly(vinylbutyral) ("Solutia Inc.), benzyl butyl phthalate (Alfa Aesar), ethanol, and methyl ethyl ketone ("MEK").

Composition 1: CuO/SnO, Ratio 7:3 by Weight

As shown in Table 3, the following components were combined to form a slurry: 42.77 g CuO, 18.30 g $SnO_2$, 4.30 g carbon black, 0.62 g PS-236, 5.17 g PVB, 3.51 g BBP, 4.71 g ethanol, and 19.33 g MEK. The slurry was tape cast and dried overnight.

Composition 2: CuO/SnO, Ratio 9:1 by Weight

As shown in Table 4, the following components were combined to form a slurry: 54.73 g CuO, 6.08 g $SnO_2$, 4.30 g carbon black, 0.62 g PS-236, 5.17 g PVB, 3.51 g BBP, 4.71 g ethanol, and 19.33 g MEK. The slurry was tape cast and dried overnight.

Composition 3: $CuO/SnO_2$ Ratio 8:2 by Weight

As shown in Table 5, the following components were combined to form a slurry: 48.66 g CuO, 12.28 g $SnO_2$, 4.30 g carbon black, 0.62 g PS-236, 5.17 g PVB, 3.51 g BBP, 4.71 g ethanol, and 19.33 g MEK. The slurry was tape cast and dried overnight.

Composition 4: $CuO/SnO_2$ Ratio 6:5 by Weight

As shown in Table 6, the following components were combined to form a slurry: 33.42 g CuO, 27.86 g $SnO_2$, 4.30 g carbon black, 0.63 g PS-236, 5.17 g PVB, 3.51 g BBP, 4.71 g ethanol, and 19.33 g MEK. The slurry was tape cast and dried overnight.

Laminate structures were formed from each of the compositions using two layers of tape.

Sintering and Reduction Conditions

Several trials were performed on compositions 1-4 with differing reduction and/or sintering conditions. All reduction runs used a mineral oil-filled bubbler on the tube outlet to minimize oxygen back-streaming into the furnace.

Trial 1: Compositions 1 and 2—Sintering in air was performed by increasing the temperature at a rate of 0.5° C./min to 190° C. The temperature was held for 2 hours and then increased at a rate of 0.5° C./min to 450° C. The temperature was held at 450° C. for 1 hour. The foregoing process is referred to hereinafter as the "standard burn-out." The temperature was then increased at a rate of 3° C./min to 1000° C. The temperature was held at 1000° C. for 1 hour and then decreased at a rate of 5° C./min to room temperature (RT). Reduction was performed in a tube furnace—The tube was initially purged for 15 min. in $N_2$ (500 sccm) at RT. The gas flow was switched to 50 sccm $H_2$, and the tube was heated at a rate of 2° C./min to 500° C. The temperature was held at 500° C. for 4 hours and was then decreased at a rate of 2° C./min to RT. $H_2$ was stopped, and the tube was purged for 15 min. in pure $N_2$ before opening.

Trial 2: Composition 1—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 600° C. The temperature was held at 600° C. for 10 hours and then decreased at a rate of 2° C./min to RT. $H_2$ was stopped, and the tube was purged for 15 min. in $N_2$ before opening.

Trial 3: Compositions 1, 2, and 3—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 400° C. The temperature was held at 400° C. for 4 hours and then decreased at a rate of 2° C./min to RT. $H_2$ was stopped, and the tube was purged for 15 min. in $N_2$ before opening.

Trial 4: Compositions 1, 2, and 3—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 500° C. (no hold), and then at a rate of 1° C./min to 700° C. The temperature was held at 700° C. for 10 hours. It was then decreased at a rate of 1° C./min to 500° C. (no hold), 2° C./min to 100° C. (no hold), and then 5° C./min to RT. $H_2$ was stopped, and the tube was purged for 15 min. in pure $N_2$ before opening.

Trial 5: Compositions 1, 2, and 3—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 400° C. The temperature was held at 400° C. for 4 hours. $H_2$ was switched off, $N_2$ (500 sccm) was flowed through the tube. The temperature was increased at a rate of 2° C./min to 500° C. (no hold) and then at a rate of 1° C./min to 700° C. The temperature was held at 700° C. for 10 hours. The temperature was then decreased at a rate of 1° C./min to 500° C. (no hold), 2° C./min to 100° C. (no hold), and then 5° C./min to RT. $N_2$ was stopped and the tube was opened.

Trial 6: Composition 4—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 400° C. The temperature was held at 400° C. for 4 hours, and then decreased at a rate of 2° C./min to RT. $H_2$ was switched off, and with $N_2$ (500 sccm) flowing through the tube, the temperature was increased at a rate of 2° C./min to 500° C. (no hold), 1° C./min to 800° C. The temperature was held at 800° C. for 6 hours, and then decreased at a rate of 1° C./min to 600° C. As soon as the temperature reached 600° C., $N_2$ was turned off, and $H_2$ (100 sccm) was flowed through tube with the temperature held at 600° C. for 10 hours. The temperature was then decreased at a rate of 1° C./min to 500° C. (no hold), 2° C./min to 100° C. (no hold), and then 5° C./min to RT. $H_2$ was stopped, and the tube was purged for 15 min. in pure $N_2$ before opening.

Trial 7: Composition 4—Sintering in air was performed by performing the standard burn-out, then increasing the temperature at a rate of 3° C./min to 1000° C. The temperature was held at 1000° C. for 1 hour and then decreased at a rate of 5° C./min to RT. Reduction was performed in a tube furnace—The tube was initially purged for 15 min. in $N_2$ (500 sccm) at RT. The gas flow was switched to $H_2$ (100 sccm), and the tube was heated at a rate of 2° C./min to 400° C. The temperature was held at 400° C. for 4 hours. $H_2$ was switched off, and with $N_2$ (500 sccm) flowing through the tube, the temperature was increased at a rate of 2° C./min to 500° C. (no hold), and then 1° C./min to 800° C. The temperature was held at 800° C. for 6 hours. The temperature was then decreased at a rate of 1° C./min to 500° C. (no hold), 2° C./min to 100° C. (no hold), and then 5° C./min to RT. $N_2$ was stopped and the tube was opened.

Cu—$SnO_2$ Macroporous Composite Anodes

Cu—$SnO_2$ macroporous composite anodes of compositions 1, 2, and 3 were prepared under the conditions of Trial 5 to produce macroporous composite Cu—$SnO_2$ anodes. Under these conditions, CuO was reduced, but $SnO_2$ was not reduced.

Figure 8:
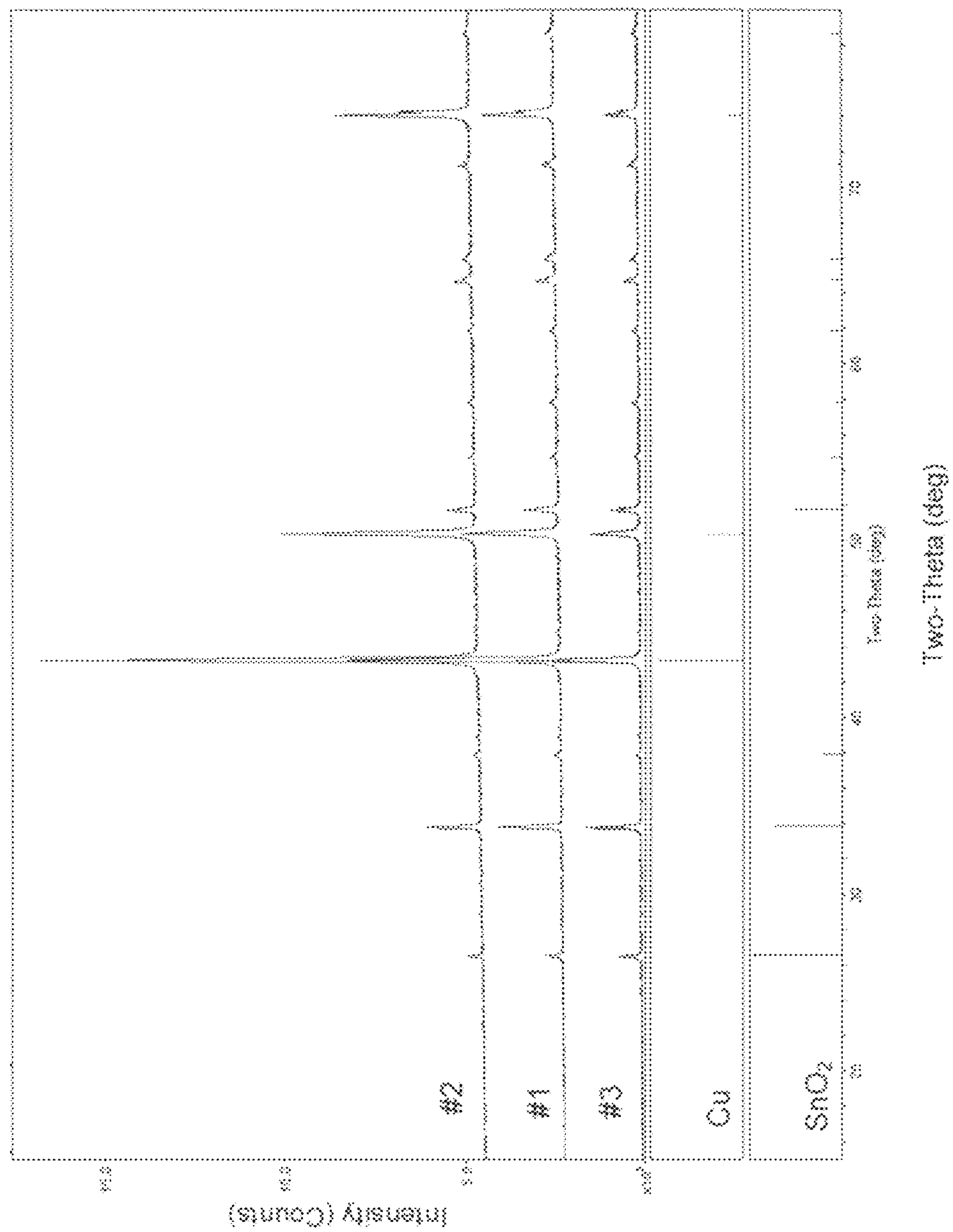
FIG. 8 is a series of XRD patterns of Cu—$SnO_2$ macroporous composite anodes made by embodiments of the disclosed methods.
Figure 9A:
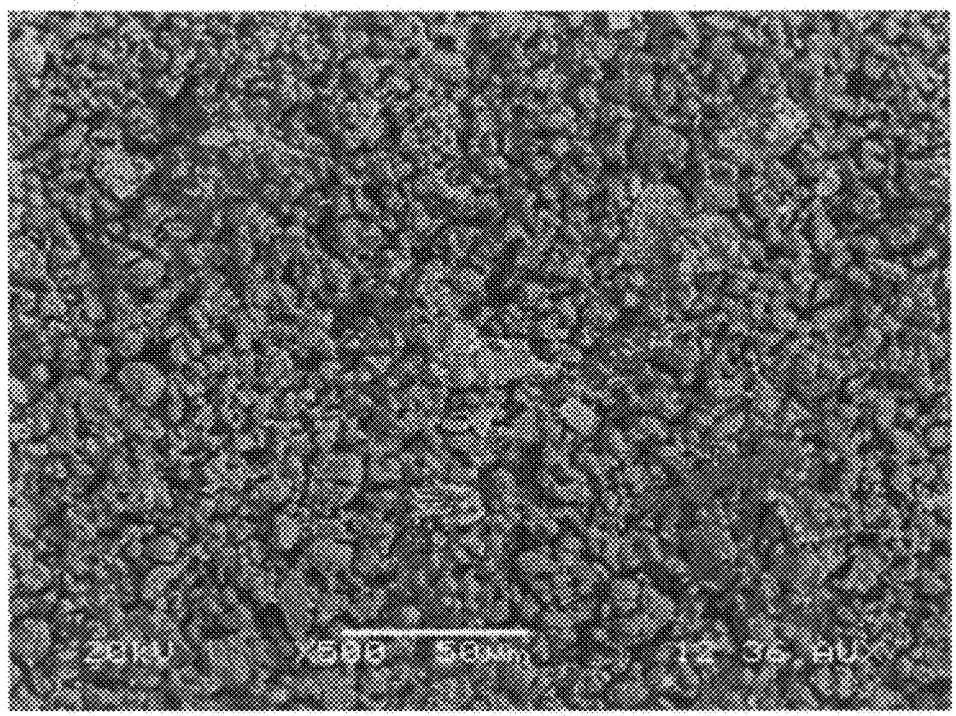
FIGS. 9A and 9B are SEM photographs of the surface of a Cu—$SnO_2$ macroporous composite anode made by one embodiment of the disclosed methods.
Figure 9B:
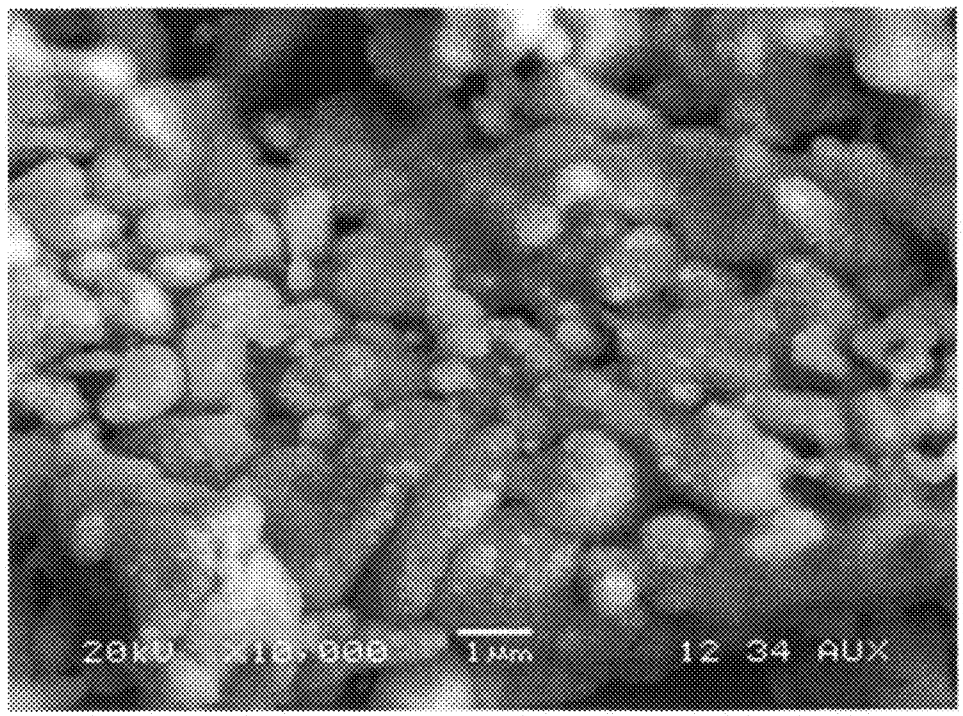

FIG. 8 shows the XRD patterns of Cu—$SnO_2$ macroporous composite anodes prepared from compositions 1, 2, and 3 as compared to XRD patterns of Cu and $SnO_2$. The XRD patterns show that Cu—$SnO_2$ macroporous composite anodes prepared from compositions 1, 2, and 3 have peaks corresponding to Cu and $SnO_2$, indicating that CuO was reduced completely and $SnO_2$ remained oxidized. FIGS. 9A and 9B are SEM photographs of the surface structure of a Cu—$SnO_2$ macroporous composite anode produced from a CuO/$SnO_2$ weight ratio of 9:1 (composition 2). The photographs have a magnification of 500 times and 10,000 times, respectively. The macroporous structure of the Cu—$SnO_2$ composite anode is clearly seen.

Figure 10:
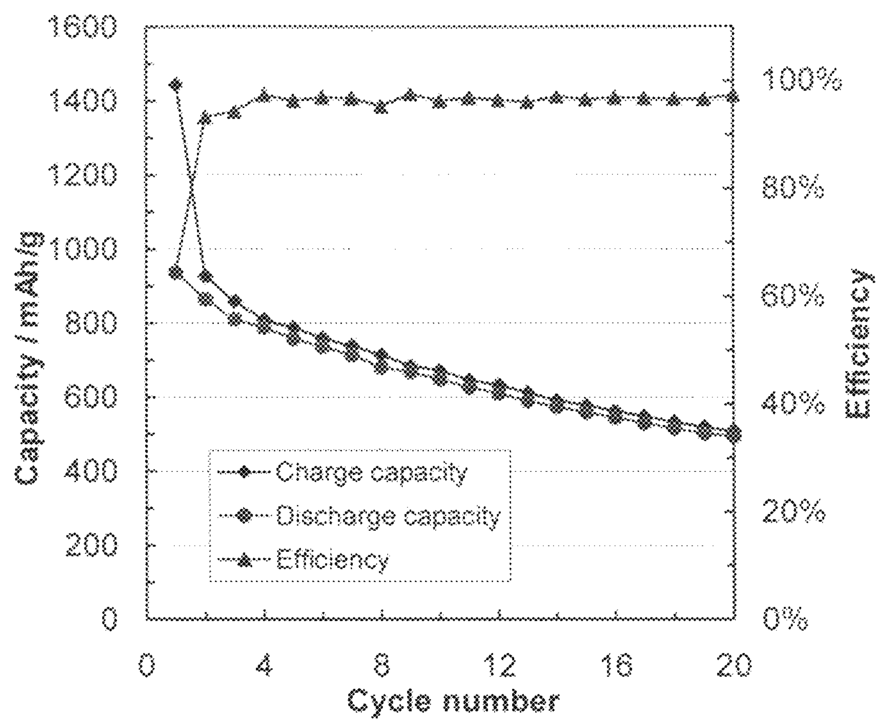
FIG. 10 is a graph of charge/discharge capacity and efficiency for a battery containing a Cu—$SnO_2$ macroporous composite anode made by one embodiment of the disclosed methods.

FIG. 10 shows the battery performance of a Cu—$SnO_2$ macroporous composite anode having an initial CuO/$SnO_2$ weight ratio of 9:1 (composition 2) in a coin-type half cell. When the battery is first charged, two reactions occur:

$$SnO_2+4Li^+ \rightarrow Sn+2Li_2O \quad (1)$$

$$Sn+4.4Li^+ \rightarrow Li_{4.4}Sn \quad (2)$$

Only reaction 2 is reversible. Thus, the initial discharge capacity was expected to be less than the initial charge capacity. The battery had an initial charge specific capacity of ~1450 mAh/g and an initial discharge specific capacity of ~925 mAh/g. The charge and discharge specific capacities both dropped to ~500 mAh/g after 20 cycles. The efficiency remained steady at around 97% after 20 cycles. The percent capacity retention of a particular cycle is calculated as the discharge capacity of that cycle compared to the discharge capacity of the first cycle. Thus, this battery had 54% capacity retention after 20 cycles.

Figure 11:
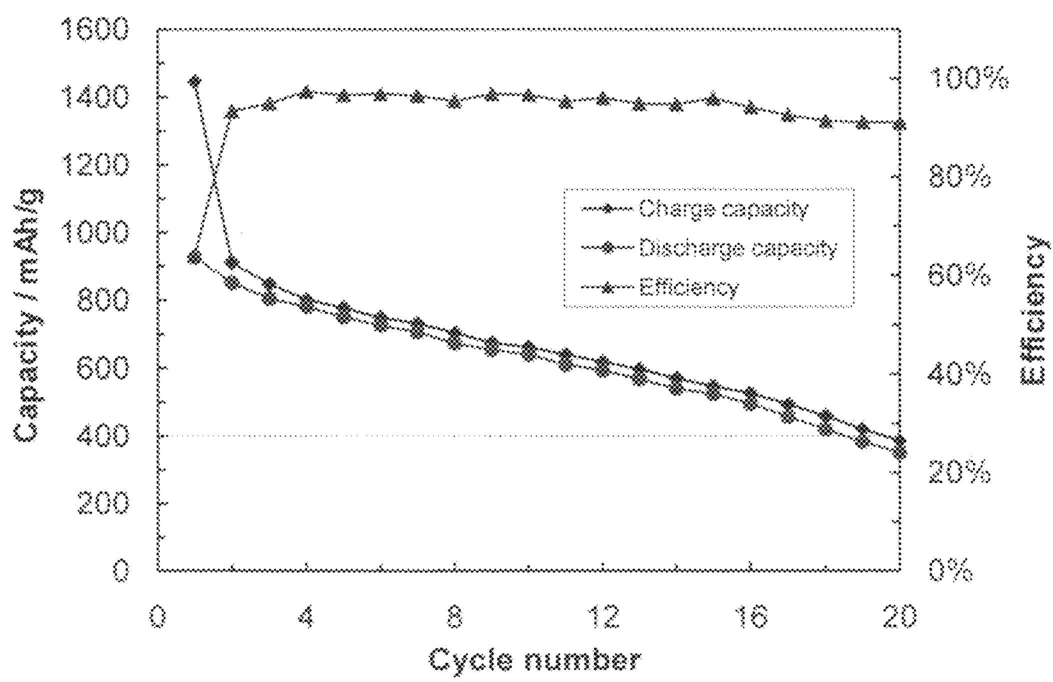
FIG. 11 is a graph of charge/discharge capacity and efficiency for a battery containing a Cu—$SnO_2$ macroporous composite anode made by another embodiment of the disclosed methods.

FIG. 11 shows the battery performance of a Cu—$SnO_2$ macroporous composite anode having an initial CuO/$SnO_2$ weight ratio of 8:2 (composition 3) in a coin-type half cell. The battery had an initial charge specific capacity of ~1450 mAh/g and an initial discharge specific capacity of ~925 mAh/g. The charge specific capacity dropped to ~400 mAh/g after 20 cycles. The discharge specific capacity dropped to ~350 mAh/g after 20 cycles. The efficiency remained steady at around 95% for 15 cycles, and then dropped to about 90% after 20 cycles. This battery had 38% capacity retention after 20 cycles.

As a comparison, $SnO_2$ powder (particle size<10 μm, Alfa Aesar) was mixed with Super P carbon black (Timcal Graphite Corp.) and poly(vinylidene fluoride) (PVDF, KYNAR® HSV900, Arkema, Inc.) at weight ratios of 7:2:1, respectively, in N-methylpyrrolidone (NMP, Aldrich) to produce a slurry. The slurry was cast onto a 25 μm thick copper foil. After evaporating the organic solvent inside a hood at ambient temperature, the coated copper foil was further dried in a vacuum oven at 80° C. overnight.

Figure 12:
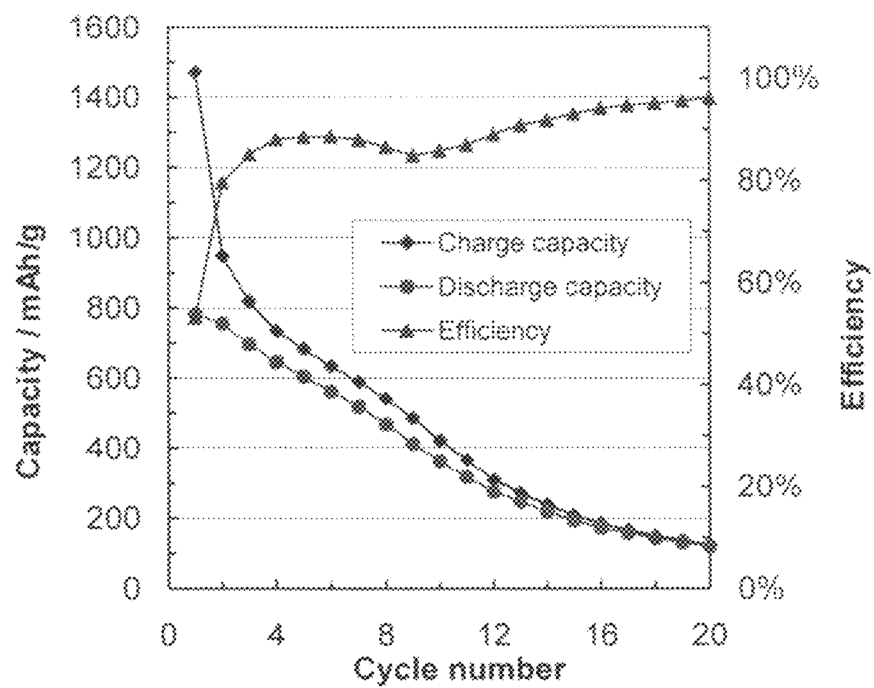
FIG. 12 is a graph of charge/discharge capacity and efficiency for a battery containing a $SnO_2$-coated copper foil anode.

The cell performance of the $SnO_2$-coated copper foil is shown in FIG. 12. Although the initial charge specific capacity of the cell was similar to those using a macroporous composite anode, the initial discharge specific capacity (800 mAh/g) was significantly lower than those using macroporous composite anodes (see, e.g., FIG. 10). Furthermore, the charge and discharge capacities both dropped to ~100 mAh/g after 20 cycles, as compared to 500 mAh/g for the macroporous composite anode having an initial CuO/$SnO_2$ weight ratio of 9:1 (composition 2). Thus, the macroporous composite anode demonstrated significantly better discharge capacity and cycle life than the $SnO_2$-coated copper foil anode.

Cu—Sn Macroporous Composite Anodes

Cu—Sn macroporous composite anodes of compositions 1, 2, and 3 were prepared under the conditions of Trial 4. Under these conditions, both CuO and $SnO_2$ were reduced to Cu and Sn, respectively.

Figure 13:
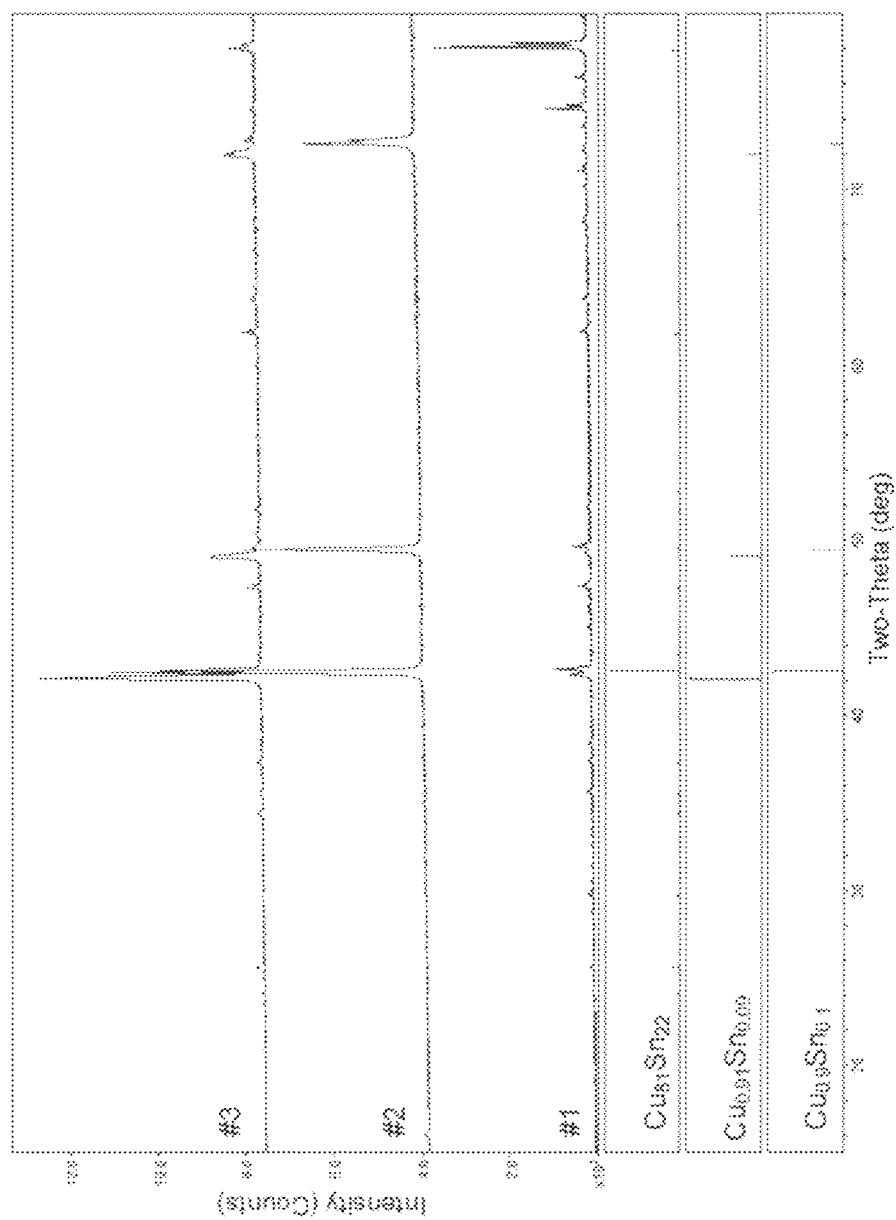
FIG. 13 is a series of XRD patterns of Cu—Sn macroporous composite anodes made by embodiments of the disclosed methods.
Figure 14A:
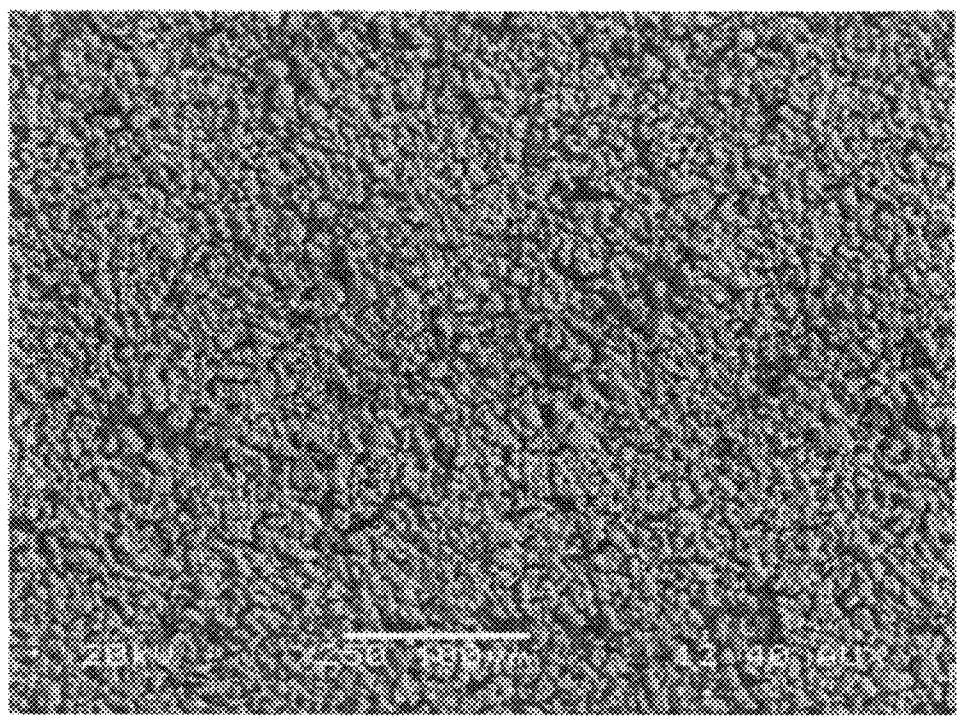
FIGS. 14A and 14B are SEM photographs of the surface of a Cu—Sn macroporous composite anode made by one embodiment of the disclosed methods.
Figure 14B:
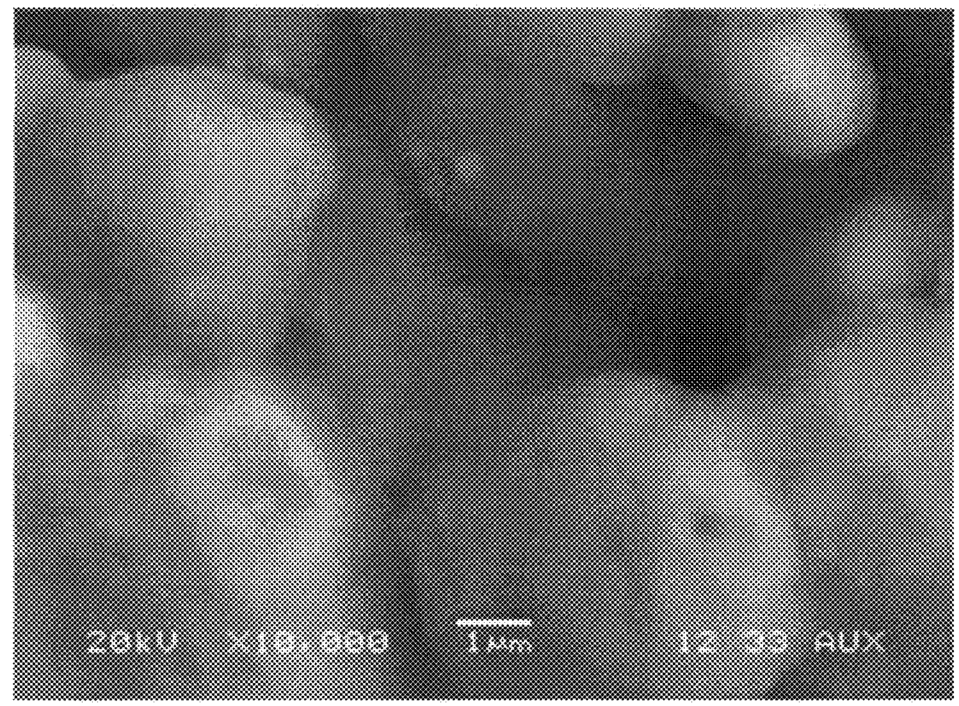

FIG. 13 shows the XRD patterns of Cu—Sn macroporous composite anodes prepared from compositions 1, 2, and 3 as compared to XRD patterns of three copper-tin alloys. The XRD patterns of the Cu—Sn macroporous composite anodes prepared from compositions 1, 2, and 3 exhibit peaks corresponding to the peaks produced by known Cu—Sn alloys, indicating that both CuO and $SnO_2$ were fully reduced. FIGS. 14A and 14B are SEM photographs of the surface structure of a Cu—Sn macroporous composite anode produced from a CuO/$SnO_2$ weight ratio of 9:1 (composition 2). The photographs have a magnification of 250 times and 10,000 times, respectively, and show the macroporous structure of the Cu—Sn composite anode.

Example 3

Copper/Silicon Dioxide Macroporous Composite Anode

A copper/silicon dioxide macroporous composite anode was prepared with a CuO/$SiO_2$ ratio of 9:1 by weight. The anode was prepared from the following reactants: CuO (<5 μm, Sigma Aldrich), $SiO_2$ (<10 ∞m, Sigma Aldrich), CANCARB® UltraPure N990 carbon black (Cancarb Ltd.), EMPHOS® PS-236 (Witco Chemical), BUTVAR® B-79 poly(vinylbutyral) ("Solutia Inc.), benzyl butyl phthalate (Alfa Aesar), ethanol, and methyl ethyl ketone ("MEK").

As shown in Table 7, the following components were combined to form a slurry: 46.11 g CuO, 5.08 g $SiO_2$, 4.30 g carbon black, 0.53 g PS-236, 5.17 g PVB, 3.51 g BBP, 4.71 g ethanol, and 19.33 g MEK. The slurry was tape cast and dried overnight. Two layers of tape were laminated together.

The free-standing film was sintered and reduced under the following conditions: Sintering was performed by performing the standard burn-out, then increasing the furnace temperature to 1000° C. at a rate of 3° C./min. The temperature was held at 1000° C. for 1 hour and then decreased to room temperature at a rate of 5° C./min. Reduction was performed in a tube furnace—The tube was initially purged for 15 min. in $N_2$ (500 sccm) at RT. Following the purge, $H_2$ (100 sccm) was flowed through the tube. The furnace was heated at a rate of 2° C./min to 500° C. (no hold), and then heated at a rate of 1° C./min to 700° C. The temperature was held at 700° C. for 10 hours. The temperature was then decreased at a rate of 1° C./min to 500° C. (no hold), 2° C./min to 100° C. (no hold), and then 5° C./min to RT. The $H_2$ was stopped and the tube was purged for 15 min. in $N_2$ before opening tube. The reduction run used a mineral oil-filled bubbler on the tube outlet to minimize oxygen back-streaming into the furnace.

Figure 15:
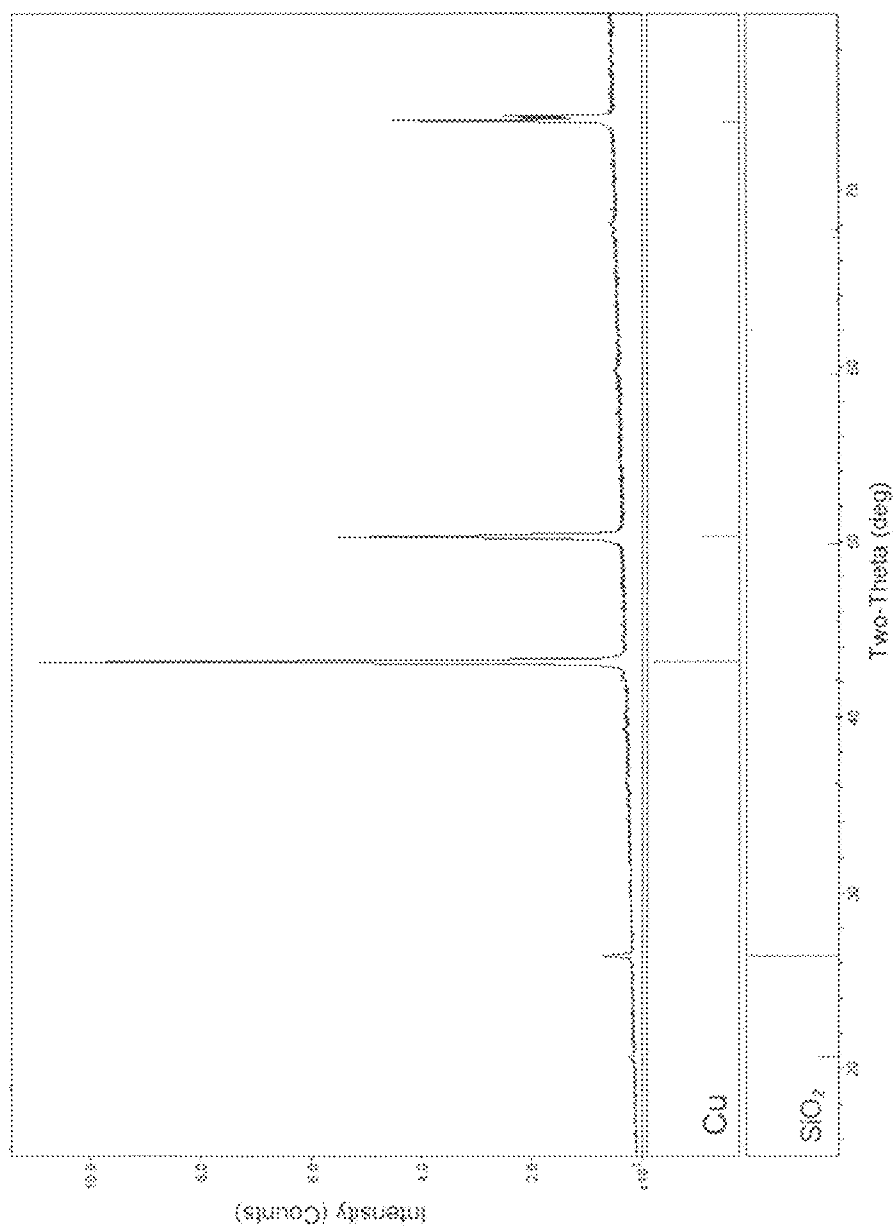
FIG. 15 is an XRD pattern of a Cu—$SiO_2$ macroporous composite anode made by one embodiment of the disclosed methods.
Figures 16A, 16B:
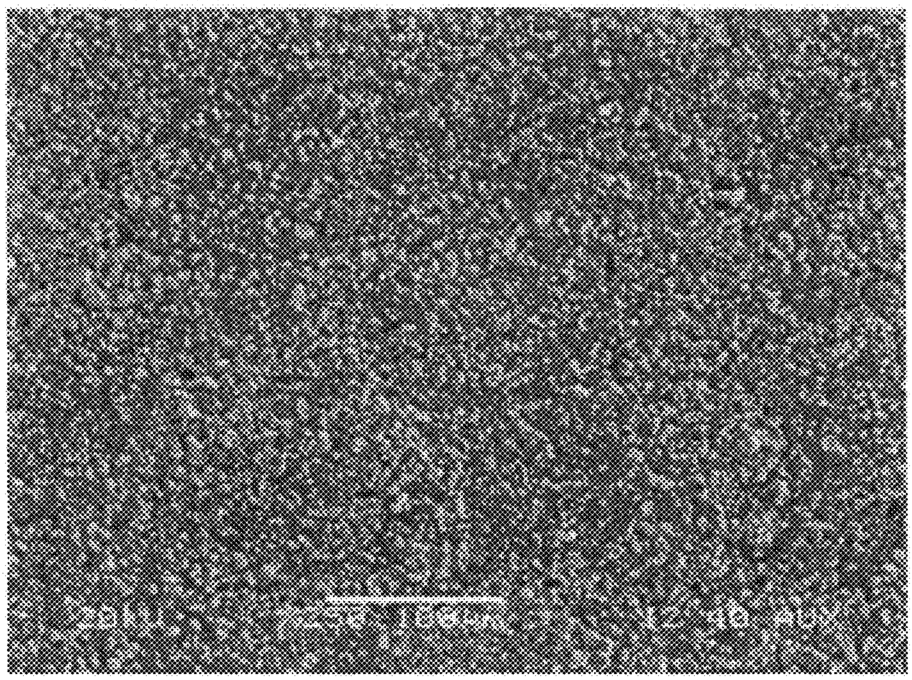
FIGS. 16A and 16B are SEM photographs of the surface of a Cu—$SiO_2$ macroporous composite anode made by one embodiment of the disclosed methods.

FIG. 15 shows the XRD pattern of the prepared Cu—$SiO_2$ macroporous composite anode; the XRD patterns of Cu and $SiO_2$ also are shown in FIG. 15 for comparison. The XRD pattern of the Cu—$SiO_2$ macroporous composite anode exhibits peaks corresponding to $SiO_2$ and copper, indicating that CuO was completely reduced but $SiO_2$ remained oxidized. FIGS. 16A and 16B are SEM photographs of the surface structure of the Cu—$SiO_2$ macroporous composite anode. The photographs have a magnification of 250 times and 10,000 times, respectively, and show the macroporous structure of the Cu—$SiO_2$ composite anode.

Figure 17:
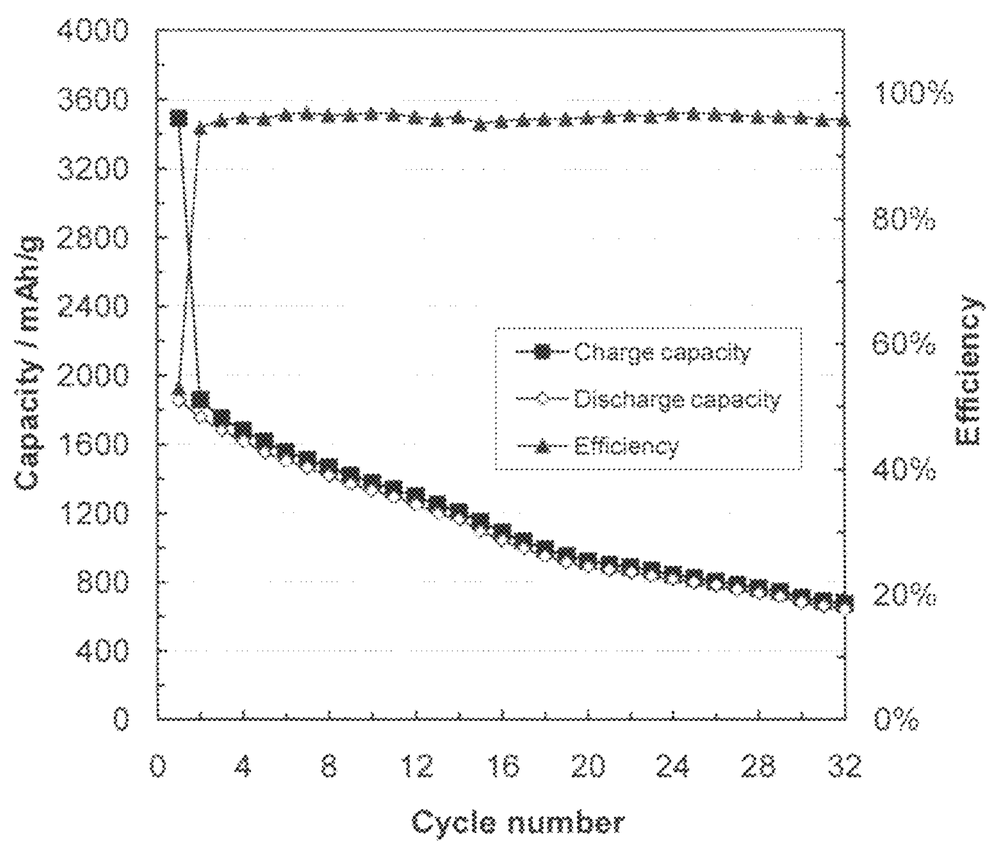
FIG. 17 is a graph of charge/discharge capacity and efficiency for a battery containing a Cu—$SiO_2$ macroporous composite anode made by one embodiment of the disclosed methods.

FIG. 17 shows the battery performance of the Cu—$SiO_2$ macroporous composite anode in a coin cell. Similar to $SnO_2$, there are two reactions during the first charge:

$$SiO_2+4Li^+\rightarrow Si+2Li_2O \quad (3)$$

$$Si+4.4Li^+\rightarrow Li_{4.4}Si \quad (4)$$

Only reaction 4 is reversible. Thus, the initial discharge capacity was expected to be less than the initial charge capacity. The battery initially had a charge specific capacity of about 3,550 mAh/g and a discharge specific capacity of ~1,850 mAh/g. The charge and discharge specific capacities both dropped to ~700 mAh/g after 32 cycles. The Coulombic efficiency of the cell was approximately 95%. The capacity retention was 38% after 32 cycles.

Example 4

Copper/Titanium Dioxide Macroporous Composite Anode

A copper/titanium dioxide macroporous composite anode was prepared with a CuO/$TiO_2$ ratio of 8:2 by weight. The anode was prepared from the following reactants: CuO (<5 μm, Sigma Aldrich), $TiO_2$ (32 nm, Alfa Aesar), CANCARB® UltraPure N990 carbon black (Cancarb Ltd.), EMPHOS® PS-236 (Witco Chemical), BUTVAR® B-79 poly(vinylbutyral) ("Solutia Inc.), benzyl butyl phthalate (Alfa Aesar), ethanol, and methyl ethyl ketone ("MEK").

As shown in Table 8, the following components were combined to form a slurry: 36.85 g CuO, 9.20 g $TiO_2$, 3.58 g carbon black, 0.47 g PS-236, 4.30 g PVB, 2.92 g BBP, 5.24 g ethanol, and 21.49 g MEK. The slurry was tape cast and dried overnight. Two layers of tape were laminated together.

The free-standing film was sintered and reduced under the following conditions: Sintering was performed by performing the standard burn-out, then increasing the furnace temperature to 1000° C. at a rate of 3° C./min. The temperature was held at 1000° C. for 1 hour and then decreased to room temperature at a rate of 5° C./min. Reduction was performed in a tube furnace—The tube was initially purged for 15 min. in $N_2$ (500 sccm) at RT. Following the purge, $H_2$ (100 sccm) was flowed through the tube. The furnace was heated at a rate of 2° C./min to 500° C. (no hold), and then heated at a rate of 1° C./min to 800° C. The temperature was held at 800° C. for 10 hours. The temperature was then decreased at a rate of 1° C./min to 500° C. (no hold), 2° C./min to 100° C. (no hold), and then 5° C./min to RT. The $H_2$ was stopped and the tube was purged for 15 min. in $N_2$ before opening tube. The reduction run used a mineral oil-filled bubbler on the tube outlet to minimize oxygen back-streaming into the furnace.

Example 5

Copper/Tin Oxide Macroporous Composite Anodes with Nanoparticles

Copper/tin oxide macroporous composite anodes were prepared with initial CuO/$SnO_2$ weight ratios of 11.26:1 and 5:1 to generate $Cu/SnO_2$ macroporous composite anodes with final $Cu/SnO_2$ weight ratios of 9:1 and 8:2, respectively, as outlined below. In this example, the anode active material, $SnO_2$, was in the form of nanometer-sized particles rather than the micron-sized particles used to prepare Compositions 1-4 in Example 2.

Figure 18:
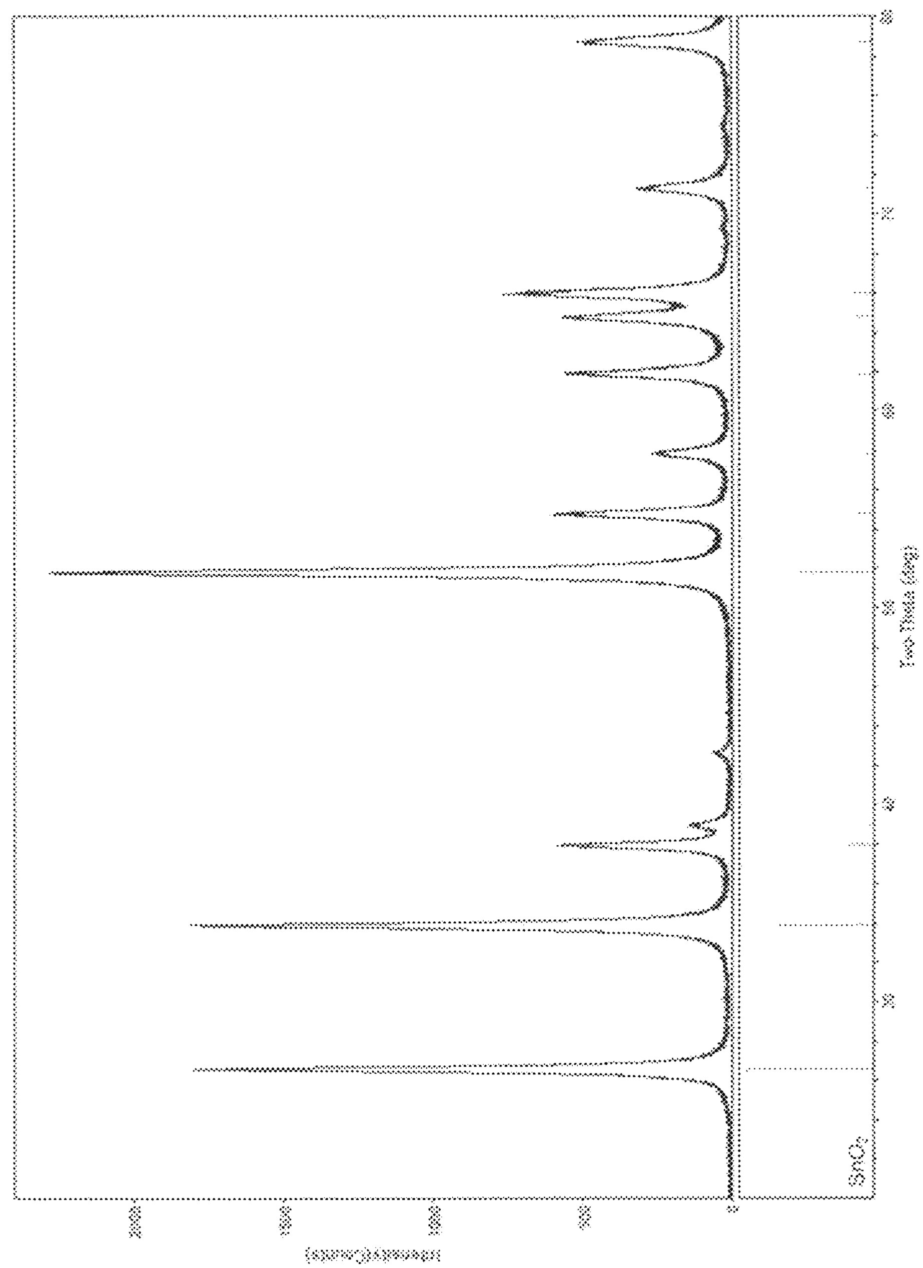
FIG. 18 is an XRD pattern of $SnO_2$ used in some macroporous composites anode made by embodiments of the disclosed methods.

Each of the anodes was prepared from the following reactants: CuO (particle size<5 μm, Sigma Aldrich), $SnO_2$ (particle size 22~43 nm, surface area 20~40 $m^2/g$, Alfa Aesar), CANCARB® UltraPure N990 carbon black (Cancarb Ltd.), EMPHOS® PS-236 (Witco Chemical), BUTVAR® B-79 poly(vinylbutyral) ("Solutia Inc.), benzyl butyl phthalate (Alfa Aesar), ethanol, and methyl ethyl ketone ("MEK"). FIG. 18 shows the XRD pattern of the $SnO_2$ powder.

Composition 5: $CuO/SnO_7$ Ratio 11.26:1 by Weight

As shown in Table 9, the following components were combined to form a slurry: 41.87 g CuO, 3.72 g $SnO_2$, 8.61 g carbon black, 0.52 g PS-236, 5.17 g PVB, 3.51 g BBP, 4.71 g ethanol, and 19.33 g MEK. The slurry was tape cast and dried overnight.

Composition 6: $CuO/SnO_2$ Ratio 5:1 by Weight

As shown in Table 10, the following components were combined to form a slurry: 36.42 g CuO, 7.28 g $SnO_2$, 8.23 g carbon black, 0.5 g PS-236, 4.52 g PVB, 3.07 g BBP, 4.95 g ethanol, and 20.31 g MEK. The slurry was tape cast and dried overnight.

Laminate structures were formed from each of the compositions using two layers of tape.

The free-standing films were sintered and reduced under the following conditions: All reduction runs used a mineral oil-filled bubbler on the tube outlet to minimize oxygen backstreaming into the furnace. Sintering in air was performed by performing the standard burn-out, then increasing the temperature at a rate of 3° C./min to 1000° C. The temperature was held at 1000° C. for 3 hours and then decreased at a rate of 5° C./min to RT. Reduction was performed in a tube furnace. The tube was initially purged for 15 min. in $N_2$ (500 sccm) at RT. The gas flow was switched from $N_2$ to $H_2$ (100 sccm), and the tube was heated at a rate of 2° C./min to 400° C. The temperature was held at 400° C. for 4 hours. The gas flow was switched to argon (500 sccm), and the temperature was increased at a rate of 2° C./min to 500° C. (no hold) and then at a rate of 1° C./min to 900° C. The temperature was held at 900° C. for 5 hours. It was then decreased at a rate of 1° C./min to 500° C. (no hold), 2° C./min to 100° C. (no hold), and then 5° C./min to RT.

Figure 19:
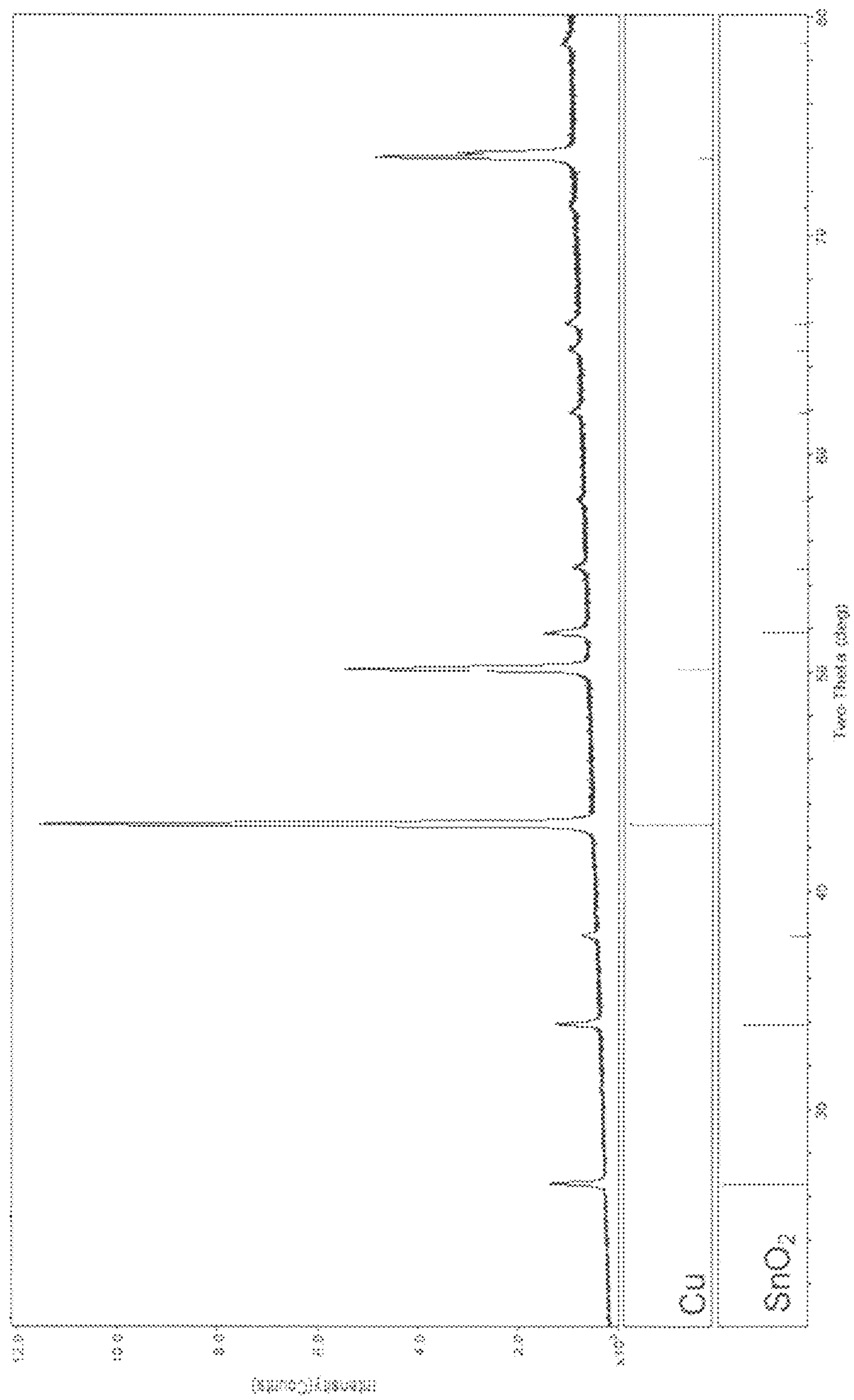
FIG. 19 is an XRD pattern of a Cu—$SnO_2$ macroporous composite anode made by one embodiment of the disclosed methods.
Figure 20:
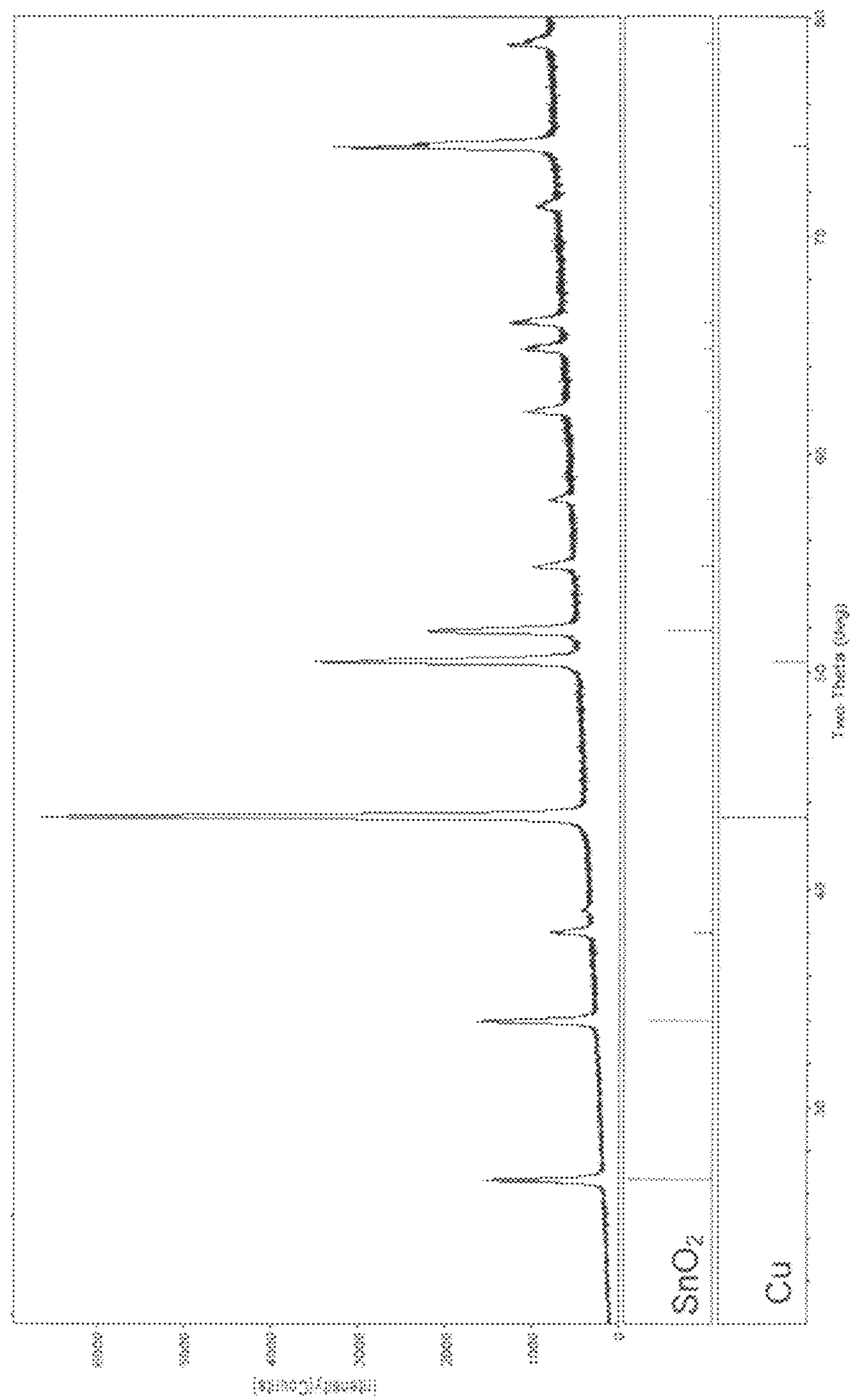
FIG. 20 is an XRD pattern of a Cu—$SnO_2$ macroporous composite anode made by another embodiment of the disclosed methods.

FIGS. 19 and 20 show the XRD pattern of a Cu—$SnO_2$ macroporous composite anode prepared from compositions 5 and 6, respectively, as compared to XRD patterns of Cu and $SnO_2$. The XRD patterns show that Cu—$SnO_2$ macroporous composite anodes prepared from compositions 5 and 6 have peaks corresponding to Cu and $SnO_2$, indicating that CuO was reduced completely and $SnO_2$ remained oxidized. Table 11 shows the density and open porosity of Compositions 5 and 6.

TABLE 11

| Sample | Average density (g/cc) | Ave. % Open Porosity |
|---|---|---|
| Composition 5: $Cu/SnO_2$ (final ratio 9:1 wt, 2-ply laminate) Sintered 1000° C./3 h air; reduced 400° C./4 h pure $H_2$; re-sinter 900° C./5 h in Ar (no cool after reduction) | 6.81 | 23.0% |
| Composition 6: $Cu/SnO_2$ (final ratio 8:2 wt, 2-ply laminate) Sintered 1000° C./3 h air; reduced 400° C./4 h pure $H_2$; re-sinter 900° C./5 h in Ar (no cool after reduction) | 5.36 | 38.0% |

Figure 21A:
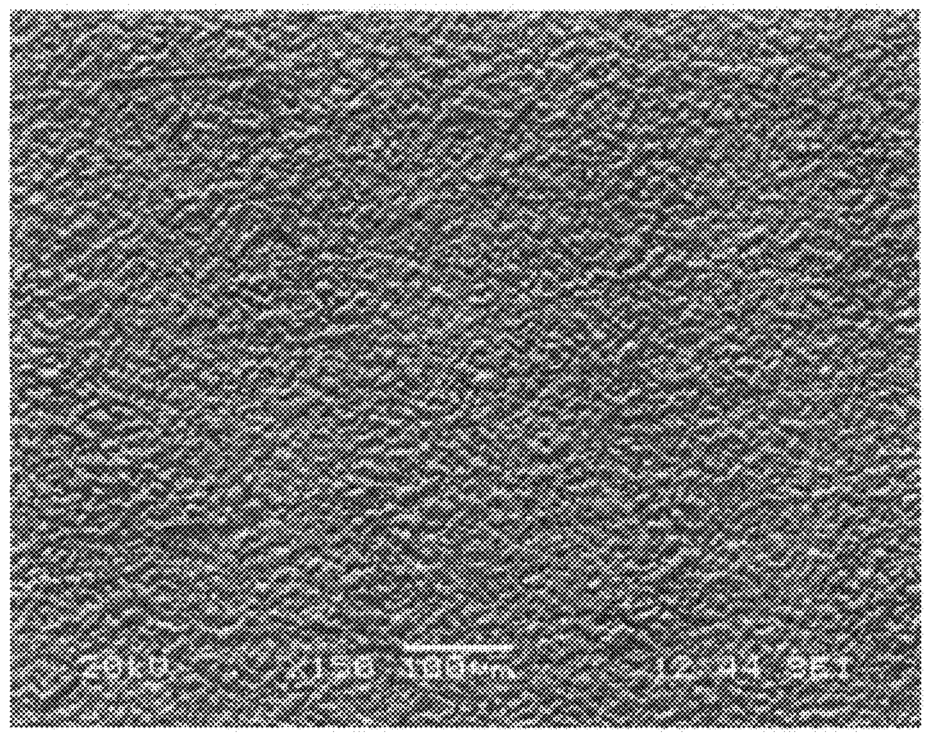
FIGS. 21A and 21B are SEM photographs of the surface of a Cu—$SnO_2$ macroporous composite anode made by one embodiment of the disclosed methods.
Figure 21B:
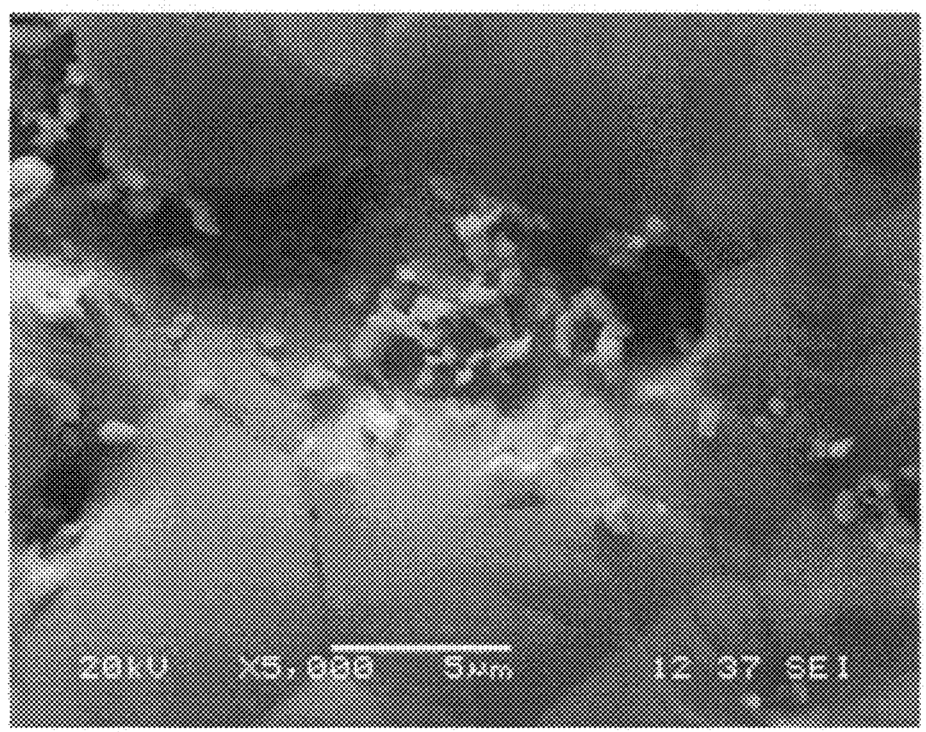
Figure 22A:
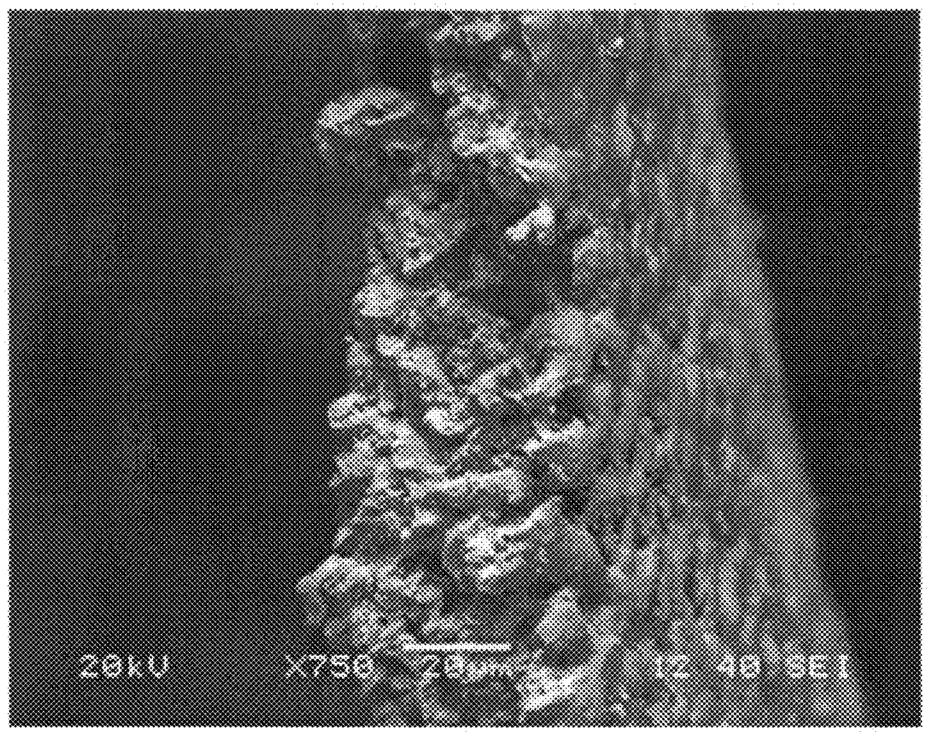
FIGS. 22A and 22B are SEM photographs of a fractured surface of the Cu—$SnO_2$ macroporous composite anode of FIGS. 21A-B.
Figure 22B:
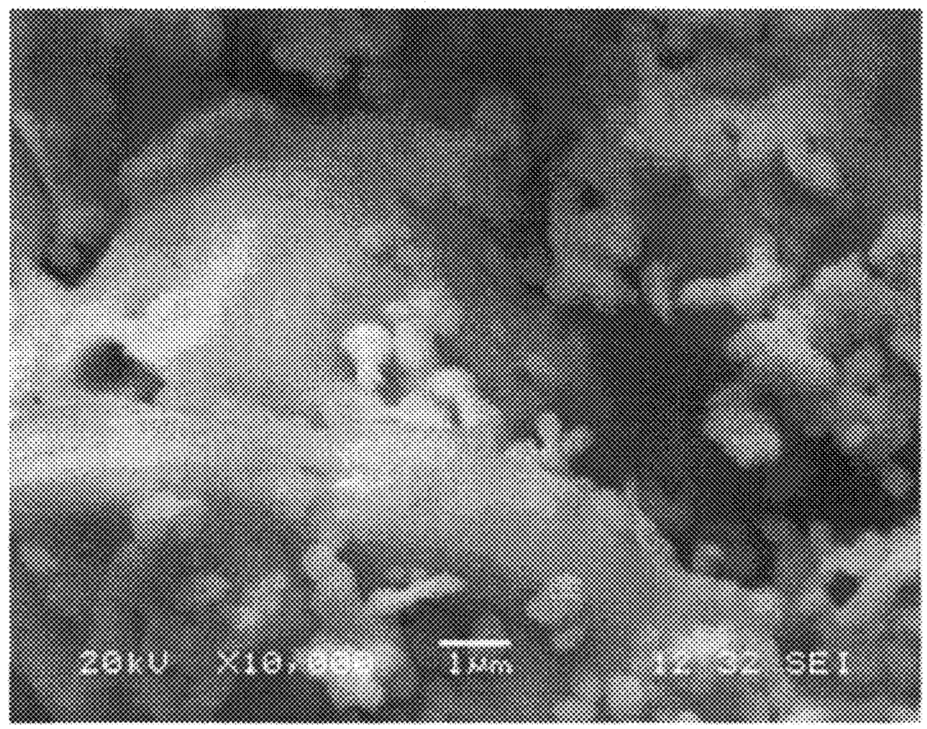

FIGS. 21A and 21B are SEM photographs of the surface structure of a Cu—$SnO_2$ macroporous composite anode produced with a final $Cu/SnO_2$ weight ratio of 9:1 (composition 5). The photographs have a magnification of 150 times and 5,000 times, respectively. FIGS. 22A and 22B are SEM photographs of the fractured surface of a Cu—$SnO_2$ macroporous composite anode produced from a $Cu/SnO_2$ weight ratio of 9:1 (composition 5). The photographs have a magnification of 750 times and 10,000 times, respectively. The macroporous structure is clearly seen.

Figure 23A:
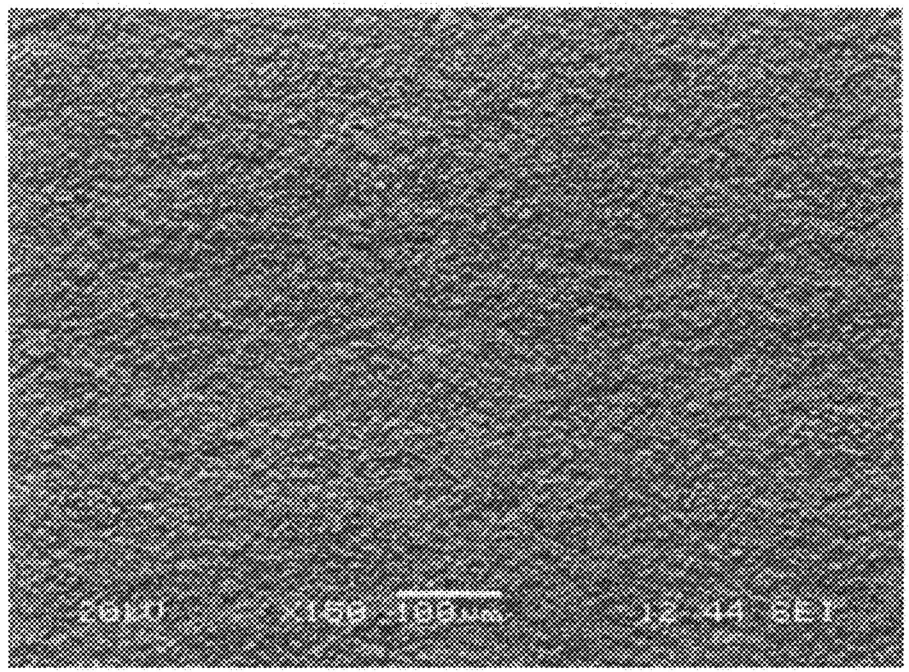
FIGS. 23A and 23B are SEM photographs of the surface of a Cu—$SnO_2$ macroporous composite anode made by another embodiment of the disclosed methods.
Figure 23B:
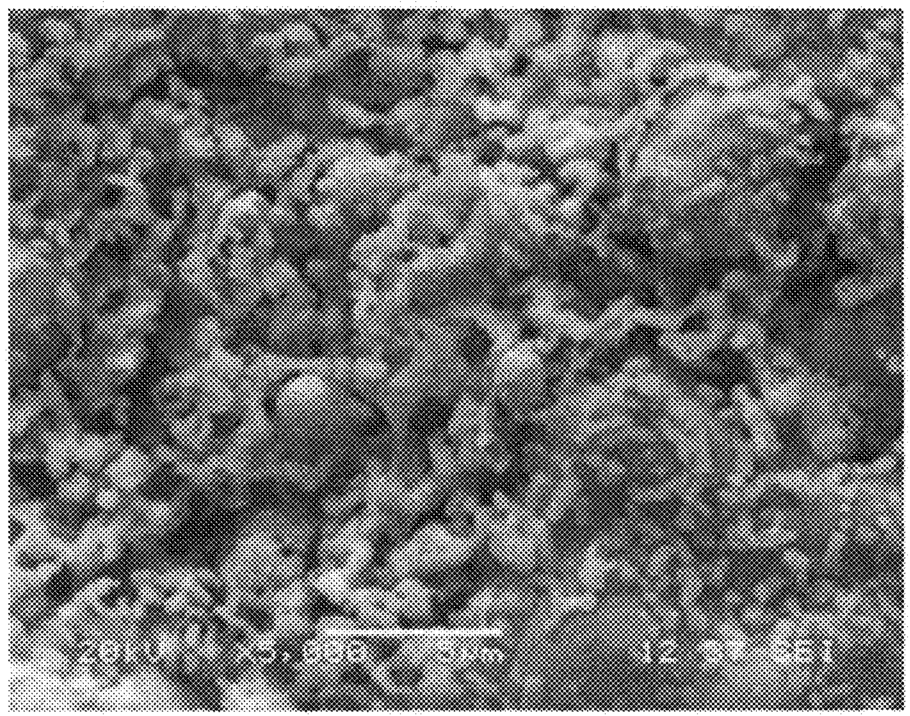
Figure 24A:
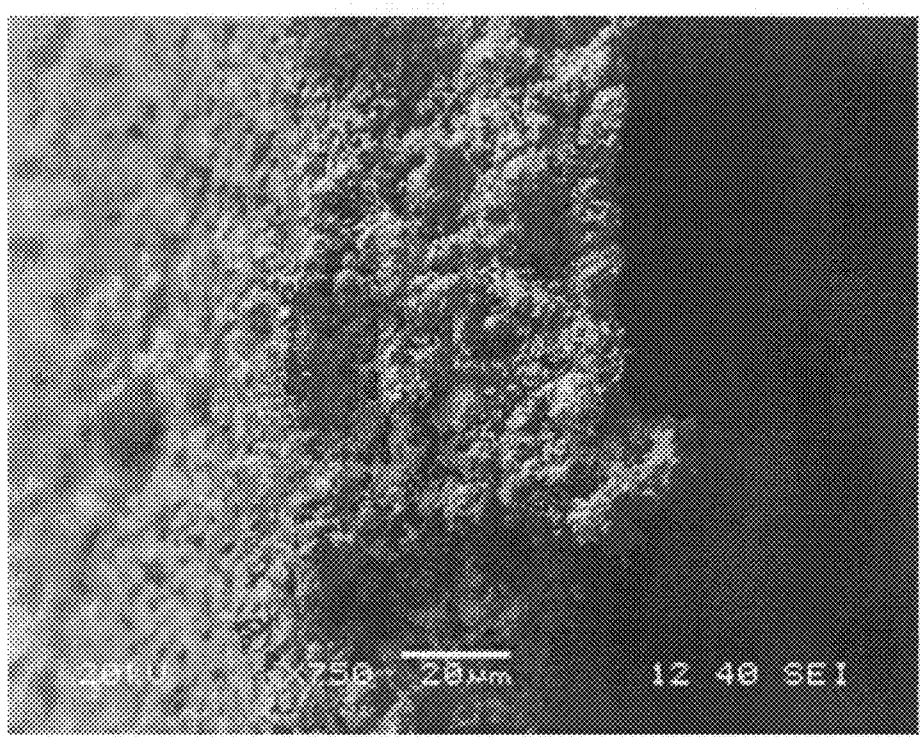
FIGS. 24A and 24B are SEM photographs of a fractured surface of the Cu—$SnO_2$ macroporous composite anode of FIGS. 23A-B.
Figure 24B:
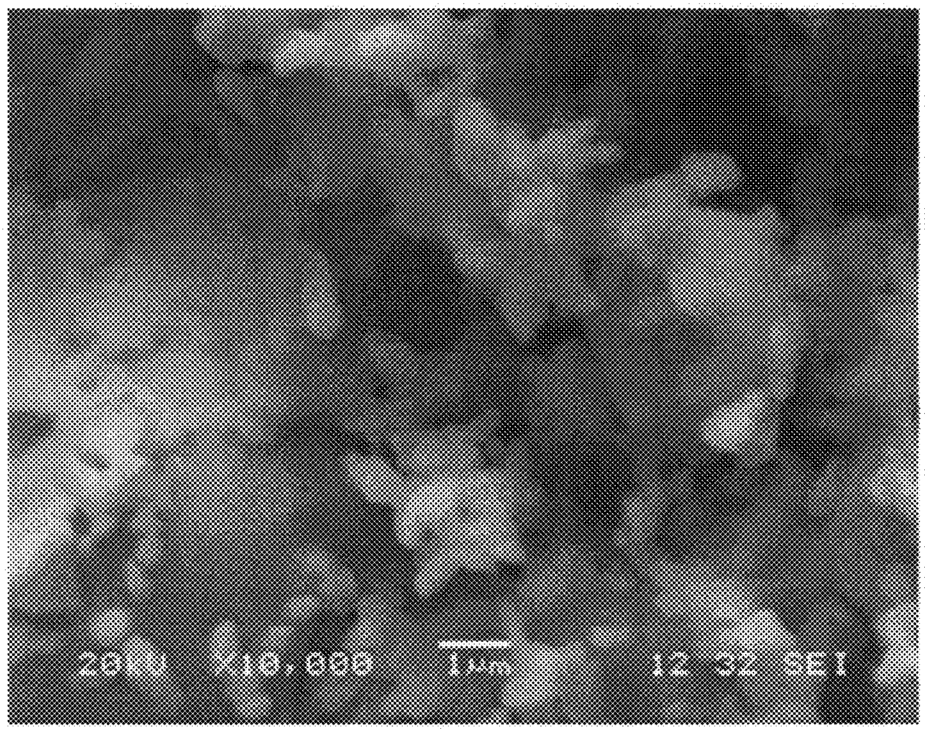

FIGS. 23A and 23B are SEM photographs of the surface structure of a Cu—$SnO_2$ macroporous composite anode produced with a final $Cu/SnO_2$ weight ratio of 8:2 (composition 6). The photographs have a magnification of 150 times and 5,000 times, respectively. FIGS. 24A and 24B are SEM photographs of the fractured edge of a Cu—$SnO_2$ macroporous composite anode produced from a $Cu/SnO_2$ weight ratio of 8:2 (composition 5). The photographs have a magnification of 750 times and 10,000 times, respectively. The macroporous structure is clearly seen.

Figure 25:
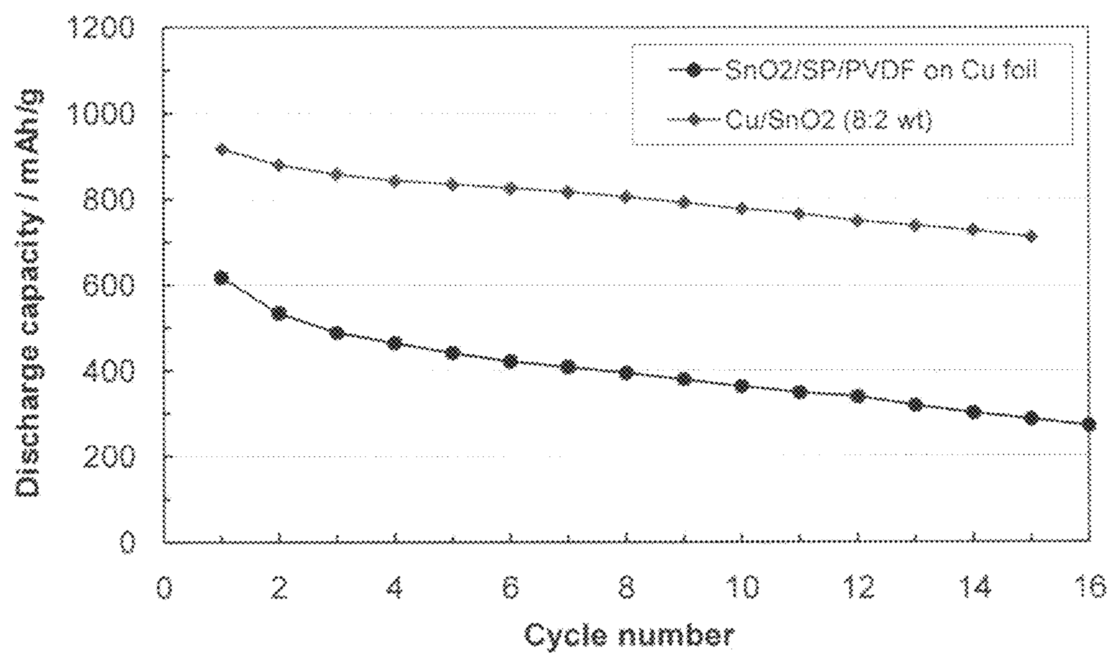
FIG. 25 is a graph of discharge capacity for a battery containing a Cu—$SnO_2$ macroporous composite anode made by one embodiment of the disclosed methods, compared to discharge capacity for a battery containing a copper foil anode coated with $SnO_2$, Super P carbon black, and poly (vinylidene-fluoride) (PVDF).

FIG. 25 shows the battery performance of a Cu—$SnO_2$ macroporous composite anode having a $Cu/SnO_2$ weight ratio of 8:2 (composition 6) in a coin-type half cell. The battery had an initial discharge specific capacity of 917 mAh/g. The charge and discharge specific capacities both dropped to 712 mAh/g after 15 cycles. This battery had 78% capacity retention after 15 cycles.

As a comparison, $SnO_2$ powder (particle size 22~43 nm, Alfa Aesar) was mixed with Super P carbon black (Timcal Graphite Corp.) and poly(vinylidene fluoride) (PVDF, KYNAR® HSV900, Arkema, Inc.) at weight ratios of 7:2:1, respectively, in N-methylpyrrolidone (NMP, Alrich) to produce a slurry. The slurry was cast onto a 25 μm thick copper foil. After evaporating the organic solvent inside a hood at ambient temperature, the coated copper foil was further dried in a vacuum oven at 80° C. overnight.

Figure 26:
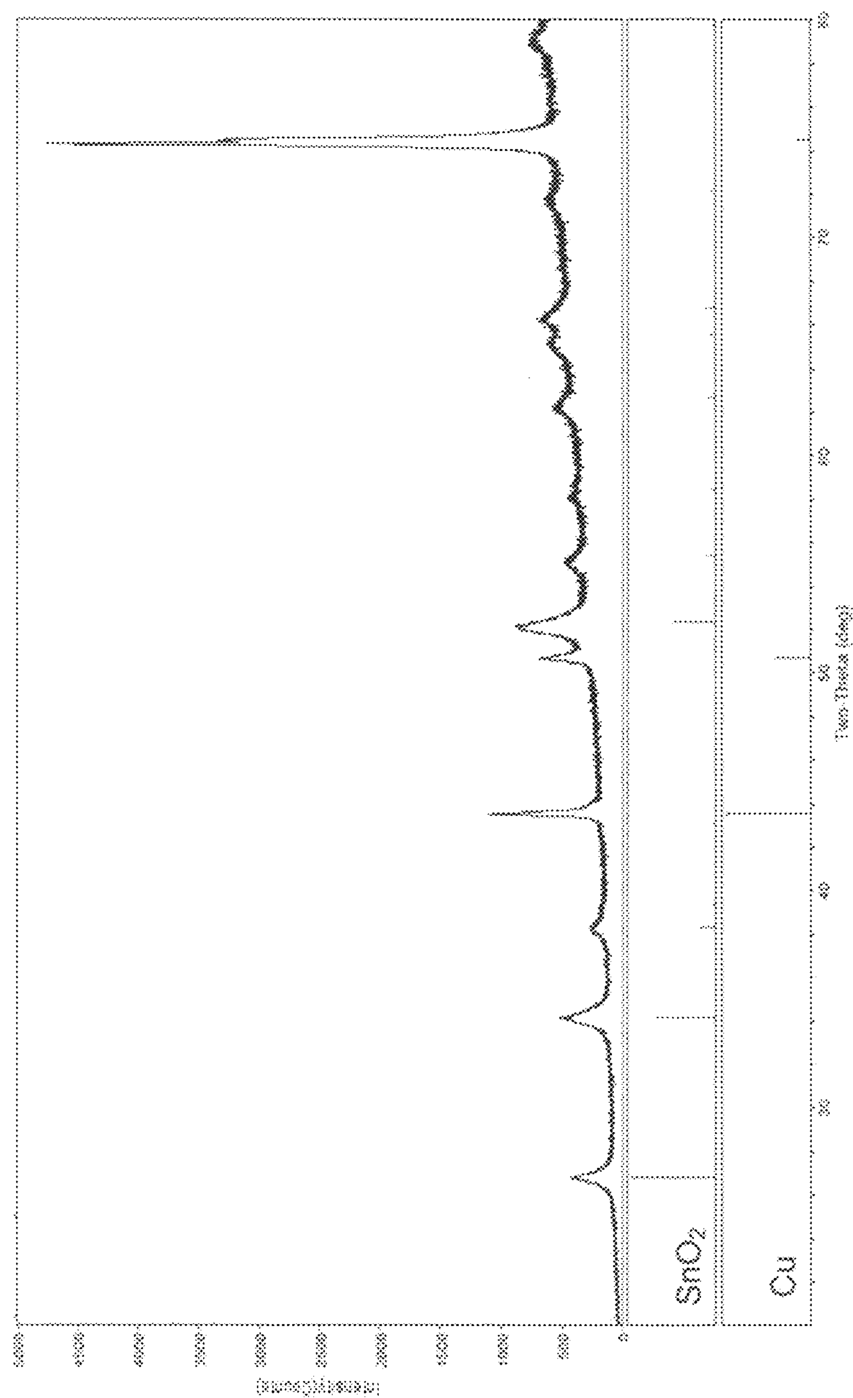
FIG. 26 is an XRD pattern of a $SnO_2$-coated copper foil anode.
Figure 27A:
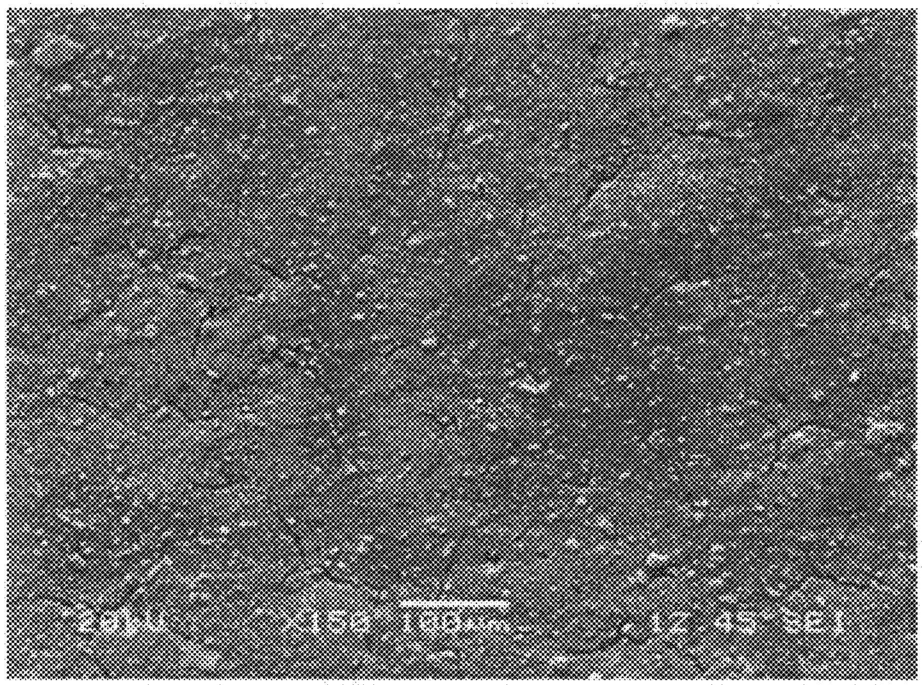
FIGS. 27A and 27B are SEM photographs of the surface of a $SnO_2$-coated copper foil anode.
Figure 27B:
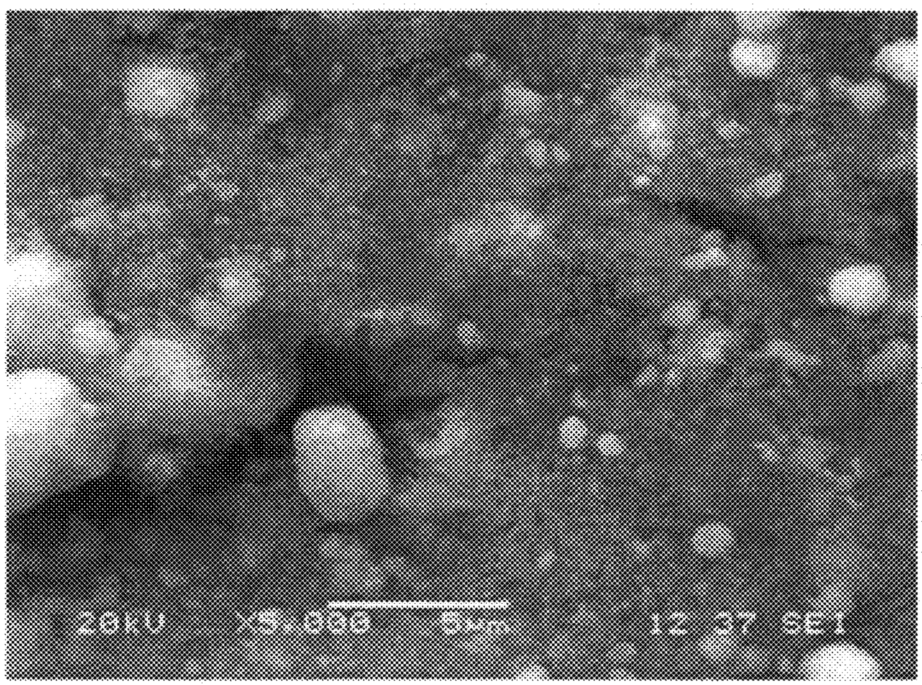
Figures 28A, 28B:
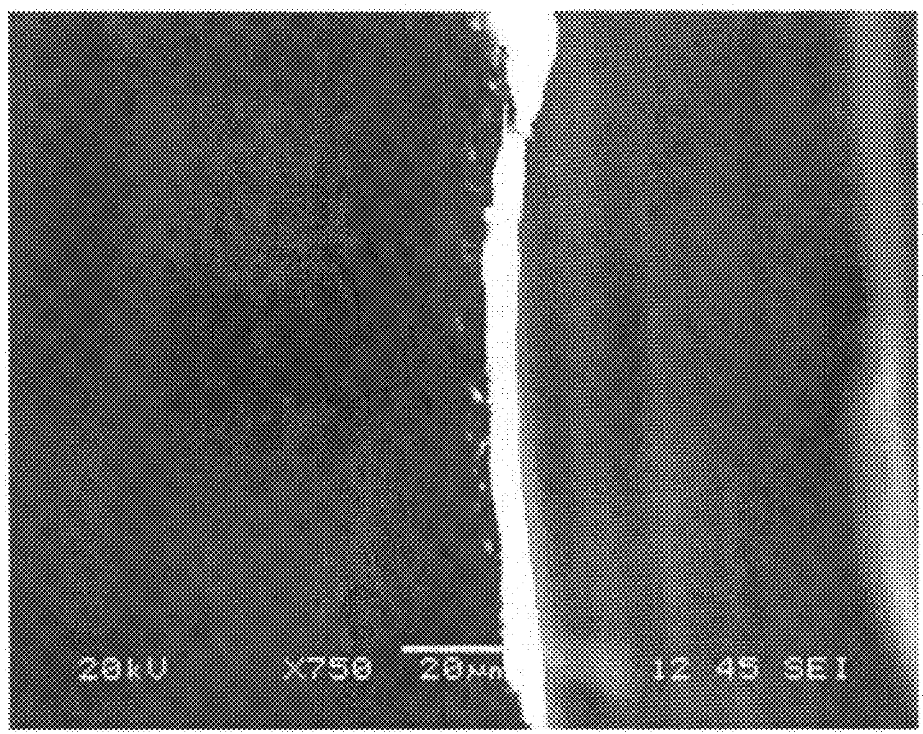
FIGS. 28A and 28B are SEM photographs of a fractured surface of the $SnO_2$-coated copper foil anode of FIGS. 27A-B.

FIG. 26 shows the XRD pattern of the $SnO_2$-coated Cu foil anode, as compared to the XRD patterns of $SnO_2$ and Cu. FIGS. 27A and 27B are SEM photographs of the surface structure of a $SnO_2$-coated Cu foil anode. The photographs have a magnification of 150 times and 5,000 times, respectively. FIGS. 28A and 28B are SEM photographs of the fractured edge of a $SnO_2$-coated Cu foil anode. The photographs have a magnification of 750 times and 10,000 times, respectively. The lack of a macroporous structure is clearly seen.

The cell performance of the $SnO_2$-coated copper foil anode is shown in FIG. 25. The initial discharge specific capacity (617 mAh/g) was significantly lower than those using macroporous composite anodes. Furthermore, the discharge capacities both dropped to 287 mAh/g after 15 cycles, as compared to 712 mAh/g for the macroporous composite anode. Thus, the macroporous composite anode demonstrated significantly better discharge capacity and cycle life than the $SnO_2$-coated copper foil anode.

Example 6

Nickel/Silicon Macroporous Composite Anode

A nickel/silicon macroporous composite anode can be prepared by combining micro or nano powders of silicon (IV) oxide and nickel (II) oxide with carbon black and binder in desired ratios, and dispersing the combined reactants in an organic solvent to form a slurry. After tape-casting, the free-standing film can be sintered at 1,000° C. for 1 hour in air to form a macroporous sheet. The macroporous sheet can be reduced and sintered in a pure hydrogen atmosphere at 1,400° C. for 10 hours.

Example 7

Copper/Silicon Macroporous Composite Anode

A copper/silicon macroporous composite anode can be prepared by combining micro or nano powders of silicon (IV) oxide and copper (II) oxide with carbon black and binder in desired ratios, and dispersing the combined reactants in an organic solvent to form a slurry. After tape-casting and lamination, the free-standing film can be sintered at 1,000° C. for 10 hours in a nitrogen/hydrogen (1:1 ratio) atmosphere.

Example 8

Copper/Aluminum Macroporous Composite Anode

A copper/aluminum macroporous composite anode can be prepared by mixing micro or nano powders of aluminum and copper with carbon black and binder in desired ratios, and dispersing the combined reactants in an organic solvent to form a slurry. After tape-casting and lamination, the free-standing film can be sintered in a nitrogen/hydrogen atmosphere at 1,000° C. for 10 hours.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

TABLE 1

Batch Sheet for Porous Copper Sheet

| | | | | | | | | | |
|---|---|---|---|---|---|---|---|---|---|
| Slurry ID: | PVB CuO-2 | | | | | | Solids in Green Anode: | | vol. fraction |
| Starch Content (vol. fraction:) | 0.2 | Solvents: | vol. fraction | (Binder + Plast)/Solids Vol. Ratio: | 0.6632 | | Starch | | |
| Ni Content in final anode(vol. fraction): | 0 | IPA | 0.00 | | | | NiO | 0 | |
| Solids Loading(vol. fraction): | 0.24038 | Ethanol | 0.20 | Binder/Plast. Vol Ratio: | 1.5 | | YSZ | 1 | |
| Slurry Volume(ml): | 50 | MEK | 0.8 | Dispersant(wt % of solids) | 0.955% | | Alumina | 0 | |
| Relative amounts (by vol) of: | | | 1.00 | | | | | | |
| Cu | 1 | | | | | | | | |
| Alumina | 0 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 9.615 | 6.31 | 60.67 | | 18.99 | 61.72% | 46.65% |
| Alumina | 0.000 | 3.97 | 0.00 | | 0.00 | 0.00% | 0.00% |
| NiO | 0.000 | 6.67 | 0.00 | 60.67 | 0.00 | 0.00% | 0.00% |
| CANCARB 990 Carbon Black | 2.404 | 1.79 | 4.30 | | 4.75 | 4.38% | 11.66% |
| IPA (2-Propanol) | 0 | 0.786 | 0.00 | | 0.00 | 0.00% | |
| Ethanol | 6.00199984 | 0.785 | 4.71 | | 11.86 | 4.79% | |
| MEK | 24.00799936 | 0.805 | 19.33 | | 47.43 | 19.66% | |
| PS-236 | 0.62 | 1 | 0.62 | | 1.23 | 0.63% | 3.01% |
| Binder | 4.78260048 | 1.08 | 5.17 | | 9.45 | 5.25% | 23.20% |
| BBP | 3.18840032 | 1.1 | 3.51 | | 6.30 | 3.57% | 15.47% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.621 | | 98.31 | | 100.00 | 100.0% | 100.00% |

Notes:

Sigma Aldrich CuO <5 micron, as received

Batch uses 100% CuO powder

Binder/Solids 0.39792

Solids/Binder 2.513067953

TABLE 3

Batch Sheet for CuO/$SnO_2$ of 7:3 by weight

| | | | | | | | | | |
|---|---|---|---|---|---|---|---|---|---|
| Slurry ID: | PVB Cu/SnO-1 | | | | | | Solids in Green Anode: | | vol. fraction |
| Starch Content (vol. fraction:) | 0.2 | Solvents: | vol. fraction | (Binder + Plast)/Solids Vol. Ratio: | 0.6632 | | Starch | | 0.2 |
| | | IPA | 0.00 | | | | | | |
| Solids Loading(vol. fraction): | 0.24038 | Ethanol | 0.20 | Binder/Plast. Vol Ratio: | 1.5 | | Cu | 0.705 | 0.564 |
| Slurry Volume(ml): | 50 | MEK | 0.8 | Dispersant(wt % of solids) | 0.955% | | Sn | 0.295 | 0.236 |
| Relative amounts (by vol) of: | | | 1.00 | | | | | | 1 |
| Cu | 0.705 | | | | | | | | |
| Sn | 0.295 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 6.779 | 6.31 | 42.77 | | 13.39 | 43.33% | 32.88% |
| SnO2 | 2.836 | 6.45 | 18.30 | | 5.60 | 18.54% | 13.76% |
| | | | | 61.07 | 0.00 | 0.00% | 0.00% |
| CANCARB 990 Carbon Black | 2.404 | 1.79 | 4.30 | | 4.75 | 4.36% | 11.66% |
| IPA (2-Propanol) | 0 | 0.786 | 0.00 | | 0.00 | 0.00% | |
| Ethanol | 6.00199984 | 0.785 | 4.71 | | 11.86 | 4.77% | |
| MEK | 24.00799936 | 0.805 | 19.33 | | 47.42 | 19.58% | |
| PS-236 | 0.62 | 1 | 0.62 | | 1.23 | 0.63% | 3.03% |
| Binder | 4.78260048 | 1.08 | 5.17 | | 9.45 | 5.23% | 23.20% |
| BBP | 3.18840032 | 1.1 | 3.51 | | 6.30 | 3.55% | 15.47% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.624 | | 98.71 | | 100.00 | 100.0% | 100.00% |

Notes:
Sigma Aldrich CuO <5 micron, as received
Batch uses 7:3 wt % ratio of CuO to SnO2
Binder/Solids 0.39792
Solids/Binder 2.513067953

TABLE 4

Batch Sheet for CuO/$SnO_2$ of 9:1 by weight

| | | | | | | | | | |
|---|---|---|---|---|---|---|---|---|---|
| Slurry ID: | PVB Cu/SnO-2 | | | | | | Solids in Green Anode: | | vol. fraction |
| Starch Content (vol. fraction:) | 0.2 | Solvents: | vol. fraction | (Binder + Plast)/Solids Vol. Ratio: | 0.6632 | | Starch | | 0.2 |
| | | IPA | 0.00 | | | | | | |
| Solids Loading(vol. fraction): | 0.24038 | Ethanol | 0.20 | Binder/Plast. Vol Ratio: | 1.5 | | Cu | 0.902 | 0.7216 |
| Slurry Volume(ml): | 50 | MEK | 0.8 | Dispersant(wt % of solids) | 0.955% | | Sn | 0.098 | 0.0784 |
| Relative amounts (by vol) of: | | | 1.00 | | | | | | 1 |
| Cu | 0.902 | | | | | | | | |
| Sn | 0.098 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 8.673 | 6.31 | 54.73 | | 17.13 | 55.59% | 42.08% |
| SnO2 | 0.942 | 6.45 | 6.08 | | 1.86 | 6.17% | 4.57% |
| | | | | 60.80 | 0.00 | 0.00% | 0.00% |
| CANCARB 990 Carbon Black | 2.404 | 1.79 | 4.30 | | 4.75 | 4.37% | 11.66% |
| IPA (2-Propanol) | 0 | 0.786 | 0.00 | | 0.00 | 0.00% | |
| Ethanol | 6.00199984 | 0.785 | 4.71 | | 11.86 | 4.79% | |
| MEK | 24.00799936 | 0.805 | 19.33 | | 47.43 | 19.63% | |
| PS-236 | 0.62 | 1 | 0.62 | | 1.23 | 0.63% | 3.02% |
| Binder | 4.78260048 | 1.08 | 5.17 | | 9.45 | 5.25% | 23.20% |

TABLE 4-continued

| Batch Sheet for $CuO/SnO_2$ of 9:1 by weight | | | | | | | |
|---|---|---|---|---|---|---|---|
| BBP | 3.18840032 | 1.1 | 3.51 | | 6.30 | 3.56% | 15.47% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.622 | | 98.44 | | 100.00 | 100.0% | 100.00% |

Notes:
Sigma Aldrich CuO <5 micron, as received
Based on PVB Cu/SnO-1 but uses 9:1 wt % ratio of CuO to SnO2
Binder/Solids 0.39792
Solids/Binder 2.513067953

TABLE 5

| Batch Sheet for $CuO/SnO_2$ of 8:2 by weight | | | | | | | | | | |
|---|---|---|---|---|---|---|---|---|---|---|
| Slurry ID: | PVB Cu/SnO-3 | | | | | | Solids in Green Anode: | | vol. fraction |
| Starch Content (vol. fraction:) | 0.2 | Solvents: | vol. fraction | (Binder + Plast)/Solids | 0.6632 | | Starch | | 0.2 |
| | | IPA | 0.00 | Vol. Ratio: | | | | | |
| Solids Loading(vol. fraction): | 0.24038 | Ethanol | 0.20 | Binder/Plast. Vol Ratio: | 1.5 | | Cu | 0.802 | 0.6416 |
| Slurry Volume(ml): | 50 | MEK | 0.8 | Dispersant(wt % of solids) | 0.955% | | Sn | 0.198 | 0.1584 |
| Relative amounts (by vol) of: | | | 1.00 | | | | | | 1 |
| Cu | 0.802 | | | | | | | | |
| Sn | 0.198 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 7.711 | 6.31 | 48.66 | | 15.23 | 49.36% | 37.41% |
| SnO2 | 1.904 | 6.45 | 12.28 | | 3.76 | 12.46% | 9.24% |
| | | | | 60.94 | 0.00 | 0.00% | 0.00% |
| CANCARB 990 Carbon Black | 2.404 | 1.79 | 4.30 | | 4.75 | 4.37% | 11.66% |
| IPA (2-Propanol) | 0 | 0.786 | 0.00 | | 0.00 | 0.00% | |
| Ethanol | 6.00199984 | 0.785 | 4.71 | | 11.86 | 4.78% | |
| MEK | 24.00799936 | 0.805 | 19.33 | | 47.43 | 19.61% | |
| PS-236 | 0.62 | 1 | 0.62 | | 1.23 | 0.63% | 3.02% |
| Binder | 4.78260048 | 1.08 | 5.17 | | 9.45 | 5.24% | 23.20% |
| BBP | 3.18840032 | 1.1 | 3.51 | | 6.30 | 3.56% | 15.47% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.623 | | 98.57 | | 100.00 | 100.0% | 100.00% |

Notes:
Sigma Aldrich CuO <5 micron, as received
Based on PVB Cu/SnO-1 but uses 8:2 wt % ratio of CuO to SnO2
Binder/Solids 0.39792
Solids/Binder 2.513067953

TABLE 6

| Batch Sheet for $CuO/SnO_2$ of 6:5 by weight | | | | | | | |
|---|---|---|---|---|---|---|---|
| Slurry ID: | PVB Cu/SnO-4 | | | | | Solids in Green Anode: | vol. fraction |
| Starch Content (vol. fraction:) | 0.2 | Solvents: | vol. fraction | (Binder + Plast)/Solids | 0.6632 | Starch | 0.2 |
| | | IPA | 0.00 | Vol. Ratio: | | | |

TABLE 6-continued

Batch Sheet for CuO/$SnO_2$ of 6:5 by weight

| | | | | | | | | |
|---|---|---|---|---|---|---|---|---|
| Solids Loading(vol. fraction): | 0.24038 | Ethanol | 0.20 | Binder/Plast. Vol Ratio: | 1.5 | Cu | 0.5508 | 0.44064 |
| Slurry Volume(ml): | 50 | MEK | 0.8 | Dispersant(wt % of solids) | 0.955% | Sn | 0.4492 | 0.35936 |
| Relative amounts (by vol) of: | | | 1.00 | | | | | 1 |
| Cu | 0.5508 | | | | | | | |
| Sn | 0.4492 | | Binder: | PVB-79 | 100.0% | Plasticizer: | BBP | 100.0% |
| (Should equal 1) | 1 | | | Ethocel | 0.0% | | PEG400 | 0.0% |
| | | | | | | | DBP | 0.0% |

| | Volume(cc) | Density (g/cc) | Mass (g) | | Volume % | Weight % | Dry Tape Volume % |
|---|---|---|---|---|---|---|---|
| Sigma Aldrich CuO <5 micron | 5.296 | 6.31 | 33.42 | | 10.46 | 33.78% | 25.69% |
| SnO2 | 4.319 | 6.45 | 27.86 | | 8.53 | 28.16% | 20.95% |
| | | | | 61.28 | 0.00 | 0.00% | 0.00% |
| CANCARB 990 Carbon Black | 2.404 | 1.79 | 4.30 | | 4.75 | 4.35% | 11.66% |
| IPA (2-Propanol) | 0 | 0.786 | 0.00 | | 0.00 | 0.00% | |
| Ethanol | 6.00199984 | 0.785 | 4.71 | | 11.86 | 4.76% | |
| MEK | 24.00799936 | 0.805 | 19.33 | | 47.42 | 19.54% | |
| PS-236 | 0.63 | 1 | 0.63 | | 1.24 | 0.63% | 3.04% |
| Binder | 4.78260048 | 1.08 | 5.17 | | 9.45 | 5.22% | 23.20% |
| BBP | 3.18840032 | 1.1 | 3.51 | | 6.30 | 3.55% | 15.47% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.626 | | 98.92 | | 100.00 | 100.0% | 100.00% |

Notes:
Sigma Aldrich CuO <5 micron, as received
Based on PVB Cu/SnO-1 but uses 6:5 wt % ratio of CuO to SnO2
Binder/Solids 0.39792
Solids/Binder 2.513067953

TABLE 7

Batch Sheet for CuO/$SiO_2$ of 9:1 by weight

| | | | | | | | | |
|---|---|---|---|---|---|---|---|---|
| Slurry ID: | PVB Cu/SiO-1 | | | | | Solids in Green Anode: | | vol. fraction |
| Starch Content (vol. fraction:) | 0.2 | Solvents: | vol. fraction | (Binder + Plast)/Solids Vol. Ratio: | 0.6632 | Starch | | 0.2 |
| | | IPA | 0.00 | | | | | |
| Solids Loading(vol. fraction): | 0.24038 | Ethanol | 0.20 | Binder/Plast. Vol Ratio: | 1.5 | Cu | 0.76 | 0.608 |
| Slurry Volume(ml): | 50 | MEK | 0.8 | Dispersant(wt % of solids) | 0.955% | Si | 0.24 | 0.192 |
| Relative amounts (by vol) of: | | | 1.00 | | | | | 1 |
| Cu | 0.76 | | | | | | | |
| Si | 0.24 | | Binder: | PVB-79 | 100.0% | Plasticizer: | BBP | 100.0% |
| (Should equal 1) | 1 | | | Ethocel | 0.0% | | PEG400 | 0.0% |
| | | | | | | | DBP | 0.0% |

| | Volume(cc) | Density (g/cc) | Mass (g) | | Volume % | Weight % | Dry Tape Volume % |
|---|---|---|---|---|---|---|---|
| Sigma Aldrich CuO <5 micron | 7.308 | 6.31 | 46.11 | | 14.46 | 51.97% | 35.61% |
| SiO2 | 2.308 | 2.2 | 5.08 | | 4.57 | 5.72% | 11.25% |
| | | | | 51.19 | 0.00 | 0.00% | 0.00% |
| CANCARB 990 Carbon Black | 2.404 | 1.79 | 4.30 | | 4.76 | 4.85% | 11.71% |
| IPA (2-Propanol) | 0 | 0.786 | 0.00 | | 0.00 | 0.00% | |
| Ethanol | 6.00199984 | 0.785 | 4.71 | | 11.88 | 5.31% | |
| MEK | 24.00799936 | 0.805 | 19.33 | | 47.51 | 21.78% | |
| PS-236 | 0.53 | 1 | 0.53 | | 1.05 | 0.60% | 2.58% |

TABLE 7-continued

| Batch Sheet for $CuO/SiO_2$ of 9:1 by weight | | | | | | | |
|---|---|---|---|---|---|---|---|
| Binder | 4.78260048 | 1.08 | 5.17 | | 9.46 | 5.82% | 23.31% |
| BBP | 3.18840032 | 1.1 | 3.51 | | 6.31 | 3.95% | 15.54% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.530 | | 88.73 | | 100.00 | 100.0% | 100.00% |

Notes:
Sigma Aldrich CuO <5 micron, as received
Sigma SiO2 as received-
Batch uses 9:1 wt % ratio of CuO to SiO2
Binder/Solids 0.39792
Solids/Binder 2.513067953

TABLE 8

| Batch Sheet for $CuO/TiO_2$ of 8:2 by weight | | | | | | | | | |
|---|---|---|---|---|---|---|---|---|---|
| Slurry ID: | PVB Cu/TiO-1 | | | | | | Solids in Green Anode: | | vol. fraction |
| Starch Content (vol. fraction:) | 0.2 | Solvents: | vol. fraction | (Binder + Plast)/Solids | 0.6632 | | Starch | | 0.2 |
| | | IPA | 0.00 | Vol. Ratio: | | | | | |
| Solids Loading(vol. fraction): | 0.2 | Ethanol | 0.20 | Binder/Plast. Vol Ratio: | 1.5 | | Cu | 0.73 | 0.584 |
| Slurry Volume(ml): | 50 | MEK | 0.8 | Dispersant(wt % of solids) | 0.955% | | Ti | 0.27 | 0.216 |
| Relative amounts (by vol) of: | | | 1.00 | | | | | | 1 |
| Cu | 0.73 | | | | | | | | |
| Ti | 0.27 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 5.840 | 6.31 | 36.85 | | 11.57 | 43.84% | 34.14% |
| TiO2 | 2.160 | 4.26 | 9.20 | | 4.28 | 10.95% | 12.63% |
| | | | | 46.05 | 0.00 | 0.00% | 0.00% |
| CANCARB 990 Carbon Black | 2.000 | 1.79 | 3.58 | | 3.96 | 4.26% | 11.69% |
| IPA (2-Propanol) | 0 | 0.786 | 0.00 | | 0.00 | 0.00% | |
| Ethanol | 6.6736 | 0.785 | 5.24 | | 13.22 | 6.23% | |
| MEK | 26.6944 | 0.805 | 21.49 | | 52.89 | 25.57% | |
| PS-236 | 0.47 | 1 | 0.47 | | 0.94 | 0.56% | 2.77% |
| Binder | 3.9792 | 1.08 | 4.30 | | 7.88 | 5.11% | 23.26% |
| BBP | 2.6528 | 1.1 | 2.92 | | 5.26 | 3.47% | 15.51% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.474 | | 84.05 | | 100.00 | 100.0% | 100.00% |

Notes:
Sigma Aldrich CuO <5 micron, as received
Alfa #39953 TiO2 as received- 32 nm
Batch uses 8:2 wt % ratio of CuO to TiO2
Binder/Solids 0.39792
Solids/Binder 2.513067953

TABLE 9

| Batch Sheet for Cu—$SnO_2$ of 9:1 by weight | | | | | | | | |
|---|---|---|---|---|---|---|---|---|
| Slurry ID: | PVB Cu/SnO-5 | | | | | Solids in Green Anode: | | vol. fraction |
| Starch Content (vol. fraction:) | 0.4 | Solvents: | vol. fraction | (Binder + Plast)/Solids | 0.6632 | Starch | | 0.4 |
| Ni Content in final anode(vol. fraction): | 0 | IPA | 0.00 | Vol. Ratio: | | NiO | 0 | |

TABLE 9-continued

Batch Sheet for Cu—$SnO_2$ of 9:1 by weight

| | | | | | | | | | |
|---|---|---|---|---|---|---|---|---|---|
| Solids Loading(vol. fraction): | 0.24038 | Ethanol | 0.20 | Binder/Plast. Vol Ratio: | 1.5 | | CuO | 0.9201 | 0.55206 |
| Slurry Volume(ml): | 90 | MEK | 0.8 | Dispersant(wt % of solids) | 0.955% | | SnO2 | 0.0799 | 0.04794 |
| Relative amounts (by vol) of: | | | 1.00 | | | | | | 1 |
| CuO | 0.9201 | | | | | | | | |
| SnO2 | 0.0799 | | Binder: | PVB-79 | 100.0% | Plasticizer: | BBP | 100.0% | |
| (Should equal 1) | 1 | | | Ethocel | 0.0% | | PEG400 | 0.0% | |
| | | | | | | | DBP | 0.0% | |

| | Volume(cc) | Density (g/cc) | Mass (g) | | Volume % | Weight % | Dry Tape Volume % |
|---|---|---|---|---|---|---|---|
| Sigma Aldrich CuO <5 micron | 6.635 | 6.31 | 41.87 | | 13.13 | 47.89% | 32.36% |
| SnO2 | 0.576 | 6.45 | 3.72 | | 1.14 | 4.25% | 2.81% |
| NiO | 0.000 | 6.67 | 0.00 | 45.58 | 0.00 | 0.00% | 0.00% |
| CANCARB 990 Carbon Black | 4.808 | 1.79 | 8.61 | | 9.52 | 9.84% | 23.44% |
| IPA (2-Propanol) | 0 | 0.786 | 0.00 | | 0.00 | 0.00% | |
| Ethanol | 6.00199984 | 0.785 | 4.71 | | 11.88 | 5.39% | |
| MEK | 24.00799936 | 0.805 | 19.33 | | 47.52 | 22.11% | |
| PS-236 | 0.52 | 1 | 0.52 | | 1.02 | 0.59% | 2.52% |
| Binder | 4.78260048 | 1.08 | 5.17 | | 9.47 | 5.91% | 23.32% |
| BBP | 3.18840032 | 1.1 | 3.51 | | 6.31 | 4.01% | 15.55% |
| PEG400 | 0 | 1.02 | 0.00 | | 0.00 | 0.00% | 0.00% |
| DBP | 0 | 1.04 | 0.00 | | 0.00 | 0.00% | 0.00% |
| Total | 50.518 | | 87.42 | | 100.00 | 100.0% | 100.00% |

Notes:
Sigma Aldrich CuO <5 micron, as received
Alfa SnO2 #44897 as received
New tape for 1000 C./3 h using new SnO2 22-43 nm
Binder/Solids 0.39792
Solids/Binder 2.513067953

TABLE 10

Batch Sheet for Cu—SnO2 of 8:2 by weight

| | | | | | | | | | |
|---|---|---|---|---|---|---|---|---|---|
| Slurry ID: | PVB Cu/SnO-6 | | | | | | Green Anode: | | vol. fraction |
| Starch Content (vol. fraction:) | 0.4 | Solvents: | vol. fraction | (Binder + Plast)/Solids | 0.606 | | Starch | | 0.4 |
| Ni Content in final anode (vol. fraction): | 0 | IPA | 0.00 | Vol. Ratio: | | | NiO | 0 | |
| Solids Loading (vol. fraction): | 0.23 | Ethanol | 0.20 | Binder/Plast. Vol Ratio: | 1.5 | | CuO | 0.8365 | 0.5019 |
| Slurry Volume (ml): | 50 | MEK | 0.8 | Dispersant (wt % of solids) | 0.955% | | SnO2 | 0.1635 | 0.0981 |
| Relative amounts (by vol) of: | | | 1.00 | | | | | | 1 |
| CuO | 0.8365 | | | | | | | | |
| $SnO_2$ | 0.1635 | | Binder: | PVB-79 | 100.0% | Plasticizer: | BBP | 100% | |
| (Should equal 1) | 1 | | | Ethocel | 0.0% | | PEG400 | 0.0% | |
| | | | | | | | DBP | 0.0% | |

TABLE 10-continued

| | | | | | | | | Dry Tape | |
|---|---|---|---|---|---|---|---|---|---|
| | | | Density | Mass | | Volume | Weight | Volume | |
| | Volume(cc) | | (g/cc) | (g) | | % | % | % | |
| Sigma Aldrich CuO <5 micron | 5.772 | | 6.31 | 36.42 | | 11.43 | 42.71% | 30.43% | |
| SnO2 | 1.128 | | 6.45 | 7.28 | | 2.23 | 8.53% | 5.95% | |
| NiO | 0.000 | | 6.67 | 0.00 | 43.70 | 0.00 | 0.00% | 0.00% | |
| CANCARB 990 Carbon Black | 4.600 | | 1.79 | 8.23 | | 9.11 | 9.66% | 24.26% | |
| IPA (2-Propanol) | 0 | | 0.786 | 0.00 | | 0.00 | 0.00% | | |
| Ethanol | 6.3062 | | 0.785 | 4.95 | | 12.49 | 5.81% | | |
| MEK | 25.2248 | | 0.805 | 20.31 | | 49.95 | 23.81% | | |
| PS-236 | 0.50 | | 1 | 0.50 | | 0.98 | 0.58% | 2.62% | |
| Binder | 4.1814 | | 1.08 | 4.52 | | 8.28 | 5.30% | 22.05% | |
| BBP | 2.7876 | | 1.1 | 3.07 | | 5.52 | 3.60% | 14.70% | |
| PEG400 | 0 | | 1.02 | 0.00 | | 0.00 | 0.00% | 0.00% | |
| DBP | 0 | | 1.04 | 0.00 | | 0.00 | 0.00% | 0.00% | |
| Total | 50.496 | | | 85.27 | | 100.00 | 100.00% | 100.00% | |
| | | | Notes: | | | | | | |
| | | | | Sigma Aldrich CuO <5 micron, as received | | | | | |
| | | | | Alfa SnO2 #44897 as received | | | | | |
| Binder/Solids | 0.3636 | | | | | | | | |
| Solids/Binder | 2.750275028 | | | New tape for 1000 C./3 h using new $SnO_2$ 22-43 nm | | | | | |

We claim:

1. A method comprising:

making a macroporous composite anode by:

preparing a slurry comprising a substrate precursor, 2 wt % to 30 wt % of an anode active material wherein the anode active material has an average particle diameter in the range of 5 nm to 500 nm, a pore-forming agent, a binder, and a solvent, wherein the substrate precursor is a metal oxide, metal salt, organometallic oxide, metal nitride, or a combination thereof;

forming a tape from the slurry;

removing the pore-forming agent and binder to produce a macroporous structure;

reducing the macroporous structure such that a significant portion of the substrate precursor is reduced, thereby producing a macroporous composite anode comprising the substrate and the anode active material wherein the anode active material is dispersed throughout the substrate;

incorporating the anode into a lithium-ion battery.

2. The method of claim 1, further comprising sintering the macroporous composite anode.

3. The method of claim 1, further comprising preparing a laminate structure from the tape, wherein the laminate structure comprises at least two layers of the tape, one on top of the other.

4. The method of claim 1, the anode active material is selected from the group consisting of tin oxide, silicon oxide, titania, silicon and aluminum.

5. The method of claim 4, wherein the removing the pore-forming agent and binder from the tape produces a macroporous structure devoid of pore-forming agent and binder.

6. The method of claim 4, wherein sintering the tape produces a macroporous structure having a porosity of 30-60%.

7. The method of claim 4, wherein the tape is sintered in an oxidizing environment.

8. The method of claim 1, wherein the substrate precursor is completely reduced.

9. The method of claim 1, wherein the substrate precursor is copper (I) oxide, copper (II) oxide, nickel (II) oxide or nickel (IV) oxide.

10. The method of claim 1, wherein the anode active material is tin, a tin alloy, tin oxide, manganese oxide, chromium oxide, vanadium oxide, silicon, silicon oxide, titanium oxide, aluminum, or any combination thereof.

11. The method of claim 1, wherein the pore-forming agent is carbon black, graphite, polymer beads, starch, or a mixture thereof.

12. The method of claim 1, wherein the binder is poly (vinylbutyral).

13. The method of claim 1, wherein the reducing the macroporous structure comprises heating the macroporous structure in a reducing atmosphere at a temperature and for a period of time such that the substrate precursor present in the macroporous structure is completely reduced.

14. The method of claim 13, wherein the temperature and the period of time are selected such that the substrate precursor is completely reduced.

15. The method of claim 13, wherein the reducing atmosphere comprises $H_2$, CO, $CH_4$, or a mixture thereof.

16. The method of claim 13, wherein the macroporous structure is heated in the reducing atmosphere at a temperature and for a period of time such that at least a portion of the anode active material is reduced.

17. The method of claim 16, wherein the macroporous structure is heated in the reducing atmosphere at a temperature and for a period of time such that the anode active material is completely reduced.

18. The method of claim 13, wherein the temperature and period of time are selected such that the macroporous structure is concurrently reduced and sintered.

19. The method of claim 1, further comprising sintering the macroporous composite anode after reducing the macroporous structure.

20. The method of claim 19, wherein the macroporous composite anode is sintered in a nitrogen or nitrogen/hydrogen atmosphere.

21. The method of claim 1, wherein a) the substrate precursor is a metal oxide, b) the anode active material is selected from the group consisting of tin, a tin alloy, tin oxide, manganese oxide, chromium oxide, vanadium oxide, silicon, silicon oxide, titanium oxide, aluminum, or any combination thereof, c) the pore-forming agent comprises carbon black, graphite, starch, polymer beads, or a mixture thereof, and d) the binder comprises poly(vinylbutyral), ethylcellulose, or a mixture thereof, the slurry further comprising e) a dispersant, f) a plasticizer comprising benzyl butyl phthalate, poly(ethylene glycol), dibutyl phthalate, or a mixture thereof, and g) a solvent comprising lower alkyl ketones, lower alkyl alcohols, or a mixture thereof, the method further comprising:

preparing a laminate structure from the tape, wherein the laminate structure comprises at least two layers of the tape;

sintering the laminate structure to remove the pore-forming agent and binder and produce a macroporous structure devoid of the pore-forming agent and the binder; and reducing the macroporous structure in a reducing atmosphere at a temperature and for a period of time such that the substrate precursor is reduced, thereby producing the macroporous composite anode.

22. The method of claim 1 wherein the anode active material comprises tin oxide, silicon oxide, or titanium oxide and remains an oxide after the reducing step.

23. A method for preparing an anode, comprising:

preparing a slurry comprising a copper substrate metal, an anode active material, a pore-forming agent, a binder, and a solvent, wherein the anode active material is selected from the group consisting of tin, a tin alloy, tin oxide, manganese oxide, chromium oxide, vanadium oxide, silicon, silicon oxide, titanium oxide, aluminum, or any combination thereof;

forming a tape from the slurry;

sintering the tape in an oxygen-free atmosphere to produce a macroporous composite anode, wherein sintering the tape removes the pore-forming agent, the binder, and the solvent; and incorporating the anode into a lithium-ion battery.

24. A method comprising:

making a macroporous composite anode by:

preparing a slurry comprising a substrate precursor, an anode active material is selected from the group consisting of tin, a tin alloy, tin oxide, manganese oxide, chromium oxide, vanadium oxide, silicon, silicon oxide, titanium oxide, aluminum, or combinations thereof, a pore-forming agent that produces a macroporous structure having a porosity of at least 30% when the pore forming agent is removed, a binder, and a solvent, wherein the substrate precursor is a metal oxide, metal salt, organometallic oxide, metal nitride, or a combination thereof;

forming a tape from the slurry;

removing the pore-forming agent and binder to produce a macroporous structure;

reducing the macroporous structure such that a significant portion of the substrate precursor is reduced, thereby producing a macroporous composite anode comprising the substrate and the anode active material wherein the anode active material is dispersed throughout the substrate; and including the anode in a lithium-ion battery.

25. The method of claim 24, wherein the substrate precursor is copper (I) oxide or copper (II) oxide.

26. The method of claim 24 comprising 2 wt % to 30 wt % of the anode active material.

27. The method of claim 25 wherein the anode active material comprises tin oxide, silicon oxide, or titanium oxide and remains an oxide after the reducing step.

* * * * *